United States Patent
Van Heerden et al.

(10) Patent No.: US 10,245,626 B2
(45) Date of Patent: Apr. 2, 2019

(54) MINE DRAINAGE REMEDIATION USING BARIUM CARBONATE DISPERSED ALKALINE SUBSTRATE

(71) Applicant: UNIVERSITY OF THE FREE STATE, Bloemfontein (ZA)

(72) Inventors: Esta Van Heerden, Bloemfontein (ZA); Julio Hernandez Castillo, Bloemfontein (ZA); Alba Gomez, Bloemfontein (ZA); Rohan Posthumus, Bloemfontein (ZA); Walter George Van Der Hoven, Bloemfontein (ZA)

(73) Assignee: UNIVERSITY OF THE FREE STATE, Bloemfontein (ZA)

( * ) Notice: Subject to any disclaimer, the term of this patent is extended or adjusted under 35 U.S.C. 154(b) by 61 days.

(21) Appl. No.: 15/508,757

(22) PCT Filed: Sep. 4, 2015

(86) PCT No.: PCT/IB2015/056760
§ 371 (c)(1),
(2) Date: Mar. 3, 2017

(87) PCT Pub. No.: WO2016/035045
PCT Pub. Date: Mar. 10, 2016

(65) Prior Publication Data
US 2017/0274431 A1    Sep. 28, 2017

(30) Foreign Application Priority Data
Sep. 4, 2014    (ZA) .................................. 2014/06507

(51) Int. Cl.
*B09C 1/08*    (2006.01)
*C02F 1/66*    (2006.01)
(Continued)

(52) U.S. Cl.
CPC .................. *B09C 1/10* (2013.01); *B09C 1/00* (2013.01); *B09C 1/02* (2013.01); *B09C 1/08* (2013.01);
(Continued)

(58) Field of Classification Search
CPC .... B09C 1/10; B09C 1/00; B09C 1/02; B09C 1/08; C02F 1/5245; C02F 1/66;
(Continued)

(56) References Cited

PUBLICATIONS

Markwiese, J., White, C.S., "Assessment of In Situ Bioremediation of Cyanide and Nitrate at a Heap Leach Mining Operation in New Mexico." *Agencies and Science Working for the Future*, Nov. 1991, pp. 51-56.
(Continued)

*Primary Examiner* — Claire A Norris
(74) *Attorney, Agent, or Firm* — Saliwanchik, Lloyd & Eisenchenk

(57) ABSTRACT

The present invention relates to a treatment system having a barium carbonate ($BaCO_3$) dispersed alkaline substrate (BDAS) for use in the remediation or at least partial remediation of mine drainage (MD) and/or environmental media contaminated with a source of MD. The invention utilizes chemical, biological and combined treatment systems remove high concentrations of sulfates, hardness, heavy metals and N-compounds, that may exist in the MD as well as high concentrations of alkalinity produced during the remediation process. The invention further extends to a process for treating MD and/or environmental media contaminated with MD and to an apparatus for use in this process.

21 Claims, 29 Drawing Sheets

(51) Int. Cl.
| | |
|---|---|
| *C02F 1/52* | (2006.01) |
| *C02F 3/10* | (2006.01) |
| *C02F 3/34* | (2006.01) |
| *B09C 1/00* | (2006.01) |
| *B09C 1/02* | (2006.01) |
| *B09C 1/10* | (2006.01) |
| *C02F 3/28* | (2006.01) |
| *C02F 3/30* | (2006.01) |
| *C02F 101/10* | (2006.01) |
| *C02F 101/16* | (2006.01) |
| *C02F 101/20* | (2006.01) |
| *C02F 103/10* | (2006.01) |

(52) U.S. Cl.
 CPC .............. *C02F 1/5245* (2013.01); *C02F 1/66* (2013.01); *C02F 3/106* (2013.01); *C02F 3/2806* (2013.01); *C02F 3/305* (2013.01); *C02F 3/345* (2013.01); *C02F 3/107* (2013.01); *C02F 2101/10* (2013.01); *C02F 2101/101* (2013.01); *C02F 2101/103* (2013.01); *C02F 2101/105* (2013.01); *C02F 2101/163* (2013.01); *C02F 2101/20* (2013.01); *C02F 2101/203* (2013.01); *C02F 2103/10* (2013.01); *C02F 2305/06* (2013.01); *Y02W 10/15* (2015.05)

(58) Field of Classification Search
 CPC ........ C02F 3/106; C02F 3/2806; C02F 3/305; C02F 3/345; C02F 2101/203; C02F 2103/10; C02F 2101/101
 USPC ........................................ 210/615, 617, 665
 See application file for complete search history.

(56) References Cited

PUBLICATIONS

Patrick, H. et al., "Barium Carbonate Process for Sulphate and Metal Removal from Mine Water." *Mine Water and the Environment*, Mar. 2007, 26(1):14-22, doi: 10.1007/s10230-007-0145-7.

Rötting, T.S. et al., "Field Application of Calcite Dispersed Alkaline Substrate (calcite-DAS) for Passive Treatment of Acid Mine Drainage with High Al and Metal Concentrations." *Applied Geochemistry*, Jun. 2008, 23(6):1660-1674, doi: 10.1016/j.apgeochem.2008.02.023.

MINE DRAINAGE REMEDIATION USING BARIUM CARBONATE DISPERSED ALKALINE SUBSTRATE

CROSS REFERENCE TO A RELATED APPLICATION

This application is a National Stage Application of International Application Number PCT/IB2015/056760, filed Sep. 4, 2015; which claims priority to South African Application No. 2014/06507, filed Sep. 4, 2014; both of which are incorporated herein by reference in their entirety.

TECHNICAL FIELD

The present invention relates to a treatment system having a barium carbonate ($BaCO_3$) dispersed alkaline substrate (BDAS) for use in the remediation or at least partial remediation of mine drainage (MD) and/or environmental media contaminated with a source of MD. The invention utilizes chemical, biological and combined treatment systems to remove high concentrations of sulfates, hardness, heavy metals and N-compounds, that may exist in the MD as well as high concentrations of alkalinity produced during the remediation process. The invention further extends to a process for treating MD and/or environmental media contaminated with MD and to an apparatus for use in this process.

BACKGROUND TO THE INVENTION

Mining operations have played an integral part in the development of the South African economic and political landscape from as early as 1870. Gold and coal mining have brought certain economic benefits thereby forming the backbone of the South African economy, South Africa being one of the main international suppliers of coal. However, these economic developments have come at significant environmental cost. Furthermore, water contamination which results from mining activity may pose a threat to human health. One of the main problems associated with coal and gold mines in South Africa is the generation of drainages with high concentrations of anions, most significantly sulfur dioxide anions ($SO_4^{2-}$), and metals (mainly iron and manganese) which result from the oxidation of iron pyrite ($FeS_2$), which is associated with the coal deposits in the Karoo super group and the gold deposits of the Witwatersrand Basin, to name but a few examples.

Although the coal mining super group of the Karoo and the gold deposits in the Witwatersrand Basin are given as specific examples, mine drainage or, more precisely, acid mine drainage (AMD) or acid rock drainage, collectively called acid drainage (AD) is found around the world both as a result of naturally occurring processes and activities associated with land disturbances, such as highway construction and mining where acid-forming minerals are exposed at the surface of the earth. In fact Roman mines in Britain and Bronze Age workings in Spain still produce AMD and coal mines have been found to continue to contaminate rivers well after their closure. Upon exposure to oxidizing conditions, sulfide minerals are oxidized in the presence of water and oxygen to form highly acidic, sulfate-rich drainage.

Mining increases the exposed surface area of sulfur-bearing rocks allowing for excess acid generation beyond natural buffering capabilities found in host rock and water resources. Since large masses of sulfide minerals are exposed quickly during the mining and milling processes, the surrounding environment can often not attenuate the resulting low pH conditions. Furthermore, metals that were once part of the host rock become solubilized and exacerbate the effect of the highly acidic, sulfate-rich drainage.

As mentioned above, acid mine drainage (AMD) is produced by the oxidation of sulfide minerals, chiefly iron pyrite ($FeS_2$). The reaction of pyrite with oxygen and water produces a solution of ferrous sulfate and sulfuric acid. Ferrous iron can further be oxidized producing additional acidity. The chemical reactions that take place as part of this process are detailed hereunder:

Oxidation of Pyrite by Oxygen in the Presence of Water:

$$FeS_2(s)+3.5O_2(g)+2H_2O(l) \rightarrow Fe^{2+}(aq)+2SO_4^{2-}(aq)+2H^+(aq) \tag{1}$$

Oxidation of Pyrite by $Fe^{2+}$ (Ferrous Ion)

$$FeS_2(s)+14Fe^{3+}+8H_2O(l) \rightarrow 15Fe^{2+}(aq)+2SO_4^{2-}(aq)+16H^+(aq) \tag{2}$$

Oxidation of $Fe^{2+}$ by Oxygen

Further oxidation of $Fe^{2+}$ (ferrous iron) to $Fe^{3+}$ (ferric iron) occurs when sufficient oxygen is dissolved in the water or when water is exposed to sufficient atmospheric oxygen (equation 3). This reaction is accelerated by the presence of oxidizing bacteria such as *Acidithiobacillus ferrooxidans*.

$$Fe^{2+}+0.25O_2+H^+ \rightarrow Fe^{3+}+0.5H_2O \tag{3}$$

Precipitation of $Fe^{3+}$ (Ferric Ion):

Ferric iron can either precipitate as $Fe(OH)_3$, a red-orange precipitate (equation 4) seen in waters affected by acid rock drainage, or it can react directly with pyrite to produce more ferrous iron and acidity as shown by equation 5.

$$2Fe^{3+}+6H_2O \rightarrow 2Fe(OH)_3(s)+6H^+ \tag{4}$$

$$14Fe^{3+}+FeS_2(s)+8H_2O \rightarrow 2SO_4^{2-}+15Fe^{2+}+16H^+ \tag{5}$$

When ferrous iron is produced (equation 5) and sufficient dissolved oxygen is present, the cycle of reactions 3 and 4 is perpetuated. Without dissolved oxygen, equation 5 will continue to completion and water will show elevated levels of ferrous iron. The rate of the overall acidification process is determined by equation 3. However, the rate of the overall acidification process can be increased by up to six fold when reactions 1 and 3 are catalyzed by bacteria, as briefly alluded to above in relation to reaction 3.

Hydrolysis reactions of many common metals also form precipitates and in doing so generate $H^+$. These reactions commonly occur where mixing of acidic waters with substantial dissolved metals results in the precipitation of metal hydroxides.

$$Al^{3+}+3H_2O \rightarrow Al(OH)_3(s)+3H^+ \tag{6}$$

Other metals may be combined with sulfide in the form of, inter alia, chalcopyrite ($CuFeS_2$), sphalerite ($(Zn,Fe)S$), covellite ($CuS$), and arsenopyrite ($FeAsS$) whereby oxidation and hydrolysis of these metal sulfide minerals release metals such as copper, zinc, iron, arsenic, nickel and lead into solution concomitant with acidity and sulfate production.

Although the chemistry of AMD generation is relatively straightforward, the final product is a function of the geology of the mining region, presence of micro-organisms, temperature and also of the availability of water and oxygen. These factors are highly variable from one region to another, and, for this reason, the prediction, prevention, containment and treatment of AMD must be considered carefully and with great specificity.

Moreover, the circum-neutral or alkaline pH of the alkaline mine drainage can also be produced due to: (i) a low content of sulphide minerals; (ii) the presence of monosulphides rather than pyrite or marcasite; (iii) a large pyrite grain-size limiting oxidation rate; (iv) neutralization of acid by carbonate or basic silicate minerals; (v) engineering factors (introduction of lime dust for explosion prevention; cement or rock flour during construction works); (vi) neutralization of acid by naturally highly alkaline groundwaters; (vii) circulating water not coming into effective contact with sulphide minerals; and (viii) oxygen not coming into direct contact with sulphide minerals or influent water being highly reducing.

The goal in treating AMD is ultimately to an increase in pH with the resultant neutralization and precipitation of heavy metals. A variety of treatment approaches ranging from physical, chemical and biological methods have been employed.

Physical treatment processes can be used for the treatment of MD. Such physical treatment processes are generally membrane-based methods such as ultra-filtration, electrodialysis and reverse osmosis, which result in a highly concentrated brine stream. However, the field of this particular invention relates directly to chemical and biological treatment processes or a combination of these methods and hence no further mention of physical treatment processes is made herein.

Mine drainage is a major cause of ground and surface water pollution in South Africa. Because such pollution can persist for decades and even centuries after the cessation of industrial activity, there is a pressing need to develop cheap, sustainable remedial methods.

There are currently two types of chemical and biological process for the remediation of MD, namely active and passive processes. Active processes involve the continuous application of alkaline materials to neutralize acidic mine waters and precipitate metals whilst passive processes utilize natural and constructed wetland systems. Each of these processes is dealt with in further detail hereunder:

Active Chemical Treatment

This process involves the addition of a chemical neutralizing agent to AMD effluent to be treated. This agent is alkaline (typically lime) and it raises the pH of the AMD which accelerates the oxidation of the ferrous iron (for which active aeration or the addition of a chemical oxidizing agent such as hydrogen peroxide is necessary) and causes many of the metals present in solution to precipitate as hydroxide and carbonates. This addition of alkaline material also produces an environment which is unfavorable to pyrite oxidation given that iron oxidizing bacteria require an acidic environment to promote optimum activity. This active chemical treatment process results in a large amount of iron rich sludge that may also contain other metals depending on the chemistry of the mine water treated. Despite its effectiveness this method is disadvantageous in that it results in the production of the iron rich sludge which must then be disposed of. Furthermore, this method tends to have high operational costs and requires constant monitoring.

Active Biological Treatment

In this system a sulfidogenic bioreactor is used to bioremediate AMD. In a sulfidogenic bioreactor the biogenic production of hydrogen sulfide ($H_2S$) by Sulfate Reducing Bacteria (SRBs) is used to generate alkalinity and to precipitate metals as insoluble sulfides. These engineered systems have more predictable performance than their passive system counterparts. Furthermore, these systems allow for the selective recovery of heavy metals from MD, allowing for metals such as copper and zinc to be reused. Finally, these systems also facilitate the significant lowering of sulfate concentrations within the MD. However, these systems also have a number of disadvantages. Firstly, these bioreactors have large construction and operational costs. Furthermore, the sulfate reducing bacteria (SRB) used within these reactors are sensitive to even moderately acidic conditions meaning that pretreatment to remove the acidity in the AMD is required. The activity of the SRBs is rate limiting and hence both pretreatment and the potentially slowed reaction rates lead to further increased costs.

Passive Processes

Passive treatment systems improve water quality using only naturally available energy sources, for example, gravity, microbial metabolic energy and photosynthesis. Once built, such systems require infrequent maintenance. Examples of passive treatment systems include: wetland treatment systems, anoxic limestone drains and reducing or alkalinity producing systems. In many instances, these systems rely on bioremediation which is the transformation of a contaminant using biological agents to convert the material to less toxic forms. Wetland systems, which also have a biological component, have longer response times in regard to changes to the system, for example changes in the composition of influent water, making the system a much slower system overall when in operation. Further disadvantageously, these systems can show problems with clogging and loss of reactivity when exposed to MD with high concentrations of metals.

To address some of the above stated problems dispersed alkaline substrate (DAS) are used. The substrate comprise a fine-grained alkaline reagent (limestone, sand or magnesium oxide powder) mixed with a coarse inert matrix, such as wood chips, to increase reactivity and reduce passivation. These materials also provide high porosity and reduce the clogging problems. Typically calcium carbonate ($CaCO_3$) dispersed alkaline substrate (DAS), hereinafter referred to as $CaCO_3$-DAS or magnesium oxide (MgO) dispersed alkaline substrate, hereinafter referred to as MgO-DAS is used for this purpose. However, it has been found that the introduction of $CaCO_3$-DAS or MgO-DAS does not remove sulfate ($SO_4^{2-}$) and the iron (Fe) removal is also not complete, which is disadvantageous.

Finding a solution to remediate MD is not only a matter of environmental importance, but also one of protecting vulnerable, local communities that depend upon finite natural resources adversely affected by MD.

In addition gold and silver mines produce MDs with high concentration of cyanide as the industry uses sodium and potassium cyanide to recover these metals (equation 7 and 8). The cyanide leaching process also referred to as cyanidation is an established technology used in the extraction of gold and other metals such as silver, copper and zinc from oxidized ores and it accounts for up to 90% of global production.

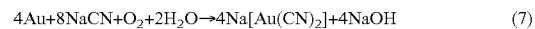
$$4Au+8NaCN+O_2+2H_2O \rightarrow 4Na[Au(CN)_2]+4NaOH \quad (7)$$

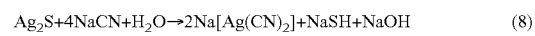
$$Ag_2S+4NaCN+H_2O \rightarrow 2Na[Ag(CN)_2]+NaSH+NaOH \quad (8)$$

However, excessive use of cyanide for the dissolution of gold is associated with environmental risk. Cyanide, especially when in its free form HCN or CN—, can be very toxic, due to its high metabolic inhibition potential. It may degrade into cyanate (OCN—) which is of generally lower toxicity but which could still be problematic in the environment. Cyanide poisoning can occur through consumption of contaminated surface water or concurrent exposure through inhalation or skin absorption. The impact of MD and cyanide-containing wastewater or tailings on terrestrial and aquatic ecosystems is potentially enormous due to the huge volumes involved. If not adequately remediated, they can leach and pollute the main watershed.

Bio-augmentation to the bioreactors was tested to remove cyanide and high sulfate and iron concentrations. It means that the bioreactor was augmented with sulfate reducing bacteria. After 120 hours of acclimation period, the values obtained corresponded to a 90.6% removal of cyanide; which mean that the cyanide concentration in the final effluent had decreased from 436 µg/L to 41 µg/L; below SANS recommended levels. As well as, 94% of iron removal and 100% sulfate removal.

However, a study more wide and detailed must be carried out to determine the involved biochemicals processes in the cyanide degradation.

On the other hand, the nitrate represents a sort of emergent contamination for the groundwater reservoir. The nitrification come from farming activities; fertilizers, septic systems, and manure storage or spreading operations, they are the main focus of pollution. However, recently have been studied the relation between the nitrification of aquifers and the mining activities. During the last 60 years, the ammonium nitrate ($NH_4NO_3$) has been widely used as explosive in open pit, underground mining and quarries, as well as civil works. The explosion of ammonium nitrate releases gases as $H_2O$, $N_2$ and $CO_2$. $N_2$ can be easily oxidized to nitrate ($NO_3^-$) in contact with the oxygen of the air and it can be released to superficial or ground water, contributing to the water nitrification.

This bioreactor showed to lab scale the ability to remove high nitrate concentrations (3000 mg/L) contained in MD. The presence of the anaerobic bacteria in the MD such as sulfate reducing bacteria, mainly, which can, in the absence of sulfates, remove nitrate. The nitrate is used as electron acceptor and reduced up to $N_2$ volatile, since it had not evidence of the neoformed minerals phase which contained N. The percentage of nitrate removal during of 6 months of running of the lab bioreactor was a 100% of nitrate removal which demonstrated the efficiency of this bioreactor to promote the bacteria settlement.

There is thus a clear need in the art to arrive at a solution for successfully remediating environmental media contaminated by MD as well as MD contaminated environments without suffering from the shortcomings associated with the techniques of the prior art.

SUMMARY OF THE INVENTION

According to a first aspect thereof, the present invention provides an apparatus for the bio-remediation, or at least partial bio-remediation, of environmental media contaminated with a source of mine drainage (MD), said apparatus including:
(i) a means for introducing environmental media contaminated with a source of MD;
(ii) a support matrix for the alkaline substrate and electron donor for bacteria;
(iii) a barium carbonate $BaCO_3$ alkaline substrate;
(iv) a means for removing sulfate and cations by precipitation;
(v) a means for removing electrical conductivity (EC) and total dissolved solids (TDS) by precipitation of the cations and sulphate as described above;
(vi) a bioreaction vessel for containing a microbial consortium;
(vii) a means for removing nitrates and cyanide by the bacteria consortium; and
(viii) a means for removing the treated environmental media.

The apparatus may be in the form of a fixed-film bioreactor or a fixed film biocell.

The apparatus may be in the form of an up-flow bioreactor or a down-flow bioreactor. In a preferred embodiment of the invention the bioreactor is a down-flow reactor with the supernatant open to the atmosphere in order to maximize iron oxidation and to minimize iron (II) mobility in the bioreactor.

In an embodiment of the invention, the environmental media contaminated with a source of MD, introduced into the bioreaction vessel is removed from a MD site.

The support matrix serves as an inert physical support mechanism for the microbial community. The support matrix also serves as a surface media for the dispersal of the alkaline substrate thereby allowing for the alkaline substrate to take the form of a dispersed alkaline substrate (DAS) and, in particular, $BaCO_3$ dispersed alkaline substrate (BDAS). In terms of the invention, the matrix material may be selected from the group consisting of an inert organic medium, such as wood chips. Gravel must be added at the bottom of the reactor with the aim of promote the filtration of the drainage.

In an embodiment of the invention wherein the system being utilised is a semi-passive or passive bioremediation system, the matrix is inert organic material (wood chips). In a preferred embodiment of the invention, the ratio of $BaCO_3$ to wood chips is 1:4 (v/v).

The microbial consortium consists primarily of indigenous bacteria communities from the MD; which settle into the bioreactors using the wood chips as a fixed media. The increasing of the settling and efficiency of the indigenous bacteria community is due to the decreasing of the redox potential (Eh) and the increasing of the pH, both produced by the dissociation of $BaCO_3$.

Barium carbonate $BaCO_3$ has been found to contribute to the acidity reduction and pH stabilization of the environmental media being treated (equation 9). It has also been shown to assist with the precipitation of sulfate as witherite ($BaSO_4$) (equation 9)

$$BaCO_3 + SO_4^{2-} + H^+ \rightarrow BaSO_4 + HCO_3^- \qquad (9)$$

In an embodiment of the invention, $BaCO_3$ works up to pH 9. In a preferred embodiment of the invention, the apparatus woks with a MD up to pH 8.5.

The fixed-film bioreactor may operate under aerobic or anaerobic conditions. In a preferred embodiment of the invention, the bioreactor operates under anaerobic conditions.

The invention provides for the bioreactor to operate with an initial flow rate of 1.09 L/minute and a hydraulic retention time of about 24 hours, according to the results obtained from several pilot plants, the flow rate can be increased up to 2.5 L/min and the retention time can be decreased up to 9 hours.

The invention provides for the bioreactor to operate at an oxidation-reduction potential (ORP) of between about −200 mV and about −250 mV.

In an embodiment of the invention, the bioreactor can operate at either continuous or pulsed flow. In a preferred embodiment, the apparatus operates under continuous flow.

In a further embodiment of the invention, the bioreactor may include any suitable means for further polishing steps to be performed on the environmental media being treated.

In yet another embodiment, the cations being precipitated may be any one or more of $Ca^{2+}$, $Na^+$, $Mg^{2+}$ and $K^+$. Heavy metals may also be precipitated and may be any one or more of $Fe^{2+/3+}$, $Al^{3+}$, $Zn^{2+}$ and $Cu^{2+}$. The precipitation may also further be in the form of any one or more of Barium sulfate ($BaSO_4$), carbonates (($Me^{2+}$)$CO_3$) and oxy-hydroxides ($Me^{2+/3+}O(OH)$).

According to a second aspect thereof, the present invention provides for a treatment system for use in the bioremediation, or at least partial bioremediation, of environmental media contaminated with a source of MD wherein the treatment system includes a combination treatment which combines the biological activity of indigenous bacteria communities with the chemical activity of a dispersed alkaline substrate, in particular a $BaCO_3$ dispersed alkaline substrate (BDAS), to facilitate the sulfate removal in the MD.

The source of MD may include, but is not limited to including, varying concentrations of sulfate, varying concentrations of one or more metals, varying concentrations of one or more sulfates, a combination of two or more of the foregoing or a combination of two or more of the foregoing in combination with any other suitable component.

In an embodiment of the invention, the one or more metals may be selected from the group consisting of arsenic, antimony, cadmium, copper, iron, lead, molybdenum, nickel, and zinc. However, it will be appreciated by the skilled artesian that this list is by no means exhaustive of the metals that may be present in the MD.

The source of MD has a pH of 8 or below.

The environmental media contaminated with MD to be treated may be derived from acid or alkaline mine drainage. It will, however, be appreciated that the MD site and the MD site material may be any suitable MD site and any suitable MD site material.

According to a third aspect thereof, the present invention provides a process for the bioremediation, or at least partial bioremediation, of environmental media contaminated with MD, the process comprising the step of removing environmental media from a mine drainage contaminated site and exposing the environmental media to a mixture including an indigenous microbial consortium of microorganisms, as identified herein, wood chips as a minimal source of electron donor, as identified herein and a dispersed alkaline substrate, more particularly, dispersed barium carbonate $BaCO_3$, for a sufficient period of time so as to allow for the chemically and biologically mediated precipitation of the sulfate, nitrate, phosphate and metals.

The present invention thus contemplates the ex situ bioremediation, or at least partial bioremediation, of environmental media contaminated with MD.

According to a fourth aspect thereof, the present invention provides a treatment process for treating mine drainage (MD) contaminated environmental media, said process including the following stages:

The first stage including the steps of:
(i) providing a bioreactor of the type described and identified herein, the bioreactor including a wetted support matrix which has been pre-treated with $BaCO_3$ to form a $BaCO_3$ dispersed alkaline substrate;
(ii) introducing the MD contaminated media into the bioreactor and subsequently introducing the indigenous microorganisms; and
(iii) controlling the hydraulic retention time of the bioreactor such that the hydraulic retention time is between about 9 hours and about 24 hours.

The second stage including the steps of:
(iv) allowing for the precipitation of the sulfate present in the source of the MD contaminated environmental media as barium sulfate ($BaSO_4$);
(v) allowing for the precipitation of Ca, Mg, Na and trace metals present in the source of the MD contaminated environmental media as calcite and aragonite ($CaCO_3$);
(vi) allowing for the precipitation of heavy metals present in the source of the MD contaminated environmental media as oxy-hydroxides ($Me^{2+/3+}O(OH)$); and
(vii) removing cyanide and nitrates within the biological processes involved in the invention.

The chemical reactions involved in the precipitation of sulfate, in a source of mine drainage, as barium sulfate in accordance with the invention includes the following:

$$BaCO_3+H_2O \rightarrow Ba+HCO_3^-+OH^- \quad (10)$$

Stage 1: Dissolution of $BaCO_3$ (leading to increased alkalinity).

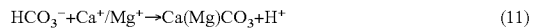
$$HCO_3^-+Ca^+/Mg^+ \rightarrow Ca(Mg)CO_3+H^+ \quad (11)$$

Stage 2: Removal of Calcium and/or Magnesium as carbonate compounds which influences the hardness of the MD.

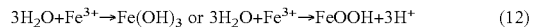
$$3H_2O+Fe^{3+} \rightarrow Fe(OH)_3 \text{ or } 3H_2O+Fe^{3+} \rightarrow FeOOH+3H^+ \quad (12)$$

Stage 3: Precipitation of trivalent metals as oxyhydroxides as a result of increasing alkalinity.

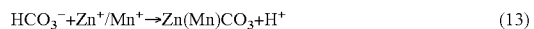
$$HCO_3^-+Zn^+/Mn^+ \rightarrow Zn(Mn)CO_3+H^+ \quad (13)$$

Stage 4: Precipitation of mono- and divalent metal ions as carbonates.

Stage 5: Precipitation of sulfate ions barium sulfate (see equation 7).

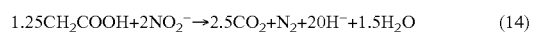
$$1.25CH_3COOH+2NO_2^- \rightarrow 2.5CO_2+N_2+2OH^-+1.5H_2O \quad (14)$$

Stage 6: Denitrification process (acetate representing organic matter).

According to a fifth aspect of thereof, the present invention provides for the use of barium carbonate ($BaCO_3$) in a process for the bioremediation, or at least partial bioremediation, of environmental media contaminated with MD.

$BaCO_3$ is utilised as a dispersed alkaline substrate (BDAS) within a bioreactor as described in accordance with the first and second aspects of the invention to assist in acidity reduction and pH stabilization of the environmental media containing MD as well as to assist with the precipitation of sulfate in the bioreactor and to assist with the precipitation of metals as oxyhydroxides and/or complex carbonates.

BaCO3 has a dissolution pH up to pH 9.

The bioreactor and the treatment processes discussed herein obviate the disadvantages associated with the prior art. In particular, the bioreactor of the present invention does not rely on sulfate reduction alone to meet the treatment objectives but rather combines bacterial and chemical treatments, particularly as regards the use of $BaCO_3$, in a novel manner to meet the treatment objectives.

These and other objects, features and advantages of the invention will become apparent to those skilled in the art in the following detailed description of the invention.

Figure 1A:
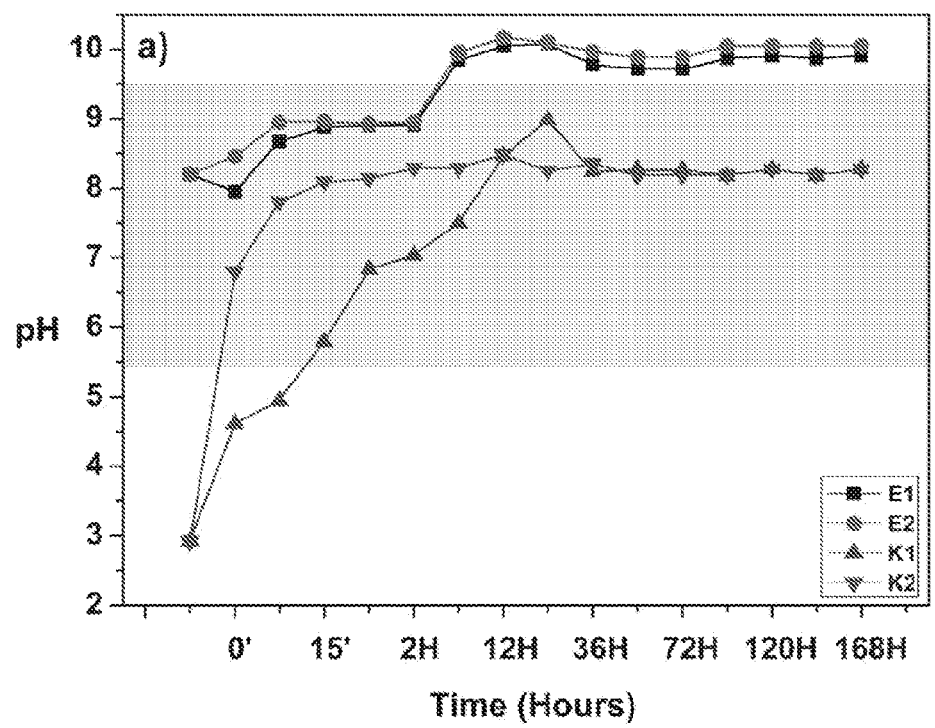
FIG. 1: depicts the temporal evolution of the physicochemical parameters from 0 to 168 h and its relation with drinking water standards (SANS 241)
Figure 1B:
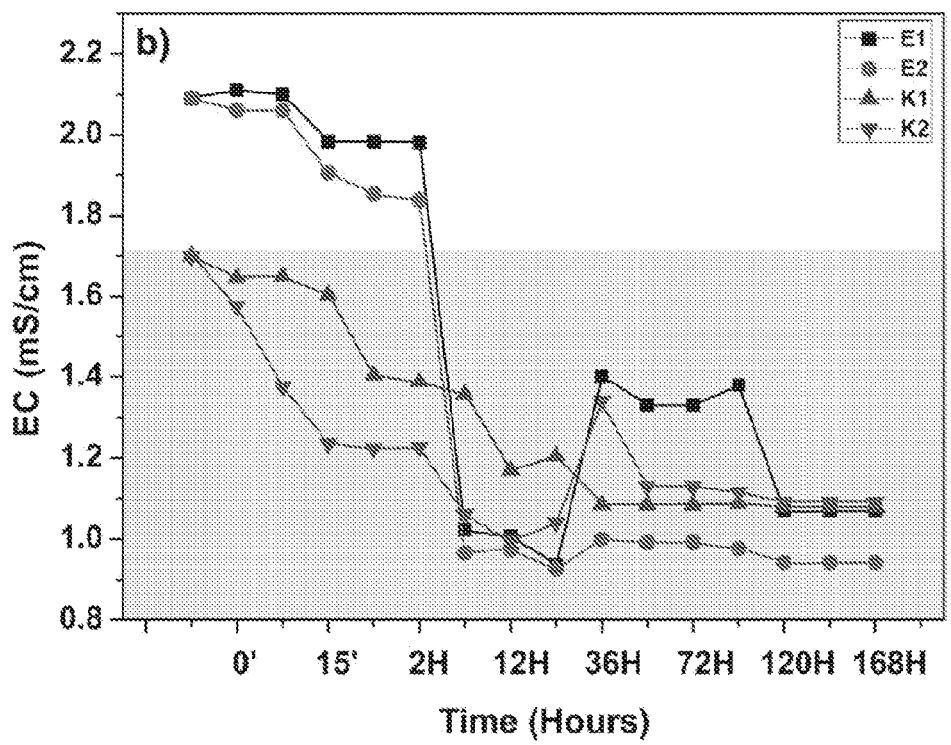
Figure 1C:
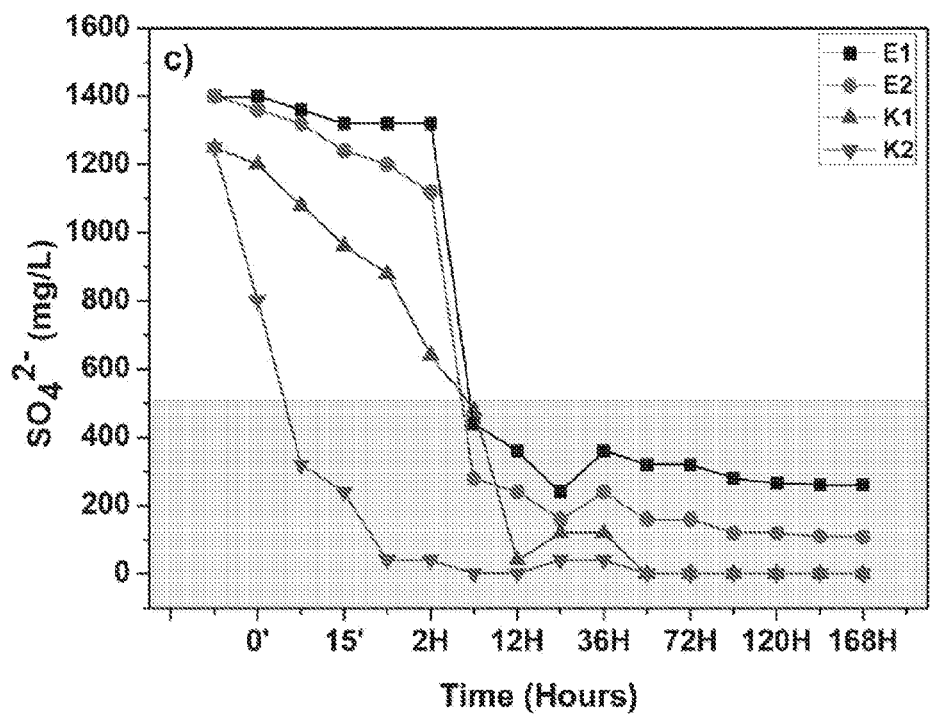
Figure 1D:
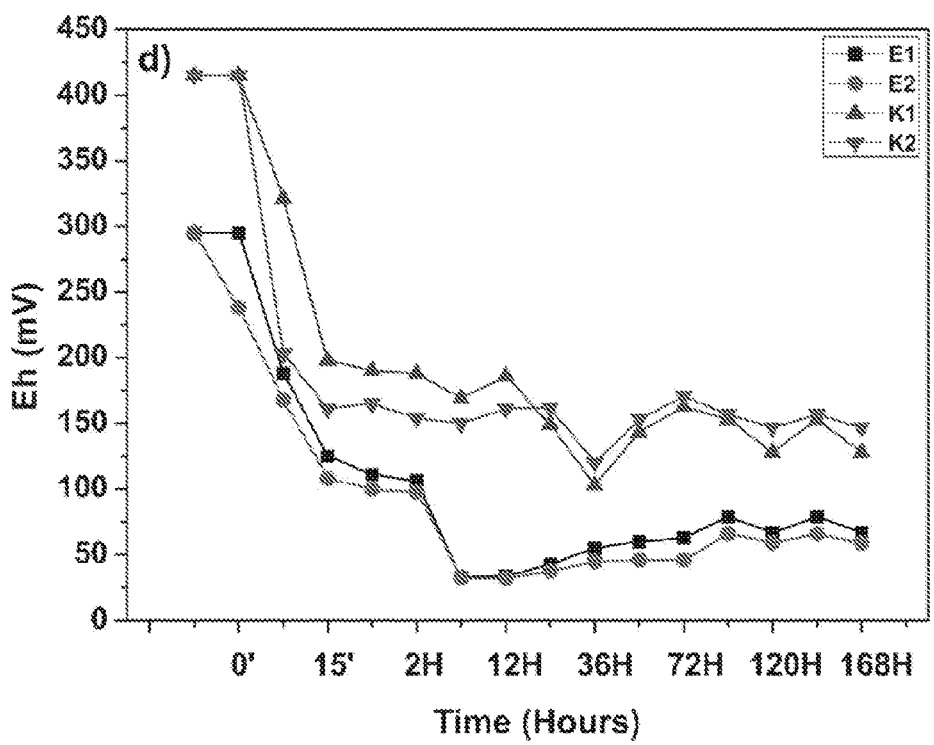
Figure 1E:
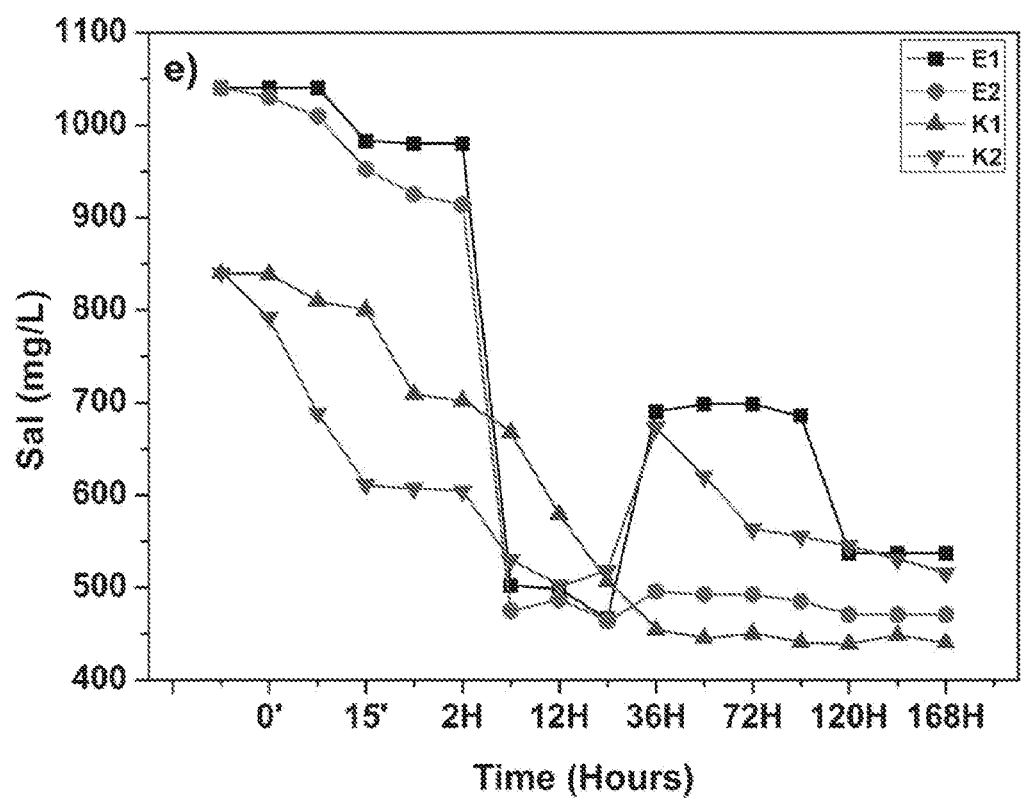
Figure 2A:
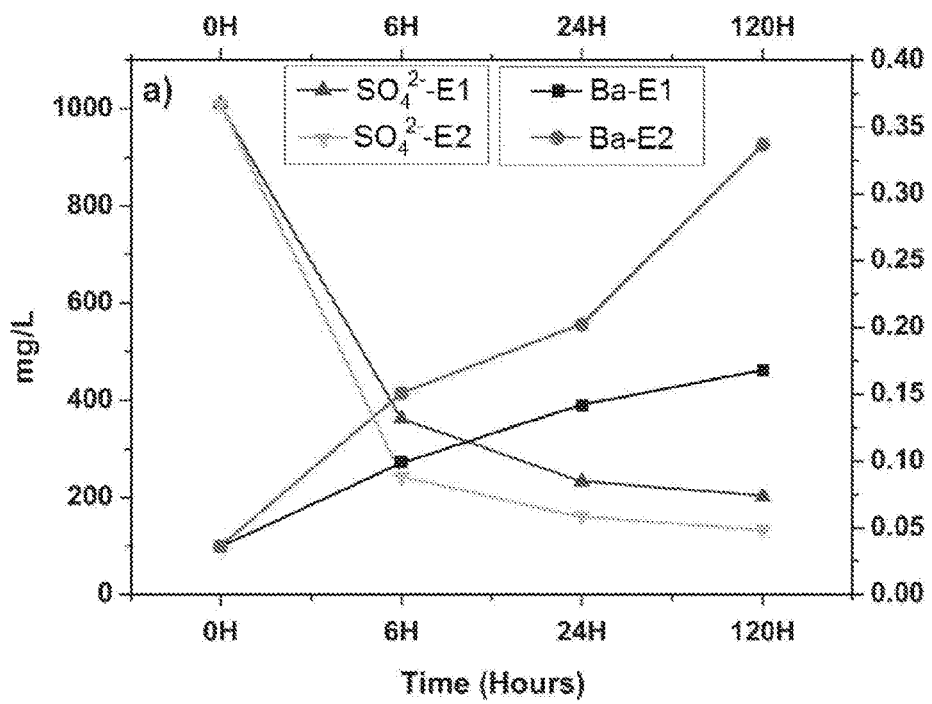
FIG. 2: are graphs depicting temporal evolution of cations and anions from 0 to 168 h.
Figure 2B:
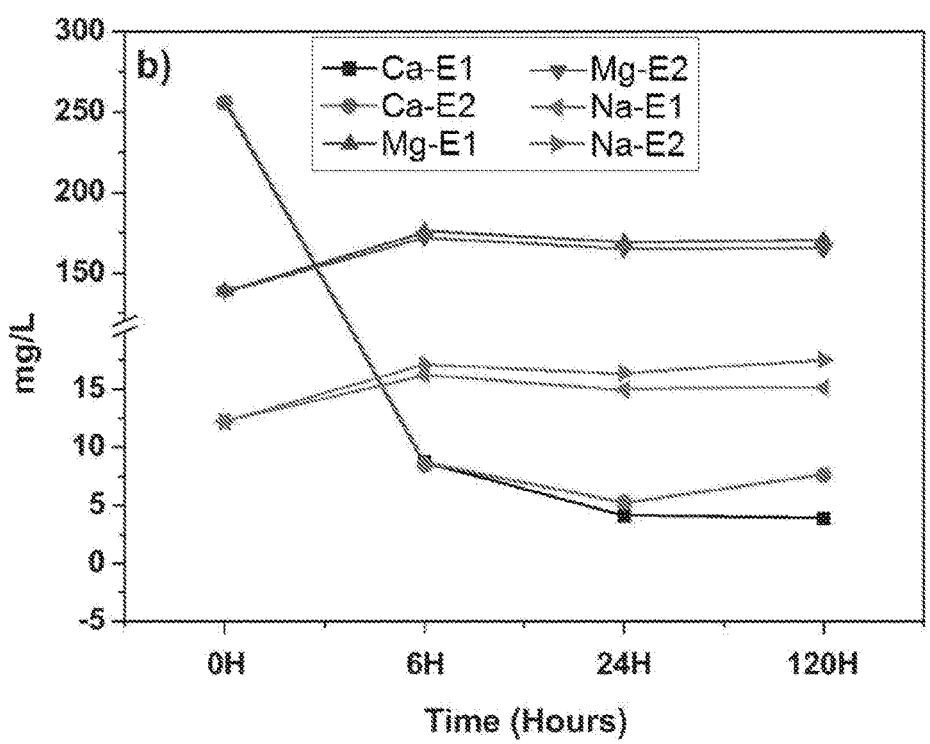
Figure 2C:
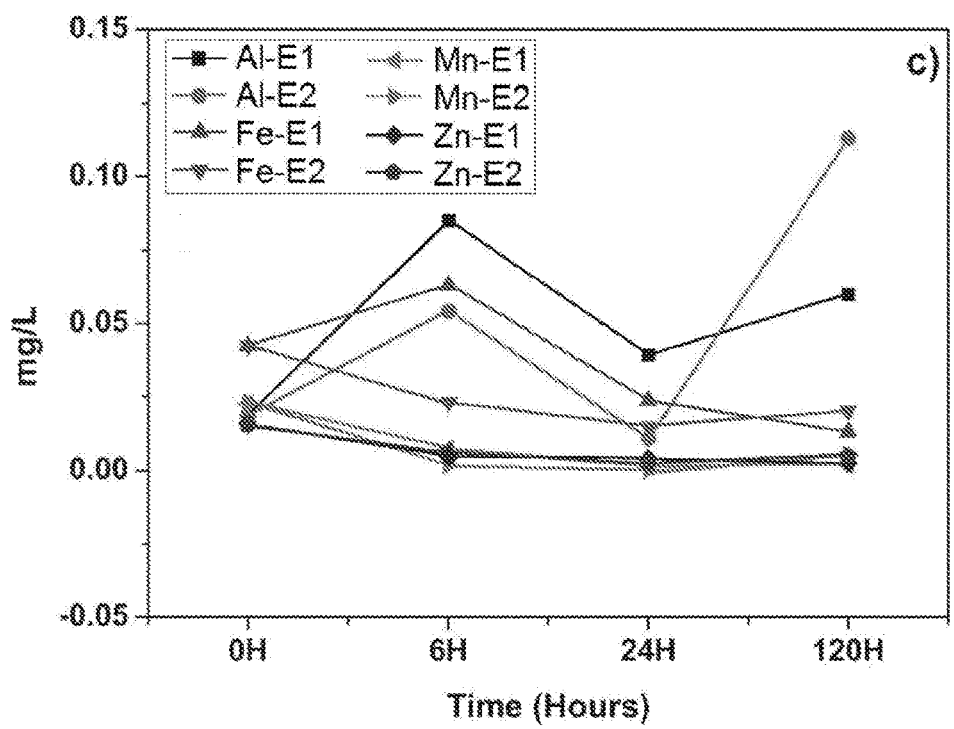
Figure 2D:
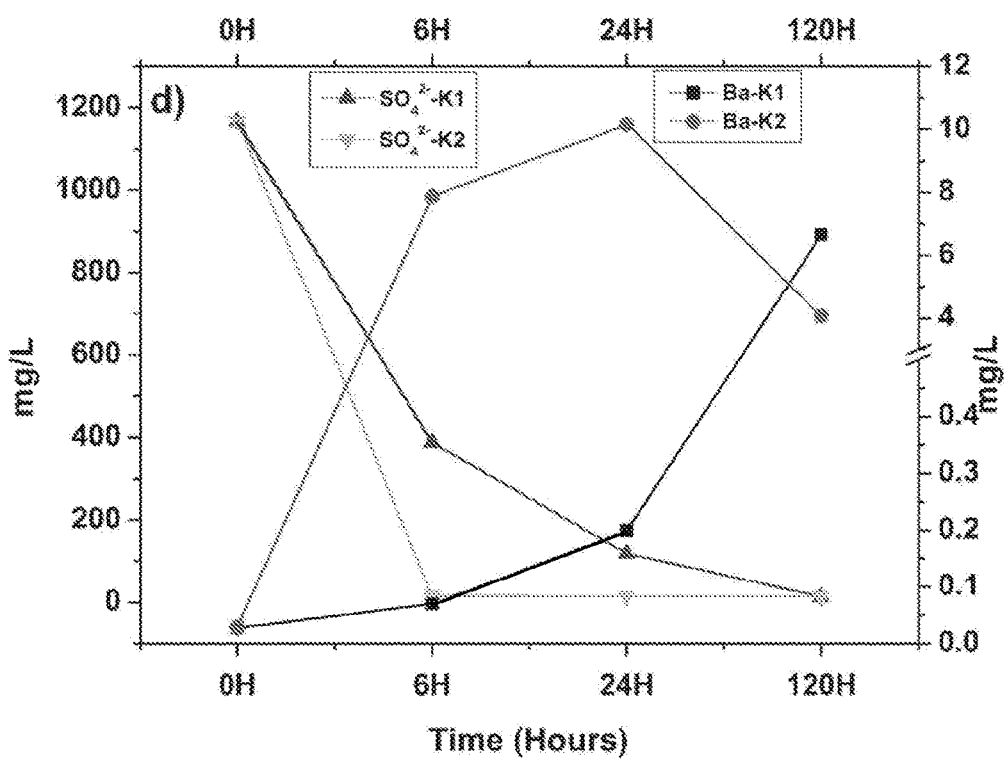
Figure 2E:
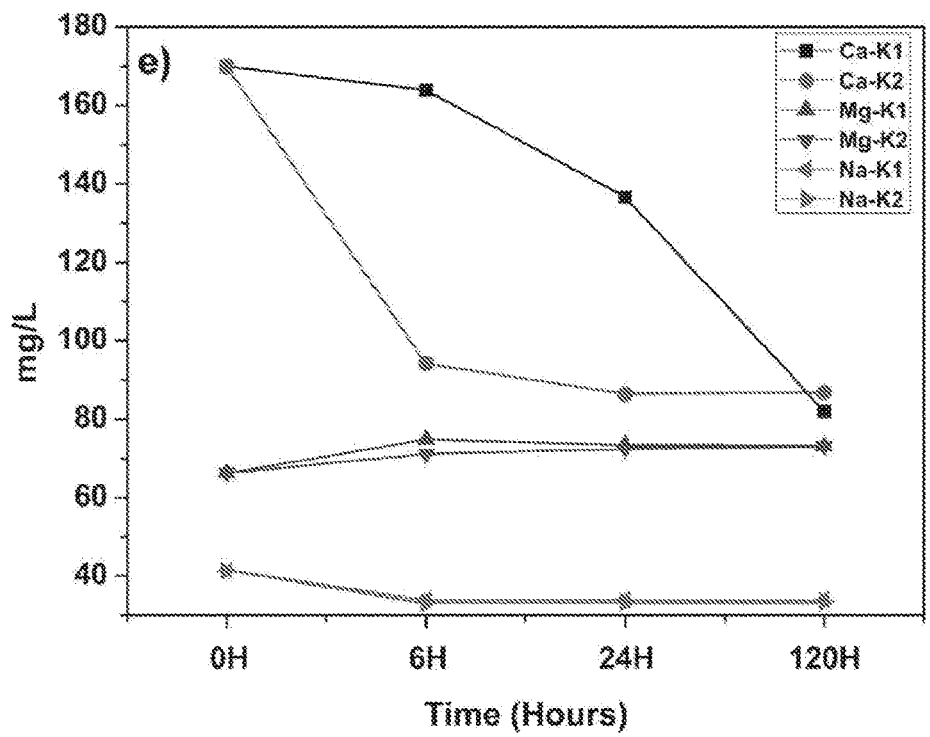
Figure 2F:
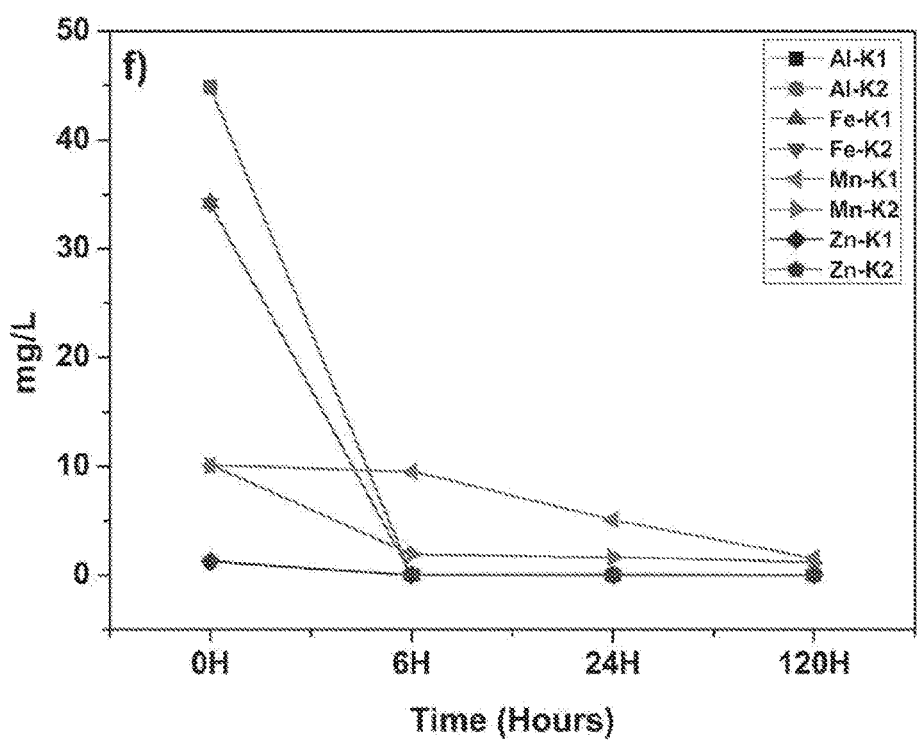

The presently disclosed subject matter will now be described more fully hereinafter with reference to the accompanying Examples, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

EXAMPLES OF THE INVENTION

The invention was performed in accordance with the following steps:

Phase 1: Batch experiments were performed with acid and non-acid mine drainage to showcase the chemical interaction between MDs and barium carbonate.

Phase 2: Lab scale bioreactors were constructed in the form of down flow column experiment filled with barium carbonate dispersed alkaline substrate to treat acid and non-acid mine drainage.

Phase 3: Pilot scale of water treatment plant were designed and installed at two different sites, where acid and non-acid mine drainages were treated.

Phase 1: Batch Experiments
1.1 Introduction:

The Acid Mine Drainage (AMD) generated from pyrite's oxidative dissolution, typically contains high concentration of anions ($SO_4^{2-}$) and metal (mostly $Fe^{3+}>Al^{3+}>Cu^{2+}>Zn^{2+}>Mn^{2+}$) which makes it a significant environmental problem for South Africa, as well as for other mining countries.

The South African mine drainages (MD) is characterized by a wide pH range from acidic (2.6) to alkaline (8). The main reason for this fact is that the host rock contains mainly pyrite and carbonates (such as dolomite). Therefore the MD is characterized by having high salinity (Ca>Mg>Na), hardness and heavy metal concentrations such as $Fe^{3+}>Al^{3+}>Mn^{2+}$ and moderate to low trace metal concentrations such as $Ni^{2+}>Zn^{2+}>Cu^{2+}$.

Therefore, the conventional passive chemical systems based on a $CaCO_3$ or MgO neutralization process are not completely effective for these leachates, because: (1) the acid mine drainage treatment by $CaCO_3$ or MgO allows the neutralization and removal of heavy metals. However, it increases the salinity and hardness in the treated effluent. (2) The low solubility of $CaCO_3$ at high pH limits its use in treating acid and not alkaline drainages. Also the active systems, such as reverse osmosis or GYP-CIX, can remove salinity and hardness. However, the high maintenance costs and the brine generated by the treatment decreases the viability of these systems.

Based on hydrogeochemical characteristics of this type of leachate, many treatment systems have been showcased that are generally based on sulfate-reduction bioreactors. This technology, despite having been optimized in recent years, has not been able to completely remove the high concentration of $SO_4^{2-}$ and it did not decrease salinity and hardness in these leachates. $BaCO_3$ was tested in simple batch experiments in the 1970's due to its dissolution in a wider range of pH (0-9) and due to its capability to precipitate sulfate as $BaSO_4$, but it was not considered viable because the dissolution rate was very low at pH values of 7-10. In the 80's, 90's and again in 2006, $BaCO_3$ was tested as a step in an active process to remove sulphate. However, these studies did not optimize the $BaCO_3$ concentration, residence time nor provided relevant information about the geochemical behaviour of this compound and its use in MD treatment.

Current studies have shown that $BaCO_3$ has a good dissolution rate between pH values of 0-6.5 and that the dissolution rate decreases when pH increases. In addition, it was also shown that $BaCO_3$'s dissolution rate increases with increasing temperature because of its endothermic nature. Moreover, previous studies showed variations between theoretical thermodynamics and experimental results regarding the dissolution of the $BaCO_3$. This knowledge is extended in this research which focused on addressing these issues by conducting a geochemical study with $BaCO_3$ and MD that could explain both its behaviour as well as its potential to remediate these leachates. Understanding these processes will allow the optimization of $BaCO_3$ usage for sulfate removal and its contribution in removing salinity and hardness from acid and alkaline MD.

1.2 Experimental Materials

Two drainages with different hydrogeochemical characteristics from active and abandoned mines were collected from the South African provinces of Mpumalanga (25°42'20.4"S 29°59'28.4"E) and Gauteng (25°50'10.0"S 29°14'03.7"E) which were used as natural reagent solutions for batch experiments. The first drainage was an alkaline mine drainage (AMDE), whose hydrogeochemical characteristics conforms to the average of typical coal mine drainages (high sulphate, salinity and hardness concentration). The second drainage was acid mine drainage collected from an abandoned mine (AMDK), which is characterized by high acidity and pollutant concentration. Each sample was taken on site in polyethylene tanks (ca. 260 L) for further experiments and part of each sample (1 L/AMD) filtered through a 0.45 μm filter within 24 h for chemical analysis.

Alkaline material used in this experiment was $BaCO_3$ (Protea Chemicals Company SA). $BaCO_3$ have a purity of 88.6%. These materials contain impurities including Fe and S as $SO_4^{2-}$, in negligible concentrations.

1.3 Batch Experiment

Batch experiments were conducted to test the interaction of alkaline material with AMDE and AMDK at different time intervals (0 min, 5 min, 15 min, 40 min, 2 h, 6 h, 12 h, 24 h, 36 h, 48 h, 72 h, 96 h, 120 h, 144 h and 168 h) in falcon tubes (50 mL) under continuous mixing in a rotary mixer at 12 rpm and room temperature. Four series of interactions were carried out using solid:liquid (w/w) ratios of 1:400, 1:57 and 1:160, 1:80 for experiments with AMDE and AMDK, respectively. Each interactions will be identified throughout the paper as E1 that refers to the interaction between 40 mL of AMDE and 0.1 g $BaCO_3$; E2 to the interaction between 40 mL of AMDE and 0.7 g of $BaCO_3$; K1 to the interaction between 40 mL of AMDK and 0.25 g of $BaCO_3$ and K2 to the interaction between 40 mL of AMDK and 0.5 of $BaCO_3$. At the end of each time interval, the tubes were removed from the rotary mixer and the supernatant was separated from the solid product by centrifugation at 4000 rpm for 3 min. Finally, the supernatant solutions were filtered through a 0.45 μm filter and the solid product was dried at 40° C.

1.4 Chemical Analysis

The following parameters were analysed on site from the collected samples to avoid the dissolution effects of the $CO_2$ (g) and $O_2$ (g): pH, Electrical Conductivity (EC), salinity (Sal), redox potential (Eh) and temperature (T). The pH, EC, Sal and T were measured with the ExStix®II multi-probe, while Eh was with ExStix®II ORP (Pt and Ag/AgCl electrodes) probe. The Eh measurements were then corrected to standard hydrogen electrode (SHE). Samples were filtered and acidified to pH<2 with $HNO_3$ (2%) and stored at 4° C. for further chemical analysis at the Institute for Ground Water Studies, University of the Free State. Sulfate concentrations were analysed by a portable Hach spectrophotometer (model DR/900 colorimeter) according to the turbidimetric method described in the Hach Procedures Manual-Method Sulfate 608. $Fe^{2+}$ and $Fe_{Total}$ were determined after filtration (0.45 μm) with a Hach spectrophotometer (model DR/900 colorimeter) according to the colorimetric method described in the Hach Procedures Manual-Method Ferrous iron 255 and FerroVer 265. All these chemical analysis also were carried out on site.

The neutralization potential of $BaCO_3$ was determined by treating a sample with a known excess of standardized hydrochloric acid subjected to heat treatment (95° C.). Finally, the amount of neutralizing bases expressed in tons $CaCO_3$ equivalent/thousand tons of material was determined from the amount unconsumed acid by titration with standardized sodium hydroxide.

The $BaCO_3$ was digested by an aqua regia solution ($1HCl:1HNO_3:1H_2O$) at 90° C. for 1 h up to its complete dissolution. Total Element Concentration (TEC) from the digestion, as well as the sub-samples, were analysed by inductively coupled plasma-atomic emission spectroscopy (ICP-AES; Jarrel Ash Atom comp 975). The mineralogical characterization of the final experimental products was carried out by X-ray diffraction (XRD, powder method) using a Panalytical Empyrean diffractometer under following conditions: slit fixed at 10 mm, Cu/Kα monochromatic radiation, 40 mA and 45 kV. Samples were run at a speed of 2°θ/min (5-70°). The spectrum was obtained by Highscore software. In addition, solid samples were also studied using a scanning electron microscope equipped with an energy dispersive system (SEM-EDS; JEOL model GSM 6610).

1.5 Geochemical Modelling

Precipitation of newly formed solid phases by the $BaCO_3$ dissolution could control the fate of the metal concentrations in both the acid and alkaline mine drainage, studied by the batch experiment. The results of the hydrogeochemical analysis from supernatant of each reaction (sub-sample) were modelled by PHREEQC-2 geochemical speciation model using MINTEQ thermodynamic database to predict the aqueous speciation of leachates and saturation indices of solid phases in the experiments [SI=log(IAP/KS) where IAP is the ion activity product and KS is the solubility constant]. Zero, negative or positive SI values indicate that the solutions are saturated, undersaturated and supersaturated, respectively, with respect to a solid phase.

1.6 Results

Results of hydrogeochemical characterization of the AMDs are reported in Table 1. The main difference between the two mine water samples is the pH. The pH values of AMDE and AMDK were 8.2 and 2.93, respectively. In the case of AMDK, low pH values were related to the low carbonate concentration in the host rock, which contain high sulphide concentration. Its intense oxidation and subsequent dissolution of pyrite, produces a large amount of acidity. In the case of the AMDE it had circum-neutral to alkaline pH-values due the low content of sulphide minerals and the presence of carbonate or basic silicate minerals. The carbonate dissolution also contributes to lowering the water quality by increasing the hardness and salinity, which also affects the ecosystem.

TABLE 1

Significant physicochemical parameters of the acid and alkaline mine drainages:

| | AMDE | AMDK |
|---|---|---|
| pH | 8.2 | 2.93 |
| EC (mS m$^{-1}$) | 209 | 170 |
| Redox potential (mV) | 295 | 415 |
| Ca (mg/L) | 256.0 | 169.84 |
| Mg (mg/L) | 138.9 | 66.34 |
| Na (mg/L) | 12.18 | 41.30 |
| Ba (mg/L) | 0.040 | 0.028 |
| Fe (mg/L) | 0.042 | 34.24 |
| Al (mg/L) | 0.019 | 44.89 |
| Sulfate (mg/L) | 1250.0 | 1400 |
| Mn (mg/L) | 0.023 | 10.11 |
| Zn (mg/L) | 0.016 | 1.31 |

The neutralization potential of $BaCO_3$ obtained was 525 tons $CaCO_3$ equivalent/thousand tons of material. The neutralization potential of $BaCO_3$ is lower than calcite which has a high neutralizing capacity of 937.5 tons $CaCO_3$ equivalent/thousand tons of materials. However, the calcite is scarcely soluble at circum-neutral pH (6-7), while $BaCO_3$, despite having a low solubility at circum-neutral pH (6-7) is able to dissolve at pH values of up of 8-9. Total Element Concentration (TEC) confirmed the product data from Protea Chemicals, which indicated that the most significant impurities were S and Fe with values of 0.30% (total sulfur as $SO_4^{2-}$) and 0.004% (Fe total). The average particle size was 1-3 μm.

Preliminary batch experiments were carried out to test the dissolution capacity of the $BaCO_3$ in alkaline and acid mine drainage. The results obtained in these experiments showed a sulfate removal percentage of 90% on average and an increase to pH of 9. The $BaCO_3$ had a higher dissolution at lower pH such as 4-5, whereas, at higher pH such as 8.9 the dissolution of $BaCO_3$ was slower. However, the dissolution of $BaCO_3$ after 24 h showed the same behaviour in both AMDK and AMDE, indicating that the pH does not decrease the dissolution of $BaCO_3$ after 24 h.

The hydrogeochemical evolution as a function of time of the physicochemical parameters such as pH, Eh, EC, Sal, as well as sulfate concentration in the four ratio (w/v) interactions are shown in FIG. 2. The neutralization potential of $BaCO_3$ allowed the pH to increase from 2.93 to 8.27 for the K1 and K2 interactions (0.25 and 0.5 g of $BaCO_3$), and from pH 8.2 to 9.98 on average for the E1 and E2 interactions (0.1 and 0.7 g of $BaCO_3$), respectively. The Eh values decreased from 295 to 67 mV and from 415 to 128 mV on averages, whereas EC decreased to 942 μS/cm and 1091 μS/cm (variation ±5%), for the E1-E2 and K1-K2 interactions, respectively.

The decrease in EC values reflects an improvement in the quality of MDs that was confirmed by the decrease in sulfate concentration in the solution. In the experiments with AMDK all these parameters achieved a steady state in 6 h in both interactions (K1 and K2). The behaviour of $BaCO_3$ was different for the interactions with AMDE (E1 and E2), where a steady state was achieved after 24 h. The sulfate concentrations decreased slowly after 24 h (E 1 and E2 reached 280 and 120 ppm after of 168 h) without achieving a steady state, while in the K1 and 2 interactions, the sulfate concentration was completely removed after 24 h. $BaCO_3$ dissolution was faster in the K2 interaction where the pH increased from pH 2.93 to 6.79 and the interaction was almost immediate. However the Sal and EC evolution was slower.

The evolution of metals and sulfates are closely related to the dissolution rate and the concentration of $BaCO_3$ (FIG. 2). Therefore, optimization and understanding of its behaviours is vital to assess its remediation potential. The interaction with a concentration of $BaCO_3$ larger than 0.1 g (E1) showed higher concentration of dissolved $Ba^{2+}$ at the end of the experiment (0.33, 6.7, 4.1 mg/L in E2, K1 and K2, respectively) which did not react during the experiment. Therefore, the concentration of $BaCO_3$ used in E1 can be considered as the optimum to be used in passive and active systems with a residence time of 24 hours, at most, to get an 86% sulfate removal rate.

The hydrogeochemical behaviour of the cations, such as $Ca^{2+}$, $Mg^{2+}$ and $Na^+$ over time was similar, between E1 and E2, as well as between K1 and K2. Ca decreased drastically within 6 h, the removal reached 97% in the E interactions, but in K interactions took 120 h to reach 51% of $Ca^{2+}$ removal. The concentration of $Na^+$ only decreased 18% in K interactions.

The evolution of metals during the experiment will only be described and discussed with regards to the K interactions, due to the insignificant concentration of metals in AMDE. The concentration of metals in AMDK was as follow, $Al^{3+} > Fe^{3+} > Mn^{2+} > Zn^{2+}$ (44.89>34.24>10.1>1.3, respectively). The removal of $Fe^{3+}$, $Al^{3+}$ and $Zn^{2+}$ were 100%. However the removal of Mn was 66% in 24 h and 86% in 120 h.

Parameters such as EC, Sal and hardness decreased in all the interactions to values below the allowable limits for drinking water (South African National Standard (SANS) 241, 2006; 2011) (FIG. 1). The removal of $SO_4^{2-}$, $Ca^{2+}$ and heavy metals was the main reason for those parameters to decrease. Most of the passive systems are not able to remove $Ca^{2+}$, but increase its concentration (such as the systems based on $CaCO_3$), however this system has demonstrated its effectiveness in removing anions ($SO_4^{2-}$) and cations (mainly $Fe^{3+}$, $Al^{3+}$, $Mn^{2+}$, $Zn^{2+}$ and $Ca^{2+}$) which is also reflected in the concentration of Sal and EC of the drainage.

Figure 3:
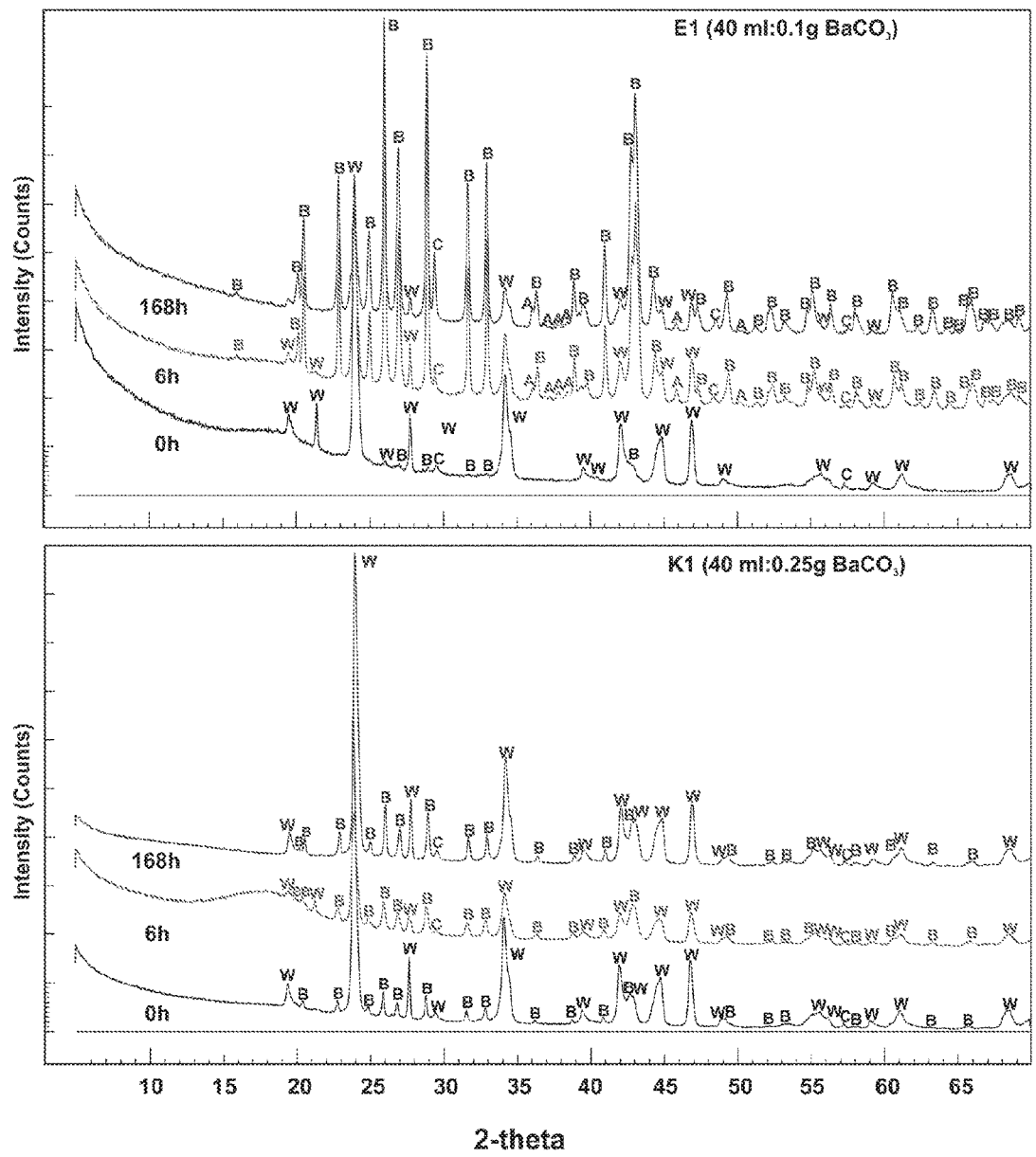
FIG. 3: shows difractograms of E1 and K1 at 0, 6 and 168 h. W: witherite, B: barite, C: calcite and A: aragonite.
Figure 4:
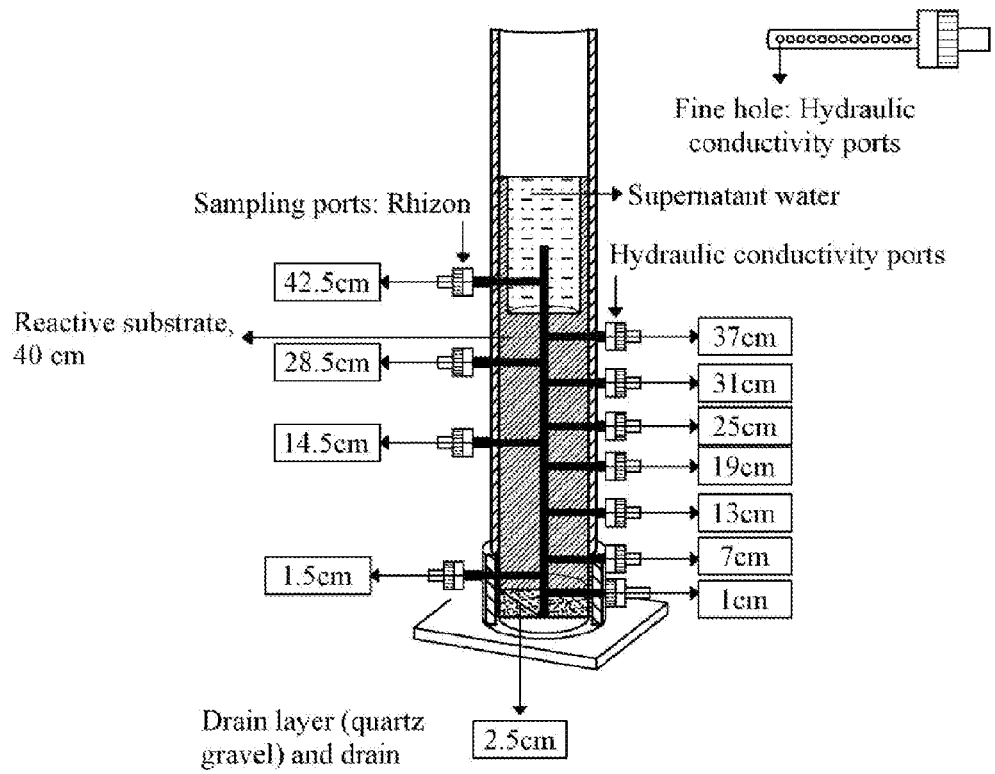
FIG. 4: shows the schema and description of the DAS-BaCO3 bioreactor.
Figure 4:
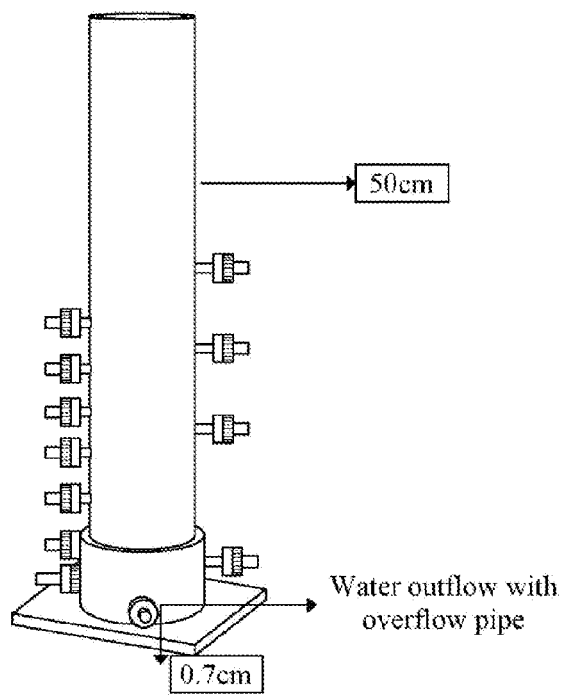
Figure 5A:
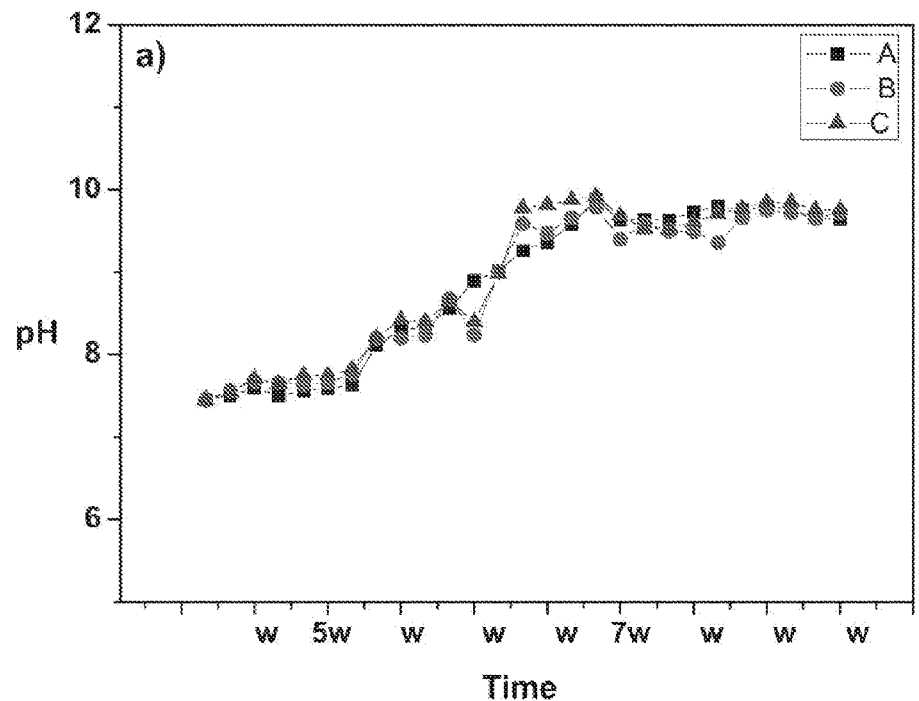
FIG. 5: is a graph depicting physicochemical parameters (pH, sulfates, Sal, TDS, Cond and Eh) of the samples collected from the outlet of the three columns (A, B and C) over time.
Figure 5B:
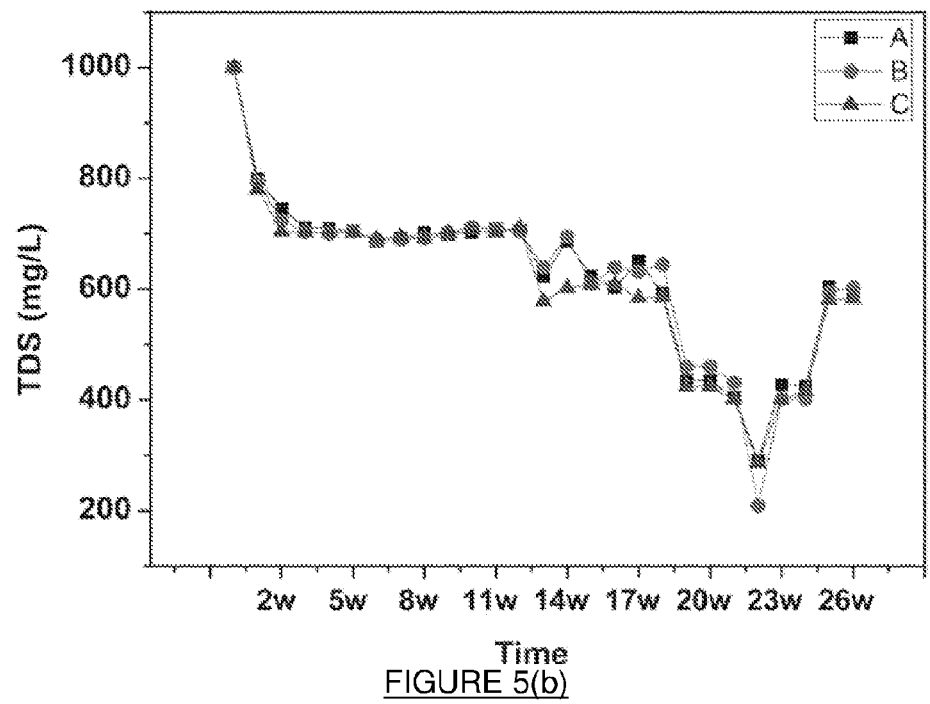
Figure 5C:
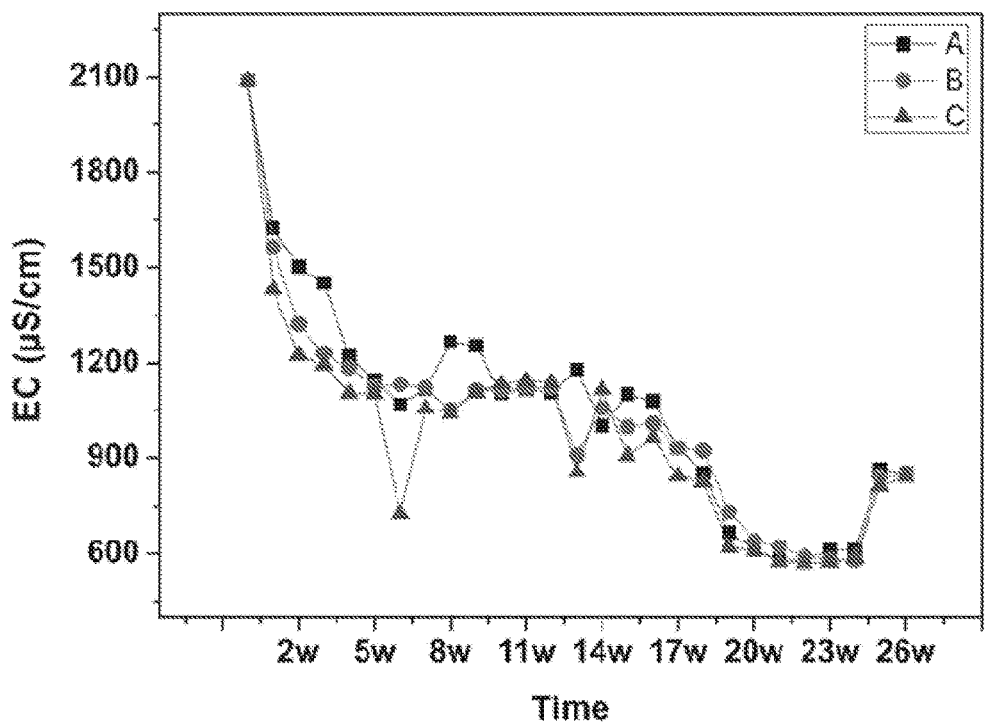
Figure 5D:
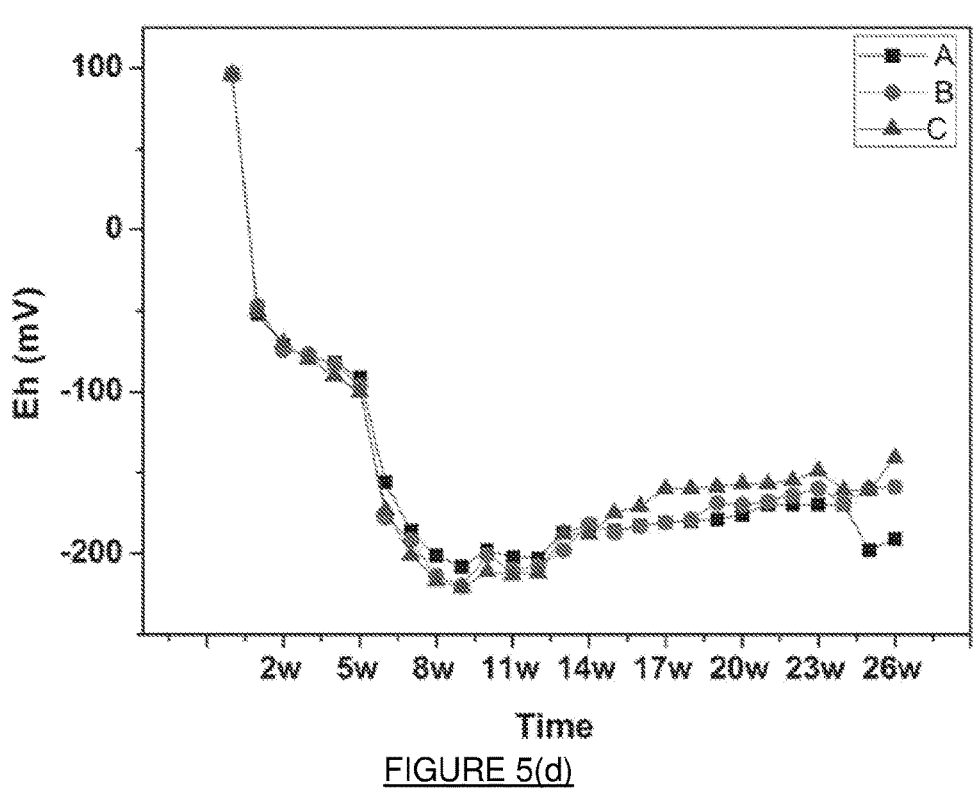
Figure 5E:
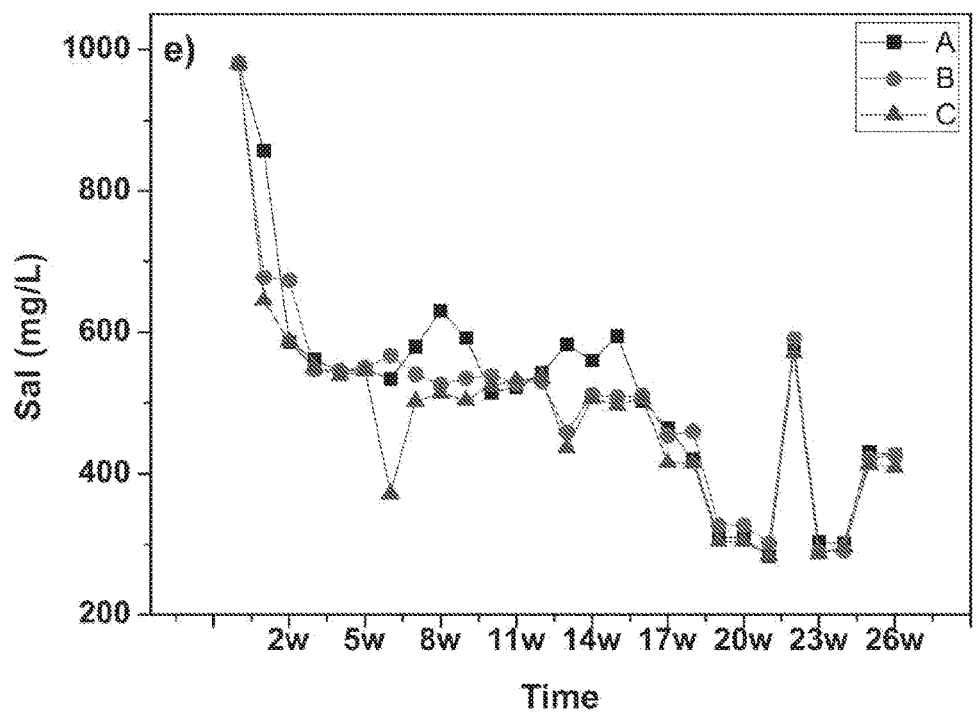
Figure 5F:
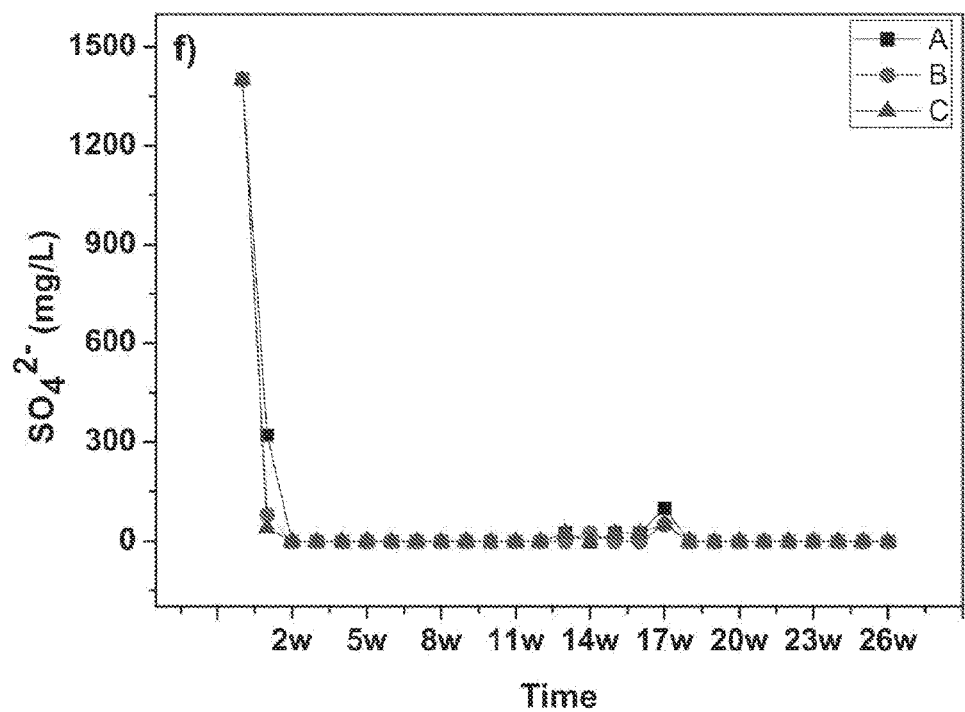
Figure 6A:
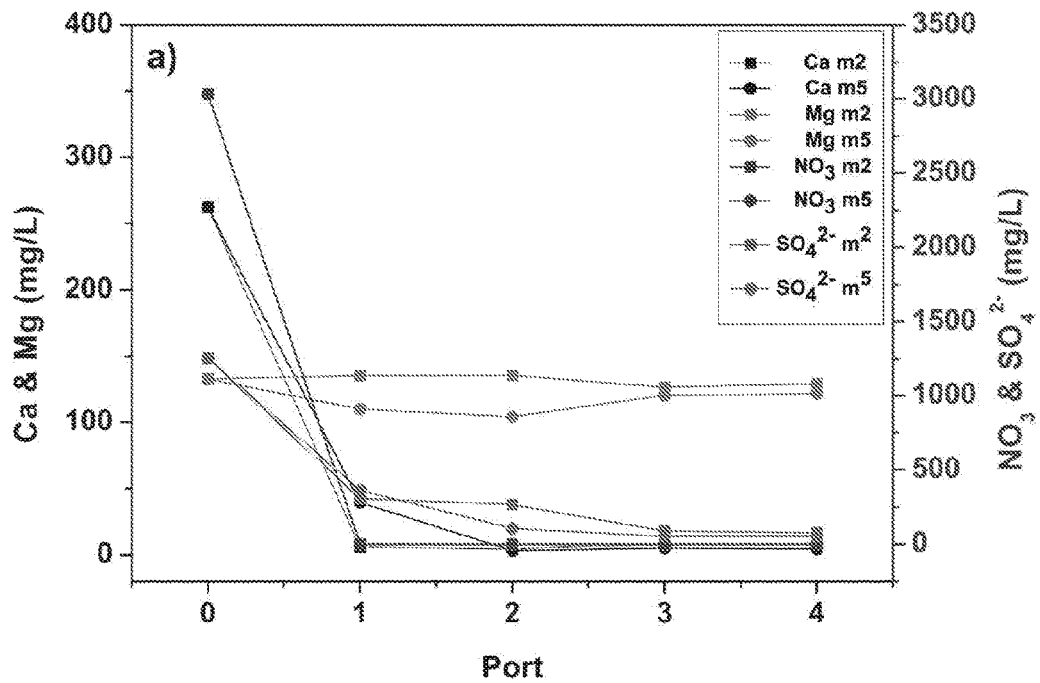
FIGS. 6a to 6c: is a graph depicting the spatial evolution of the main chemical compounds of the water throughout column C, from top (inlet) to bottom (port)
Figure 6B:
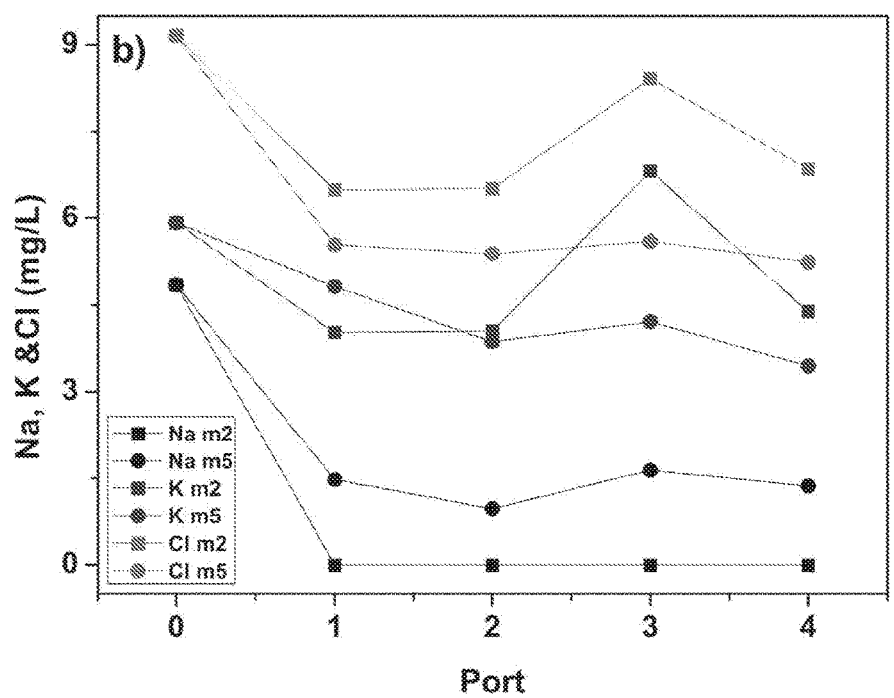
Figure 6C:
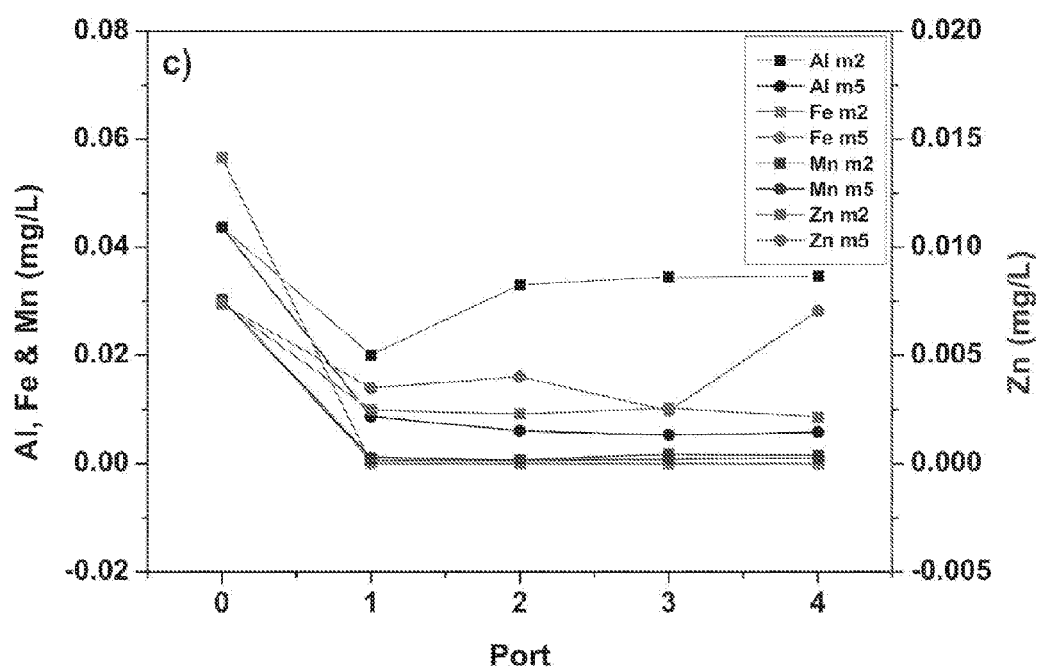

The precipitates collected at the end of the experiment from E1 and K1 interactions, were analysed by XRD (FIG. 3). The analyses showed mainly mineral phases related to the dissolution of $BaCO_3$ as well as to the precipitation of sulfate and $Ca^{2+}$. The geochemical processes involved in the increased of pH, as well as the sulfate, $Ca^{2+}$, $Mg^{2+}$ removal, including $Fe^{3+}$, $Al^{3+}$, $Mn^{2+}$ and $Zn^{2+}$ has been represented by the following equations:

1. Representation of dissolution of $BaCO_3$ in AMD:

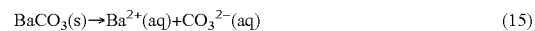
$$BaCO_3(s) \rightarrow Ba^{2+}(aq) + CO_3^{2-}(aq) \qquad (15)$$

2. pH values were increased by releasing OH⁻ radicals and formation of $CO_2$ that could act as a buffer to control the increase of pH.

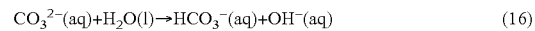
$$CO_3^{2-}(aq) + H_2O(l) \rightarrow HCO_3^-(aq) + OH^-(aq) \qquad (16)$$

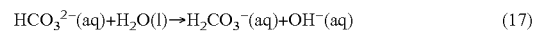
$$HCO_3^{2-}(aq) + H_2O(l) \rightarrow H_2CO_3^-(aq) + OH^-(aq) \qquad (17)$$

3. The increased pH values would allow the trivalent and divalent metals precipitation as oxy-hydroxides and/or oxy-hydroxysulfate of $Fe^{3+}$ and $Al^{3+}$ and carbonates of $Mn^{2+}$ of $Zn^{2+}$, respectively. In addition, the presence of carbonates and bicarbonates in solution would promote the $Ca^{2+}$ and $Mg^{2+}$ removal as carbonates and thus reduce the hardness of these AMDs.

$$Me + HCO_3^- \rightarrow MeCO_3 + H^+ \qquad (19)$$

$$Me + H_2CO_3^- \rightarrow MeCO_3 + 2H^+ \qquad (20)$$

4. While the sulphate precipitate like barite ($BaSO_4$)

$$Ba^+ + SO_4^{2-} \rightarrow BaSO_4 \qquad (21)$$

The estimated percentage of those mineral phases were, according to the contact time (0 h, 6 h and 168 h), as follow: E1: 0 h: witherite (71.2%)>calcite (15.9%)>barite (12.9%); 6 h: barite (63.8%)>witherite (26.5%)>calcite (9.7%); 168 h: barite (65.7%)>calcite (19.2%)>witherite (16.9%). K1: 0 h: witherite (76.2%)>barite (13.5%)>calcite (10.3%); 6 h: witherite (71.4%)>barite (18.9%)>calcite (9.6%); 168 h: witherite (53%)>barite (28.5%)>calcite (18.5%).

However these mineral phases could be masking other sub-idiomorphic or amorphous crystals, mainly in the K interactions, where the metal concentrations were high. This was corroborated by SEM-EDS analyses, where $Fe^{3+}$, $Al^{3+}$ and $Mn^{2+}$ were detected in the precipitates. The thermodynamic simulation with PHREEQC also supported this hypothesis by predicting the precipitation of $Fe^{3+}$ and $Al^{3+}$ as oxy-hydroxysulfate, poorly crystallized according to XRD analyses. This acted as a sink for trace elements and contributed to reaching the requirements for drinking water. The minerals phases of $Mn^{2+}$ and $Zn^{2+}$ were not predicted to be saturated by PHREEQC, however both metals were 100% removed from the AMDs. This again demonstrated that there are several discrepancies between the theoretical thermodynamic fundaments and the real geochemical data acquired throughout the experiment. Finally, the improvement of the quality of the MDs used in the four interactions has been so effective that the final concentration of the sulfates was within the limit allowable for drinking water (South African National Standard 241, 2006; 2011).

1.7 Conclusion

Batch experiments were conducted with the aim to study the behaviour and optimize the use of $BaCO_3$ in MD remediation. Four interactions were carried out with two different MDs and four different ratios (w/w) $BaCO_3$: MD (1:400 and 1:57 with AMDE (alkaline) and 1:160 and 1:80 with AMDK (acid)). Each interaction was composed of 15 sub-samples, each of them with different contact time between MD and $BaCO_3$ (from 0 to 168 h). All the samples achieved a steady state between 6 and 24 h. However the low solubility of the $BaCO_3$ at high pH slowed down the dissolution in E interactions, where the pH reached up 9.98 and the dissolution continued after 168 h. Nevertheless, E1 interaction reached a sulfates removal of 86% between 6 and 24 h. The sulfates and Ca removal were the most meaningful results in E interactions. Moreover, the total metal removal in K interactions was the determining factor for the improvement of the water quality. According to these results, the ratio used in the E1 interaction can be considered as the optimum to be used in systems with a residence time of 24 hours.

XRD and SEM-EDS analyses corroborated the sulfates and metals evolution over time by the identification of crystalline and amorphous mineral phases. The modelling also predicted the precipitation of mineral phases such as barite, calcite and Fe/Al oxy-hydroxides. However there were discrepancies between the predictions and the data acquired from the experiments, such as the removal of Zn and Mn that probably were precipitated as carbonates. Therefore the $BaCO_3$ dissolution varies according to the pH and the composition of the MD. However, at the end of each experiment the water was within the South African National Standard for drinking water.

Phase 2: Column Experiments 2.1 Introduction:

South Africa has 95% of Africa's known coal reserves and the 9$^{th}$ biggest recoverable coal reserves (61000 Mt) in the world where 27400 Mt were proven coal reserves in 2012.

These coal deposits have about 4% of pyrite which is the cause for the coal mine drainage to contain sulphur. However the typical acidity produced by the oxidation of pyrite (equations 22 and 23) and by the subsequent oxidation and precipitation of Fe (equation 24 to 26) is neutralized by the $CO_3^{-2}$ released from the calcite ($CaCO_3$) and dolomite ($CaMg(CO_3)_2$) that is contained in South African's coal; about 6.7% and 10.1% respectively. Therefore, coal mines in South Africa can generate acid, neutral or alkaline mine drainage (MD). When pyrite and other sulfide minerals associated with coal deposits are exposed to water and oxygen, several chemical and biochemical reactions take place.

Oxidation of pyrite can be produced by oxygen (equation 22) or ferric iron (equation 23) in the presence of water. Further oxidation of $Fe^{2+}$ to $Fe^{3+}$ occurs when sufficient oxygen is dissolved in the water or when water is exposed to atmospheric oxygen (equation 24). This reaction is also accelerated by the presence of oxidizing bacteria such as *Acidithiobacillus ferrooxidans*. Ferric iron can either precipitate as $Fe(OH)_3$, (equation 25) or it can react directly with pyrite to produce more ferrous iron and acidity as shown by equation 26. The presence of alkaline compounds such as calcite and dolomite decreases the acidity of the MD by consuming protons ($H^+$) and releasing bicarbonate anion ($HCO_3^-$) as shows the equation 27 and 28.

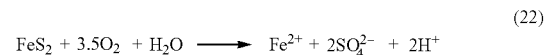
$$FeS_2 + 3.5O_2 + H_2O \longrightarrow Fe^{2+} + 2SO_4^{2-} + 2H^+ \quad (22)$$

$$FeS_2 + 14Fe^{3+} + 8H_2O \longrightarrow 15Fe^{2+} + 2SO_4^{2-} + 16H^+ \quad (23)$$

$$Fe^{2+} + 0.25O_2 + H^+ \xrightarrow{Acidithiobacillus\ ferrooxidans} Fe^{3+} + 0.5H_2O \quad (24)$$

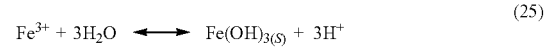
$$Fe^{3+} + 3H_2O \longleftrightarrow Fe(OH)_{3(S)} + 3H^+ \quad (25)$$

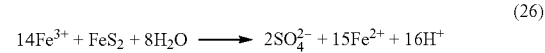
$$14Fe^{3+} + FeS_2 + 8H_2O \longrightarrow 2SO_4^{2-} + 15Fe^{2+} + 16H^+ \quad (26)$$

$$CaO_3\ H^+ \longrightarrow Ca + HCO_3^- \quad (27)$$

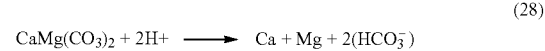
$$CaMg(CO_3)_2 + 2H+ \longrightarrow Ca + Mg + 2(HCO_3^-) \quad (28)$$

Therefore the alkalinity of the coal mine drainage depends, among others, on the ratio between acidic and alkaline minerals of each specific coal deposit and surroundings.

2.2 Case Study

The case study was done on the alkaline drainage generated by a coal mine situated at (25°42'23.2"S, 29°59'32.7"E), that is mining the coal from the north eastern coalfield of the Karoo basin, located outside in Mpumalanga. The MD generated is collected in the evaporation dam located SW within the facility area (25°42'20.4"S 29°59'28.4"E). This MD has a pH of 7.45 and, in contrast, the electrical conductivity (EC), salinity (Sal) and total dissolved solids (TDS) are fairly high (2090 µS/cm, 980 mg/L and 100 mg/L, respectively). The MD has high concentrations of sulfates and nitrates (1 253 mg/L and 3 032 mg/L respectively) as well as dissolved Ca and Mg (262.41 mg/L and 132.60 mg/L respectively).

2.3 State of the Art MD Treatments

Many passive and semi-passive treatments have been developed over the past three decades to remediate MD, such as aerobic and anaerobic wetlands, Anoxic Limestone Drains (ALD), limestone sands, beds, ponds and open channels, diversion wells, reducing and alkalinity producing systems (RAPS), ReRAPS, water-powered devices, windmills, sodium carbonate briquettes, sodium hydroxide, hydrated lime and quick lime. The reactor system that the authors have developed on a laboratory scale is based on a modified Dispersed Alkaline Substrate (DAS) system. The modification includes the substitution of limestone ($CaCO_3$) with barium carbonate ($BaCO_3$) powder. This system, called B-DAS, has been designed with the aim to improve the removal of sulfates by precipitating it as $BaSO_4$ as well as improving the salinity (see reactions below). The aim is extended to find a system that is able to remediate not only acid mine drainage but neutral and alkaline mine drainages as well. $BaCO_3$ easily dissolves at a pH above 4 which makes it ideal to treat these drainages. The MD used in this study has a pH of 7.45 which undergoes the dissolution process as follow; $BaCO_3$ is dissolved (equation 29). Dissolved sulfates can precipitate as barium sulfates (equation 30). The pH is increased to 10 by consuming protons and releasing hydroxide anion (equation 29) and bicarbonate anion (equation 31). The high pH and the presence of bicarbonate anions promote metal precipitation as carbonates (equation 32) (e.g. Ca and Mg):

$$BaCO_3 + H_2O \rightarrow Ba + HCO_3^- + OH^- \tag{29}$$

$$BaCO_3 + H_2SO_4 \rightarrow BaSO_4 + H_2CO_3^- \tag{30}$$

$$BaCO_3 + H^+ \rightarrow Ba + HCO_3^- \tag{31}$$

$$Me + HCO_3^- \rightarrow MeCO_3 + H^+ \tag{32}$$

2.4 Column Experiment

Three down-flow columns were constructed from PVC pipes (10 cm inner diameter, height 50 cm) and equipped with four additional lateral sampling ports. Each port had a small perforated pipe in the column matrix to promote homogeneous samplings and allow homogeneous flow within the columns by increasing the area of sampling while, avoiding, as far as possible, preferential flow.

Each column contained a layer of quartz gravel (particle size about 5-8 mm) at the bottom (2.5 cm). This layer was covered with a 40 cm reactive material layer, which consisted of $BaCO_3$ and wood shaving mixture. Each column had different ratios of wood: $BaCO_3$ (w/w); these were columns (A) 1:2 (260 g:520 g) (B) 1:3 (240 g:720 g) and (C) 1:4 (220 g:960 g).

During the six months of the experiment the down-flow bioreactors, with supernatant open to the atmosphere, were fed with the MD, as input water from the top using a peristaltic pump and flowed down gravitationally. The outflow was collected in a container that also functioned as an aeration and sedimentation tank. The flow rate was 1.09 mL/min with a residence time of 24 hours for each B-DAS columns. The porosity of the systems was 70% (volumetrically calculated).

2.5 Indigenous Bacteria Communities

Several indigenous communities of microorganisms are always present in MDs. These microorganisms are settled into the bioreactors thanks to the conditions promoted by the barium carbonate dispersed alkaline substrate. The dissociation of barium carbonate decrease the oxidation reduction potential and increase the pH, resulting in the favourable condition for the bacterial settling. The woodchips disposed into the bioreactors is used by the bacteria communities as minimal electron donor, while the acceptor donor is the cations and anions dissolved within the MD.

2.6 Wood Chips and Gravel

Both materials were used as the inert material within the column. Both materials provide porosity to the system. The wood chips are the organic matter in the system and it represents a minimal carbon source and support for the bacteria settlement. However, the resin acids, a group of diterpenoid carboxylic acids present mainly in softwoods were reported to be toxic to microorganisms.

2.7 Sampling

During the first week of the columns running, samples were taken daily from the outlet of each column (A, B and C) and after that sampling was done weekly for the next six. Another set of samples were taken monthly from the four sampling ports of each column, to evaluate the spatial evolution of each column during the experiment.

Finally, the columns were drained and column C was cut with an angle grinder to have access to the precipitates formed on the wood shavings. Three samples of precipitates were collected at the top, middle and bottom of the column for further analysis.

2.8 Analytical Techniques

Source water was collected from the evaporation dam in 25 L carboys, transported to the laboratory and stored at 4° C. pH, EC, Sal, TDS, redox potential (ORP) and temperature (T) was measured on site. These physicochemical parameters were also analysed from the columns weekly and monthly. The measures were done with the ExStix®II multi-probe and ExStix®II ORP probe. ORP measures were corrected to the Eh standard hydrogen electrode (SHE). Samples were analysed by ICP at the Institute for Groundwater Studies at UFS, filtered and acidified to pH<2 with $HNO_3$ 2% (v/v), to compare influent and effluent chemistry of the columns. Sulfate ($SO_4^{2-}$), $Fe^{2+}$ and $Fe^{Total}$ concentrations were analysed by a HACH spectrophotometer (model DR/900 colorimeter) according to the colorimetric methods described in the HACH Procedures Manual (Method Sulfate 608, Method Ferrous iron 255 and FerroVer 265, respectively).

The precipitation of newly formed solid phases by the $BaCO_3$ was confirmed by using a thermodynamic model (PHREEQC) as well as by characterizing the final solid products. These saturated mineral phases in the system were estimated, assuming that the initial solution in contact with an alkaline material (in our case $BaCO_3$) reaches equilibrium with that material. The PHREEQC-2 geochemical speciation model (Parkhurst & Appelo, 2005) in conjunction with the MINTEQ thermodynamic database (Allison et al., 1991) was used to determine the aqueous speciation of solutions and saturation indices (SI) of solid phases that could control the concentration of dissolved species in the simulation SI=log(IAP/KS) where IAP is the ion activity product and KS is the solubility constant. Zero, negative or positive SI values indicate that the solutions are saturated, undersaturated and supersaturated respectively, with regards to a solid phase.

2.9 Mineralogical Characterization

The Panalytical Empyrean x-ray diffractometer (XRD) was used under the following conditions: slit fixed at 10 mm, Cu/Kα monochromatic radiation, 40 mA and 45 kV. Samples were run at a speed of 2°θ/min(5-70°) to analyse the precipitates formed. Interpretation of data was done by the Highscore program. Samples were milled previously to a particle size less than 10 micron. Due to the small quantity of sample, a zero-background wafer sample holder was used.

The scanning electron microscope Jeol GSM 6610 equipped with energy dispersive system (SEM-EDS) was used for the analysis, along with Astimex 53 Minerals Mount MINM25-53 standards. The accelerating voltage of the beam during analysis was 20.0 kV with a spot size of 50 and working distance of 10 mm. Sample preparation for this method involves a strip of double-sided carbon tape attached to a glass section. The samples were coated with a thin layer of carbon (±15-100 nm) to prevent charging.

2.10 Results

FIG. 5 indicates that the data of the three columns are similar; the pH increased from 7.5 to 9.8 and the rest of the parameters (TDS, Sal, Cond, Eh, sulfates and iron) decreased from the first sampling performed after 24 hours. $Fe^{2+}$ and $Fe_{Total}$ concentrations were always below detection limit (BDL). The sulfate concentration decreased from 1400 ring/L to BDL after one week. However Sal, TDS and Cond reached the lowest values after four months (from 980 mg/L, 1000 mg/L and 2090 μS/cm to 283 mg/L, 209 mg/L and 576 μS/cm, respectively). The Eh decreased from 296 to 150 mV within the first 24 hours and continued to decrease for two month to −21 mV, thereafter stabilized at about −35±15 mV.

The ICP analysis (Table 2) shows that the concentration of the Ba in the water increased in the first sampling, this is probably because the $BaCO_3$ powder that is not attached to the wood shavings is released into the water, however the Ba concentration decreased and stabilized around 0.7 mg/L thereafter. Most of the compounds started to decrease within 24 hours such as Ca, Mg, Cl, $NO_3$, $SO_4$ and Zn; from 262.4, 132.6, 9.2, 3032, 1253, 0.007 mg/L to 36.8, 97.8, 4.1, 1766, 147 and 0.003 ring/L, respectively (calculated as the average of the three columns). The rest of the compounds, such as Na, K, Al, Fe and Mn clearly started to be removed from the second sampling ($5^{th}$ week) from 4.9, 5.9, 0.044, 0.057 and 0.03 mg/L to 3.1, 5.3, 0.03, 0.008 and 0.002 mg/L, respectively (calculated as the average of the three columns). At the end of the experiment all the compounds were within the limits allowable for drinking water according to SANS 241 (South African National Standard 2006; 2011), except for the Mg that exceed the limit by 15 mg/L. The final removal of each compound is shown in Table 3. The similar evolution of the three columns, allowed for the spatial evolution analysis to be performed in column B and the geochemical characterization of the precipitates in column C.

reactive material of the samples from each port was approximately 6, 12, 18 and 24 h, respectively. The results show that the removal of every compound analysed occurred mainly at port one. The composition of the water at port two, three and four had no significant differences. Therefore, the fast dissolution of the $BaCO_3$ in contact with the MD is displayed. This is also demonstrated by the analysis of precipitates.

2.10.2 Geochemical Modelling

The simulation was based on the physicochemical characteristics of the MD used as the solution in this experiment. Witherite was assumed as equilibrium phase 0, since total dissolution was expected. The predicted precipitates were barite ($BaSO_4$; SI~3.49), calcite ($CaCO_3$; SI~1.25), dolomite ($CaMg(CO_3)_2$; SI~2.50), $Fe(OH)_{3(a)}$ (SI~1.75), hausmannite ($Mn_3O_4$: SI~15.34) and pyrolusite ($MnO_2$; SI~9.85). However, due the low concentration of Fe and Mn, those precipitates could be masked in the XRD analysis.

2.10.3 Mineralogical Characterization

Figure 7:
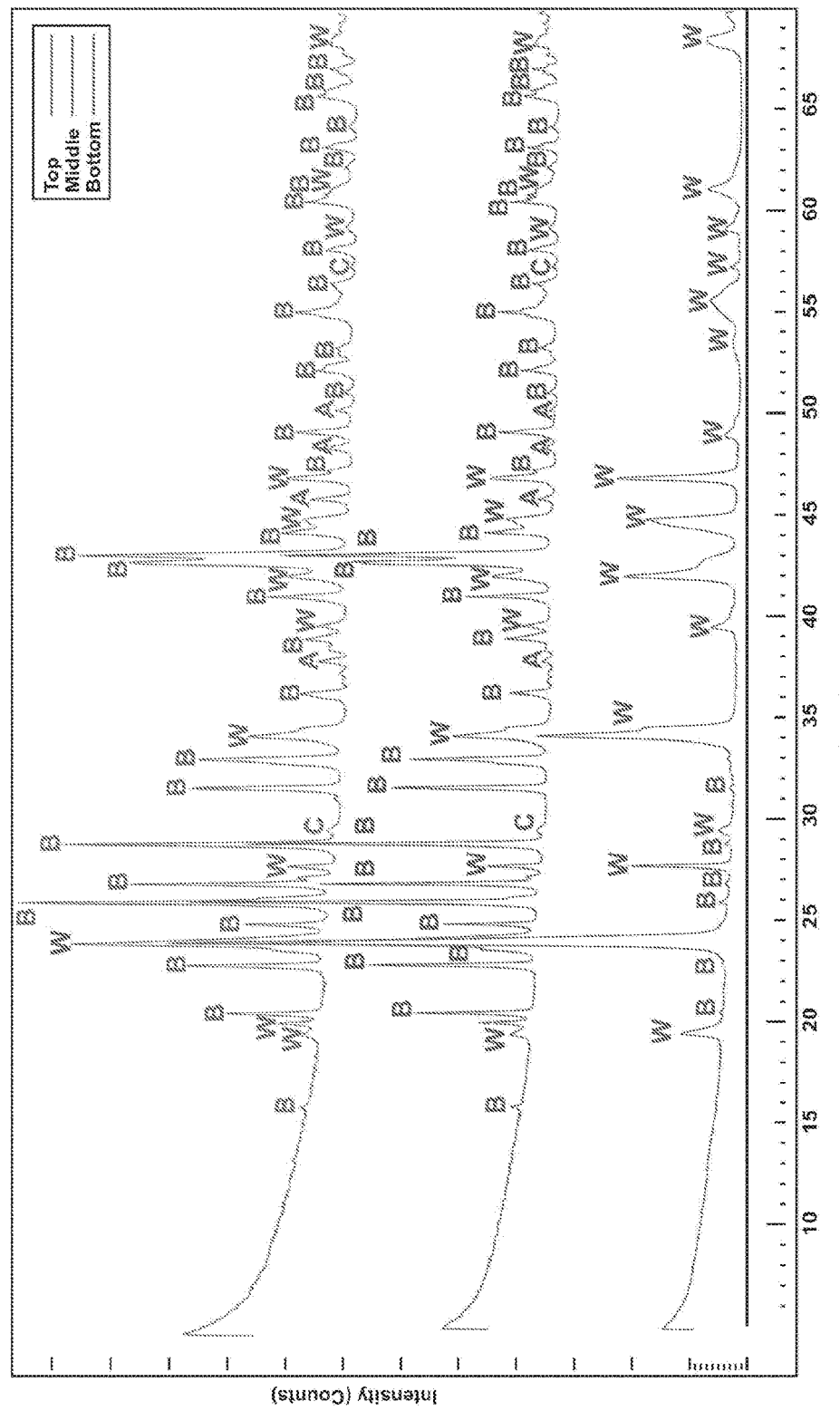
FIG. 7: is a graph depicting XRD difractograms of the three samples.

According to the SEM-EDS analysis of the bottom sample, the composition of most of the crystals were mainly Ba (79-95%), O (4-21%) and some of them also had trace amounts of sulfur (0.5-4%) in the form of clear needles smaller than 5 µm. The XRD analyses determined that those crystals were 95.1% witherite ($BaCO_3$) and 4.9% barite ($BaSO_4$) (red diffractogram in FIG. 7). In the middle sample the concentration of witherite was lower (24.4%); the precipitation of barite increased (56.4%); the precipitation of Ca detected in SEM analysis was confirmed by the XRD analysis where calcite and aragonite where detected (6.4 and 12.8% respectively). However, the precipitation of Mg and K detected by SEM were masked in the XRD analysis, mainly due to the high concentration of barite (green diffractogram in FIG. 7). In the top sample the concentration of witherite and barite were slightly lower (23.4 and 46.7%, respectively), but calcite and aragonite concentrations were higher (7.6 and 22.3%, respectively). In this section of the column precipitates with Al, Fe, Mg, Na, Si, Cl and K were also found.

According to the analysis, the MD dissolves the $BaCO_3$ in the top of the column and releases $Ba^{2+}$ and $HCO_3^-$, both precipitate mainly as $BaSO_4$ and $CaCO_3$. Thereafter, the MD

TABLE 2

ICP water analysis of the main chemical compounds at the inlet and outlet of the columns A, B and C (As, Cu, Cd, Ni, Pb and Cr were always below detection limit (BDL));

| | $NO_3$ | Ca | $SO_4$ | Mn | Na | Fe | Al | Zn | Mg | K | Cl | Ba |
|---|---|---|---|---|---|---|---|---|---|---|---|---|
| INLET Day 1 | 3032 | 262.4 | 1253 | 0.03 | 4.9 | 0.057 | 0.044 | 0.007 | 132.6 | 5.9 | 9.2 | 0.11 |
| Sept A | 1784 | 45.6 | 233.3 | 0.065 | 6.9 | 0.071 | 0.044 | 0.004 | 89.7 | 23.6 | 4.3 | 92.79 |
| Sept B | 1843 | 27.1 | 133.5 | 0.034 | 5.2 | 0.009 | 0.027 | 0.003 | 112.9 | 32.7 | 4.1 | 76.37 |
| Sept C | 1670 | 37.8 | 74.4 | 0.042 | 7.2 | 0.027 | 0.041 | 0.003 | 90.9 | 12.8 | 4 | 77.07 |
| Month 2 | | | | | | | | | | | | |
| Oct A | 1685 | 11.2 | 240 | 0.002 | 2.9 | 0.008 | 0.029 | 0.006 | 132.3 | 4.6 | 5.9 | 0.95 |
| Oct B | 1701 | 9.7 | 218.2 | 0.002 | 3.2 | 0.011 | 0.029 | 0.004 | 137.8 | 5.2 | 5.6 | 1.36 |
| Oct C | 1715 | 10.6 | 253.1 | 0.003 | 3.1 | 0.004 | 0.031 | 0.004 | 133.2 | 6.1 | 5.4 | 1.45 |
| Month 4 | | | | | | | | | | | | |
| Dec A | 2.8 | 5.3 | 116 | 0.002 | 1.4 | 0.024 | 0.006 | 0.002 | 118.2 | 6.7 | 9.6 | 0.67 |
| Dec B | 1 | 5.3 | 71.9 | 0.001 | 1.8 | BDL | 0.002 | 0.004 | 141.8 | 3.7 | 6.3 | 0.80 |
| Dec C | 1.1 | 4.8 | 68.6 | 0.001 | 1.2 | BDL | 0.005 | 0.003 | 118 | 4 | 6.4 | 0.73 |
| Month 6 | | | | | | | | | | | | |
| Feb A | 0.3 | 4.7 | 78.8 | 0.002 | BDL | 0.006 | 0.008 | 0.002 | 111.1 | 4.8 | 6.6 | 0.75 |
| Feb B | 0.3 | 5 | 88.6 | 0.001 | 1.2 | 0.006 | 0.007 | 0.003 | 120 | 4.9 | 7.5 | 0.73 |
| Feb C | 0.3 | 5 | 96.6 | 0.003 | BDL | 0.055 | 0.009 | 0.003 | 113.2 | 11.8 | 14.8 | 0.74 |

TABLE 3 percentage removal of the main compounds in the three columns at the end of the experiment;

| Removal % | $NO_3$ | Ca | $SO_4$ | Mn | Na | Fe | Al | Zn | Mg |
|---|---|---|---|---|---|---|---|---|---|
| Column A | 99.99 | 98.2 | 93.7 | 94.2 | 100.0 | 89.3 | 82.0 | 73.1 | 16.2 |
| Column B | 99.99 | 98.1 | 92.9 | 95.6 | 74.3 | 89.4 | 84.6 | 65.9 | 9.5 |
| Column C | 99.99 | 98.1 | 92.3 | 89.0 | 100.0 | 92.2 | 78.8 | 65.8 | 14.6 |
| AVERAGE | 99.99 | 98.1 | 93.0 | 92.9 | 91.4 | 90.3 | 81.8 | 68.3 | 13.4 |

2.10.1 Spatial Evolution

Two sets of samples from the four sampling ports, named from top to bottom: one, two, three and four, were collected from column B and analysed. The residence time of the MD in the column was 24 h, therefore the contact time with the was already remediated and did not continue to react with the $BaCO_3$ in the column. This is confirmed by the neo-formed minerals found at the top and the middle, whereas the bottom sample still had reactive $BaCO_3$ and no neo-formed mineral phase was found. Furthermore, in the picture of FIG. 7, it can be observed that the bottom of the column is still white due the $BaCO_3$ that remained on it.

2.11 Conclusion

764 L of alkaline coal mine drainage from the site was treated by the B-DAS (Barium carbonate-dispersed alkaline substrate) system in lab scale bioreactors. The aim to remove the high cations and anions concentration as well as the Sal and TDS from this drainage was achieved. According to the water analysis and the mineralogical characterization, the B-DAS system has demonstrated the capacity to remove 93% of sulfates through the precipitation of barite ($BaSO_4$); 98% of Ca by precipitation of calcite and aragonite ($CaCO_3$); remove Mn, Na, Fe, Al, Zn, Mg (93, 91, 90, 82, 68 and 13%, respectively). K and Si were also found in the neoformed precipitates. $NO_3$ was also removed (99.9%) from the MD, but the absence of N in the precipitates and the extremely reductive condition in the bioreactor (Eh about 35 mV) could have promoted the denitrification process. The EC, Sal and TDS decreased about 50-70%.

According to the XRD analysis, after 6 months, column C had about 22% of the $BaCO_3$ at the top and 95% at the bottom of the column. Therefore, the reactive capacity of the $BaCO_3$ could be extended. Neoformed crystals were found in the top and middle samples, but not in the bottom sample, indicating that the dissolution of the $BaCO_3$ and the consequent precipitations took place in less than six hours (estimated residence time of the water in the top section of the column), demonstrating the effective treatment and the capacity of this system.

Nitrate Bioreactor 2.12 Sampling

Samples were taken at the K1 Return Dam (Mine), Kroondal on the 21 Nov. 2014 to perform various tests and experiments on. This mine is a significant primary producer of the platinum group metals (PGMs), which comprise platinum (Pt), palladium (Pd), rhodium (Rh), osmium (Os), ruthenium (Ru) and iridium (Ir). The used mine water is pumped into a return dam and it is reported that sewerage leaches into this dam.

2.13 Water Quality

The water samples were sent to the Institute for Ground Water Studies (IGS) at the University of the Free State to analyse the chemical parameters of the on-site water. The IGS chemical data is presented in Table 4. The chemical compounds indicated in red are over the allowable SANS level for class 1 drinking water.

TABLE 4

IGS water quality results from K1 Return Dam at Kroondal;

| Determinant | K1 Dam | SANS* |
|---|---|---|
| pH | 7.16 | >5.5 |
| ORP | 69 | — |
| Electrical Conductivity (mS/m) | 244 | 170 |
| Salinity (mg/l) | 129 | — |
| Total Dissolved Solids (mg/l) | 1730 | 1200 |
| Fluoride as F (mg/l) | BDL* | 2 |
| Bromide as Br (mg/l) | BDL* | — |
| Chloride as Cl (mg/l) | 184 | 300 |
| Nitrate as N (mg/l) | 123 | 11 |
| Nitrite as $NO_2$ (mg/l) | 15 | 11 |
| Total Ammonia as N (mg/l) | 26 | 1.5 |
| Phosphate as $PO_4$ (mg/l) | 1 | 15 |
| Sulfate (mg/l) | 305 | 500 |

*SANS—South African National Standards 241: 2006&2011 for drinking water class 1
*BDL—Below Detection Limit 2.14 Organic Pollutant Load (On-Site Water)

A Biological Oxygen Demand (BOD) test determines the amount of Dissolved Oxygen (DO) which indigenous microorganisms take up to break down organic material present in water to grow over a period of 5 days. The BOD from K1 Return Dam (Aquarius SA) was as follows:

Before treatment: BOD mg/L=33 mg/L (DOC equivalent of 31 mg/L)

A relatively high 33 mg/L BOD indicates two aspects:
There is a high level of microbial activity and thus counts in the water,
There is an organic donor source, usually considered as contaminants. This confirms the reported sewerage leaching into the return dam.

*E. coli* plate counts as well as Total Coliforms counts were performed on the on-site water sample. The Coliforms counted 1986 cfu/100 mL, where the maximum allowed by the SANS class 1 for drinking water is 10 cfu/100 mL. The *E. coli* tested at 921 cfu/100 mL, where SANS allows less than 1 cfu/100 mL for class 1 for drinking water. The Coliforms thus exceeds the allowed limits and this is also the case for *E. coli*. This bacterial load can however be used to bio-remediate the nitrate in the water if they possess the Nitrate Reductase Genes. The organic pollutant load (sewerage) can serve as a carbon source for denitrifying bacteria in the water to bio-remediate the nitrate pollution.

2.15 Biodiversity of the Indigenous Bacteria

A microbial community can be monitored over a period of time to determine the organisms present for nitrate reduction by using cell counts, denaturing gradient gel electrophoresis (DGGE) and sequence analysis. The electron acceptor, as well as the products formed, is monitored to determine if there is a correlation between the microbial community and nitrate reduction. The biodiversity analyses can further be extended from the regular 16S rDNA genes to functional gene markers for denitrifying bacteria using Nitrate Reductase Genes (nirK and nirS)[8].

The on-site water DGGE and sequencing results were inconclusive and could not identify most of the bacteria, probably due to high genetic contamination in the water. However, the sequencing did identify two organisms, namely *Pseudomonas stutzeri* and *Flavobacterium* sp. *Pseudomonas stutzeri* is a Gram-negative, rod-shaped, motile, single polar-flagellated bacterium found in soil. *P. stutzeri* has the ability to denitrify polluted water[9] as literature indicates that it has Nitrate reductase and Denitrification Regulatory Protein nirQ[13]. *Flavobacterium* is a genus of Gram-negative, non-motile and motile, rod-shaped bacteria that consists of 130 recognized species. These bacteria are commonly found in soil and fresh water and cause disease in trout[10]. The DGGE and sequencing is being optimized and repeated. Based on the DGGE results the indigenous bacteria, especially *Pseudomonas stutzeri*, can be used in denitrifying conditions to remediate the nitrate levels.

2.16 Columns

Two denitrification experiments were conducted using K1 Return Dam water as influent. The experiment had two columns in series. The first column was constructed of 0.5 m PVC pipe with a 110 mm inner diameter with threaded end caps and with taps and appropriate rubber and silicone tubing. Influent water was delivered to the base of reactor using a Watson Marlow peristaltic pump. The reactor was packed with a dolerite matrix with 54.7% porosity. The working volume of the reactor is 1860 ml and was operated with a 1.3 ml/min flowrate to obtain a 24 Hydraulic Retention Time (HRT). $BaCO_3$ was added as a pre-treatment to stabilize the redox chemistry by creating the correct ORP level for nitrate reduction. An up-flow column were constructed from PVC pipe (10 cm inner diameter, height of 50 cm) and equipped with two additional lateral samplings ports. Each port had a small perforated pipe extending into the column matrix to promote homogeneous samplings and allow for homogeneous flow within the columns, by increasing the area of sampling while, avoiding, as far as possible, preferential flow. Each column contained a layer of quartz gravel (particle size about 5-8 mm) at the bottom (2.5 cm). This layer was covered with a 40 cm reactive material layer, which consisted out of a $BaCO_3$ and wood shaving mixture. The ratio of wood:$BaCO_3$ (w/w) were 1:3. If the oxygen levels are low enough for long enough, the aerobic bacteria will die and will be out competed by the denitrification bacteria.

2.17 Carbon Source

The glycerol was selected as carbon source since is cheaper and effective to promote the growth bacterial. The volume added to the reactor was 0.69 mg/L/min.

2.18 Results

Figure 8A:
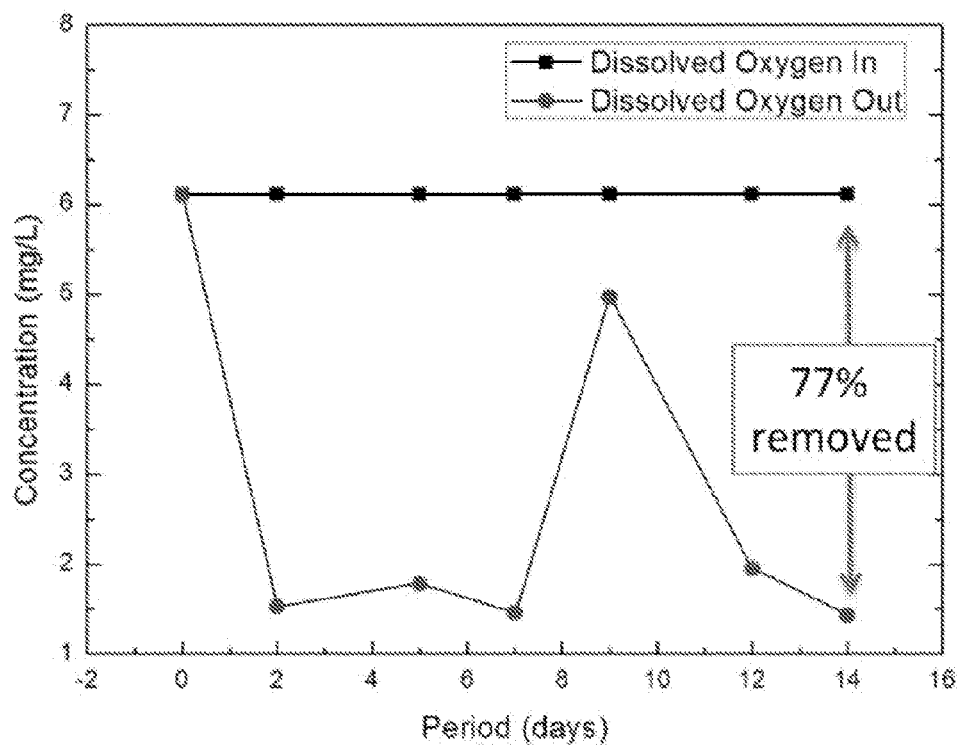
FIG. 8a: shows the dissolved oxygen in a BaCO3 experiment.
Figure 8B:
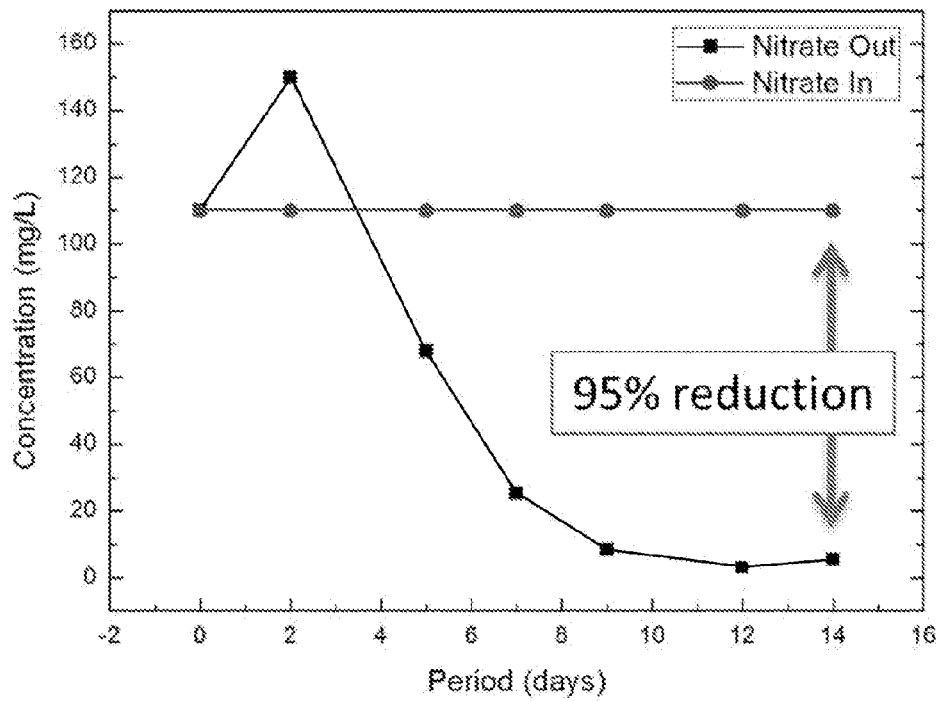
FIG. 8b: shows the nitrate reduction in the BaCO3 experiment.

FIG. 5 illustrate the barium carbonate results. The denitrifying bacteria accordingly reduced the nitrate gradually to 95% on day 14 (FIGS. 8a and 8b). The nitrate is reduced to 5.5 mg/L on day 14 and sulfate reduction by 90% on day 14. These values are within the SANS limits for drinking water. The spike in dissolved oxygen on day 9 (FIGS. 8a and b) had no effect on the nitrate reduction, which indicates that the dominant bacterial specie is therefore denitrifying bacteria.

Cynaide Bioreactor 2.19 Starting Materials

Water samples (about 25 L) were each collected into polyethylene carboys on 2 Dec. 2013 from two sites metallurgy plant: (1) from T #1 Process Tank which was aerated and lime was added to maintain an alkaline pH, and (2) from L dam whose hydrogeochemical characteristics were typical of AMD water. The samples were to be used as feedstock in preliminary lab-scale remediation experiments. The carboys were stored at 4° C. until use.

Samples (50-500 ml) were also taken from both sites as well as the as the clarifier tanks and filtered through a 0.45 μm Teflon filter within 24 h of collection for chemical analysis.

2.20 Bioreactor Columns

Two DAS bioreactors connected in series were used to treatment of MDs. Due to the low pH, L dam water was treated with twin DAS bioreactor. While, a DAS bioreactor was bio-augmented with an inoculum of sulfate reducing bacteria, followed for an activated charcoal cartridge and DAS bioreactor were used for the T water sample. Samples of effluents from each reactor were collected after 24, 72 and 120 hours for analysis.

The DAS bioreactor used in this study were similar to the bioreactors already descripted above. The bioreactor that was bio-augmented had similar appearance and configuration as the DAS bioreactor with 4 (27.5 cm distance) and 7 (13 cm distance) lateral portals on either side of the column. The main differences were that this column had 1 meter height and contained a mixture of 60% wood chips 20% $BaCO_3$, and 20% bacterial inoculum. The space occupied by these materials in the column was 80 cm and it is used in down-flow bioreactors. The porosity of the systems was volumetrically calculated. The column was filled with sample water to cover the reactive material and then the volume of water that was used was measured. The initial flow rate for either column was 1.09 ml/min (1.4 L/day) with a residence time of 24 hours for the DAS bioreactor and 24 hours for bioreactor bio-augmented. However, the flow was increased to 5 L/day throughout the experiment.

2.21 Results 2.21.1 Characterization of Water Samples from #1 T Process Plant and L Dam The initial parameters of #1 T process tank and the L dam, determined using hand-held probes as well as laboratory assays are displayed in table 5. As expected, the T water had an alkaline pH due to the addition of lime. The water sample also contained 436 μg/L $CN_{WAD}$ and approximately 1800 mg/L $SO_4^{2-}$. On the other hand, the L AMD water was acidic, contained approximately 164 μg/L $CN_{WAD}$, 8100 mg/L $SO_4^{2-}$ and 504 mg/L $Fe_{Total}$.

TABLE 5

Parameters of water samples from #1 T process tank and L dam;

| Parameter | #1 T process tank | L Dam |
|---|---|---|
| pH | 8.5 | 2.35 |
| Conductivity (mS/cm) | 3.57 | 8.40 |
| Salinity (mg/L) | 1800 | 3770 |
| TDS (mg/L) | 2470 | 6000 |
| $SO_4^{2-}$ (mg/L) | 1800 | 8100 |
| Cyanide$_{WAD}$ (μg/L) | 436 | 164 |
| $Fe_{Total}$ (mg/L) | 2 | 504 |
| $Fe^{2+}$ (mg/L) | 2 | 12 |

2.21.2 #1 T Process Tank (DAS Bioreactor Bio-Augmented (SRB-DAS) and DAS Bioreactor (BDAS))

The process flow for treatment of the T water sample was as follows: Sulfate reducing bacteria (SRB) DAS→activated charcoal cartridge→DAS bioreactor (BDAS)→final effluent. This flow direction was employed because the pH of the water (8.5) was within the limits tolerated by the SRB (pH 5-9). Moreover, the pH is within the bioreactor is stable since the precipitation of metal sulfides generate acid or release hydrogen ions which decrease the pH minimally to around pH 6-7, enough to generate optimal growth conditions for SRB. The activated charcoal cartridge was included to investigate its effect on the removal of the odour associated with $H_2S$ production as well as the removal of contaminants.

The efficiency of the SRB-DAS was investigated for $SO_4$ removal from the T water feed. After 24 hours of treatment, $SO_4$ was not detected in the samples collected, indicating a 100% removal. A minimal $SO_4$ concentration of 6 mg/L was measured after 120 h; however, this residual $SO_4$ was mopped up after passing through the DAS column. No sulfate was detected in the final sample collected from the DAS column at the end of the experiment (Table 6).

Figure 9:
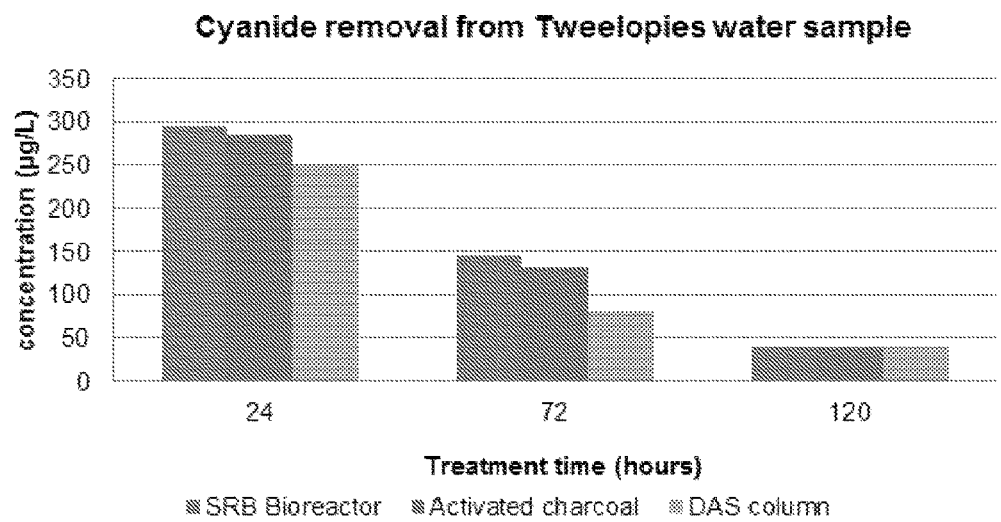
FIG. 9: is a graph showing cyanide removal from a treated sample after 120 hours of flow through SRB-DAS-activated charcoal cartridge-BDAS.

Approximately 30% of the cyanide concentration in the sample was degraded with the first 24 hours of treatment with the SRB-DAS and, a further decrease of up to 42% was observed after flowing through the cartridge and BDAS. This significant decrease suggested that the microbial consortium in the bioreactors were capable not only of sulfate removal but also cyanide degradation. The observation that cyanide degradation proceeded faster in the SRB-DAS compared to the DAS bioreactor was a possible indication that the microorganisms were also involved in cyanide degradation improving the prospect of investigating larger volumes and higher water flow rates. After 120 hours, the cyanide concentration in the final effluent had decreased from 436 μg/L to 41 μg/L; below SANS recommended levels (FIG. 9). These values obtained corresponded to a 90.6% removal of cyanide from the T water sample.

The ferrous and total iron concentrations decreased up to 0.12 mg/L, which were below the SANS recommended standards for drinking water. Moreover, there was a decrease of approximately 50% in the measurements of electrical conductivity, salinity, and TDS. Although the results were slightly higher than the recommended levels, the trend observed after 120 hours showed a steady decrease in the measured values which might indicate a possibility of the parameters reaching acceptable levels. However, we were unable to obtain more data points as the experiments had to be halted due to the limited water sample available.

TABLE 6

Parameters measured after 120 hours remediation of water from #1 T process tank, compared with SANS standards. The values highlighted in green were within the limits of SANS recommended levels;

| Parameter | #1 T process tank | SRB-DAS + BDAS | SANS recommended levels for drinking water |
|---|---|---|---|
| pH | 8.5 | 6.7 | 5.5-9.7 |
| Conductivity (mS/cm) | 3.57 | 1.87 | ≤1.70 |
| Salinity (mg/L) | 1800 | 927 | — |
| TDS (mg/L) | 2470 | 1304 | ≤1200 |
| $SO_4^{2-}$ (mg/L) | 1800 | 0* | ≤500 |
| Cyanide$_{WAD}$ (μg/L) | 436 | 41 | ≤70 |
| Fe$_{Total}$ (mg/L) | 2 | 0.12 | ≤2 |
| $Fe^{2+}$ (mg/L) | 2 | 0.12 | — |

*$SO_4^{2-}$ had been completely removed from the effluent after 24 hours.

2.21.4 L Dam (Twin BDAS)

The evolution of the L dam water sample after 120 h is shown in Table 3. The results obtained showed that the twin BDAS were very effective in removing $SO_4^{2-}$, $Fe^{2+}$ and $Fe_{(Total)}$, as well as neutralizing the pH and adjusting the conductivity, TDS and salinity closer to SANS acceptable standards. Complete removal of $SO_4^{2-}$ and 99% removal of $Fe_{(Total)}$ were achieved within 24 h of water flow through the first BDAS column. In addition, there was at least a 50% decrease in conductivity and TDS after the first bioreactor and 65% after the bioreactor column. These parameters were less than twice the acceptable limit compared to the original sample which was 5 times the acceptable limit (Table 7). The cyanide concentration decreased by 69.4% from 164 μg/L to 50 μg/L, below recommended levels.

Although the bulk of contaminant removal took place in the first bioreactor, the attachment of a second bioreactor allows for an increase in water flow rate meaning more volumes of water can be treated while the longevity of both bioreactors is extended. Based on results from previous experiments where AMD with similar characteristics to the L water were evaluated for 5 months, our treatment is stable and will yield similar results in pilot scale treatment processes.

TABLE 7

Evolution of L Dam AMD sample after 120 hours remediation with BaCO₃-DAS columns whereby the values highlighted were within the limits of SANS recommended levels;

| Parameter | L Dam | BDAS Bioreactor #1 | BDAS Bioreactor #2 | SANS levels for drinking water |
|---|---|---|---|---|
| pH | 2.35 | 6.83 | 7.09 | 5.5-9.7 |
| Conductivity (mS/cm) | 8.40 | 3.58 | 2.94 | ≤1.70 |
| Salinity (mg/L) | 3770 | 1750 | 1440 | — |
| TDS (mg/L) | 6000 | 2470 | 2050 | ≤1200 |
| $SO_4^{2-}$ (mg/L) | 8100 | 0* | 0* | ≤500 |
| Cyanide$_{WAD}$ (μg/L) | 164 | 59 | 50 | ≤70 |
| Fe$_{Total}$ (mg/L) | 504 | 0.51 | 0.84 | ≤2 |
| $Fe^{2+}$ (mg/L) | 12 | 0.45 | 0.3 | — |

*$SO_4^{2-}$ had been completely removed from the effluent after 24 hours.

Phase 3: Pilot Scale of BDAS System (Alkaline MD Bioremediation Construction and Running)

3.1 Installation and Construction

The environmental impact of mining was evaluated for 5 days. In this visit, a scientific and engineering team firstly located the main sources of pollution and conducted a mapping of the area in order to know the characteristics of the terrain. This helped us to plan the distribution of the treatment system in the selected location.

The starting alkaline materials, such as $BaCO_3$, were purchased from Protea Chemicals Company. $BaCO_3$ have a purity of 88.6% according to Protea Chemicals. Moreover, these materials contain major metals such as Fe and $SO_4^{2-}$ but in negligible concentrations.

The environmental media contaminated with a source of MD crosses two decanters in a residence time of 12 hours and finally is evacuated in a unique flow rate of 4.8 L/min towards the aeration system (cascade). The decanters play a vital role in the precipitation of salts, TDS and solids suspended.

Figure 10:
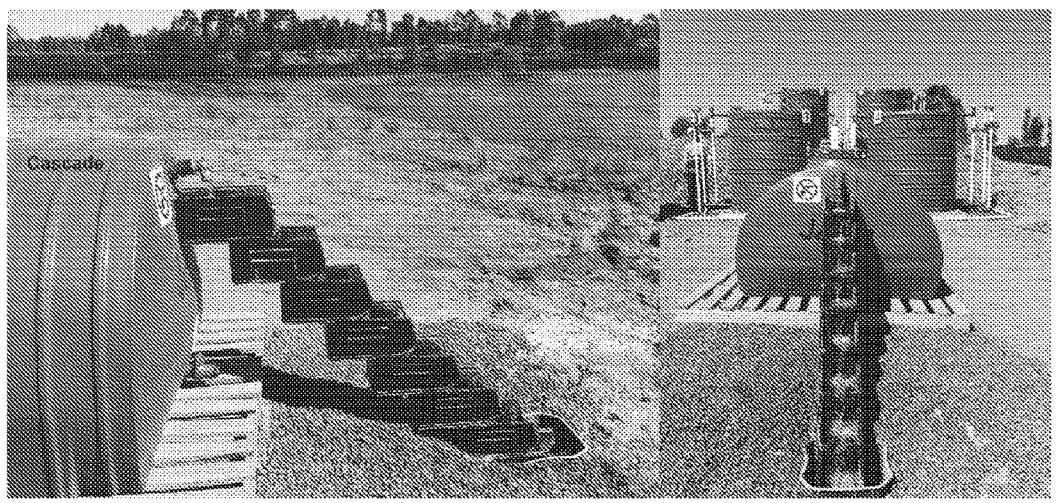
FIG. 10: shows a cascade for aerating the system.
Figure 11:
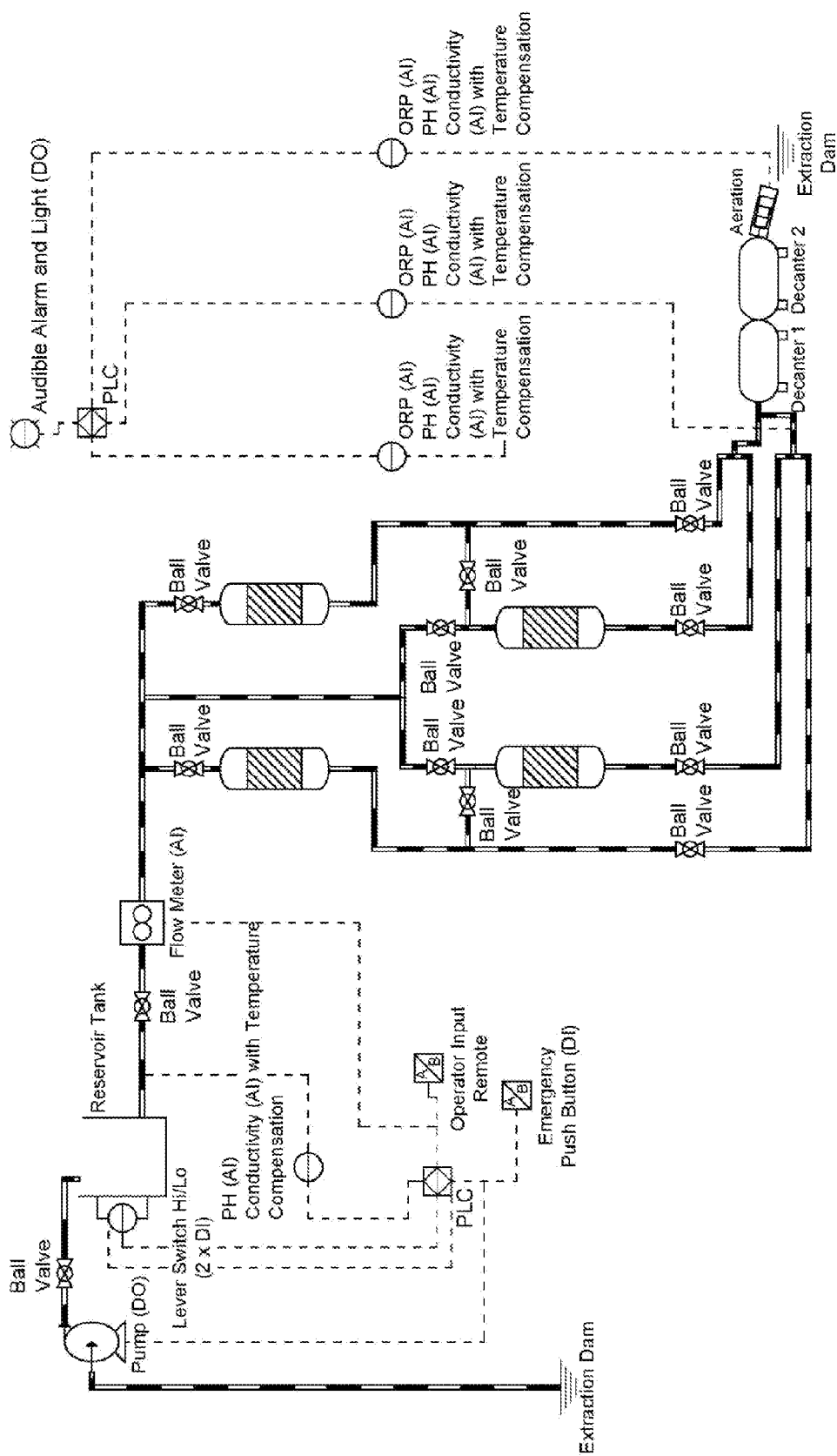
FIG. 11: shows the integration of the PLC system with the whole pilot plant.
Figure 12A:
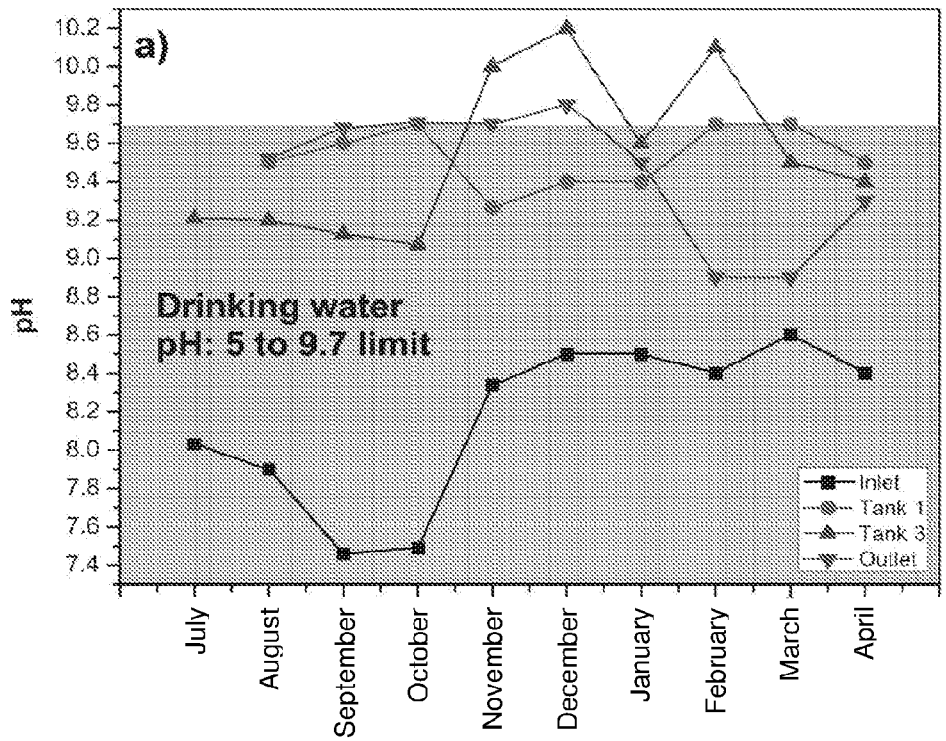
FIG. 12a: is a graph depicting the variation of pH over time as obtained from chemical analysis of the treated media.
Figure 12B:
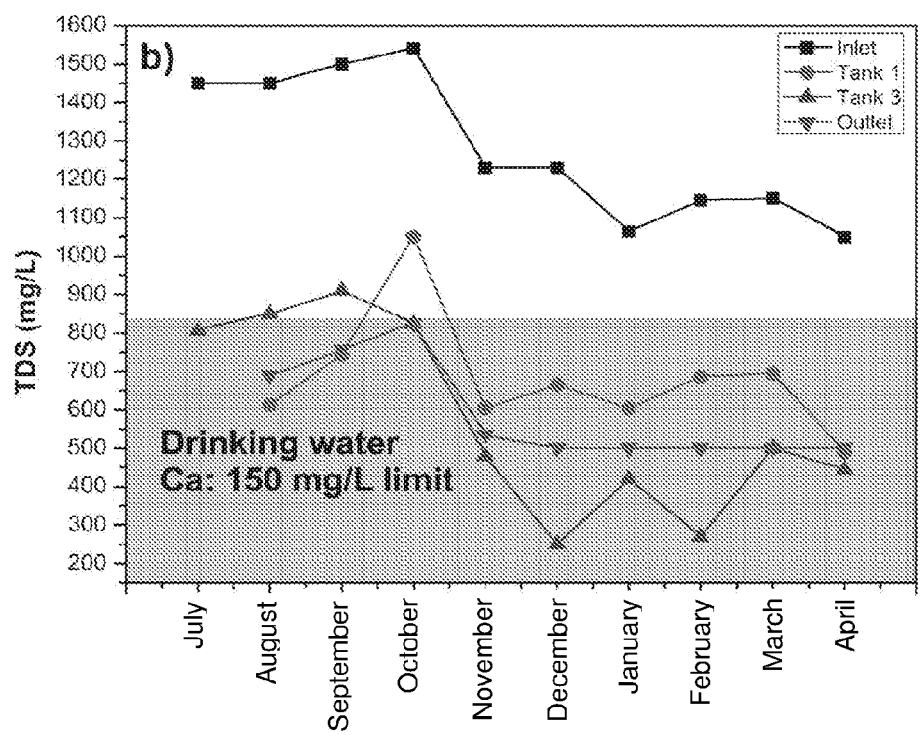
FIGS. 12b and 12c: is a graph depicting data from chemical analysis of the treated media.
Figure 12C:
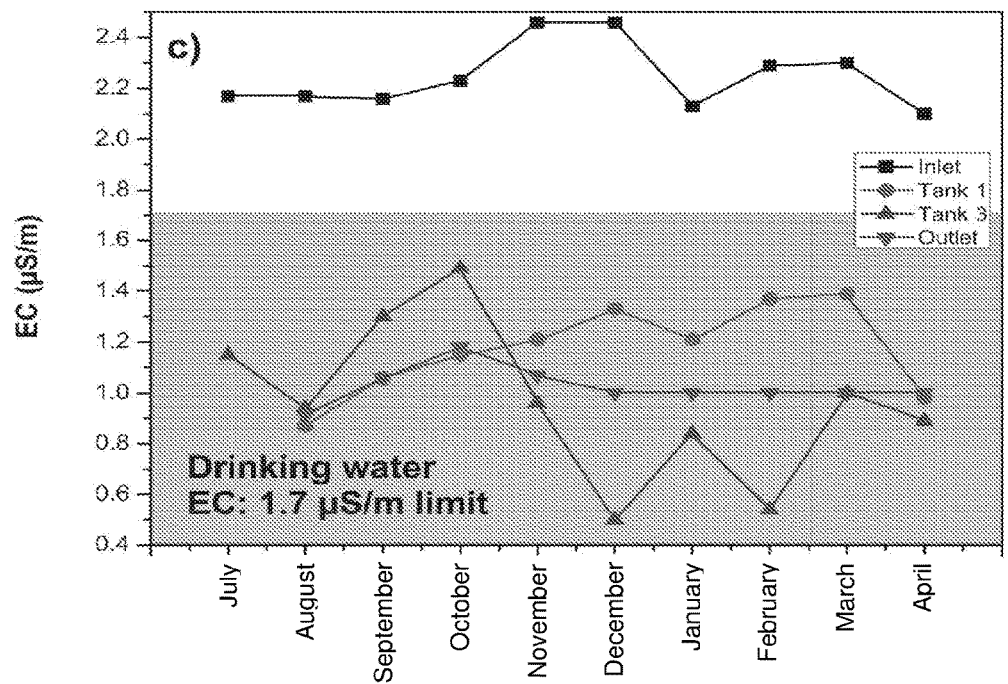
Figure 12D:
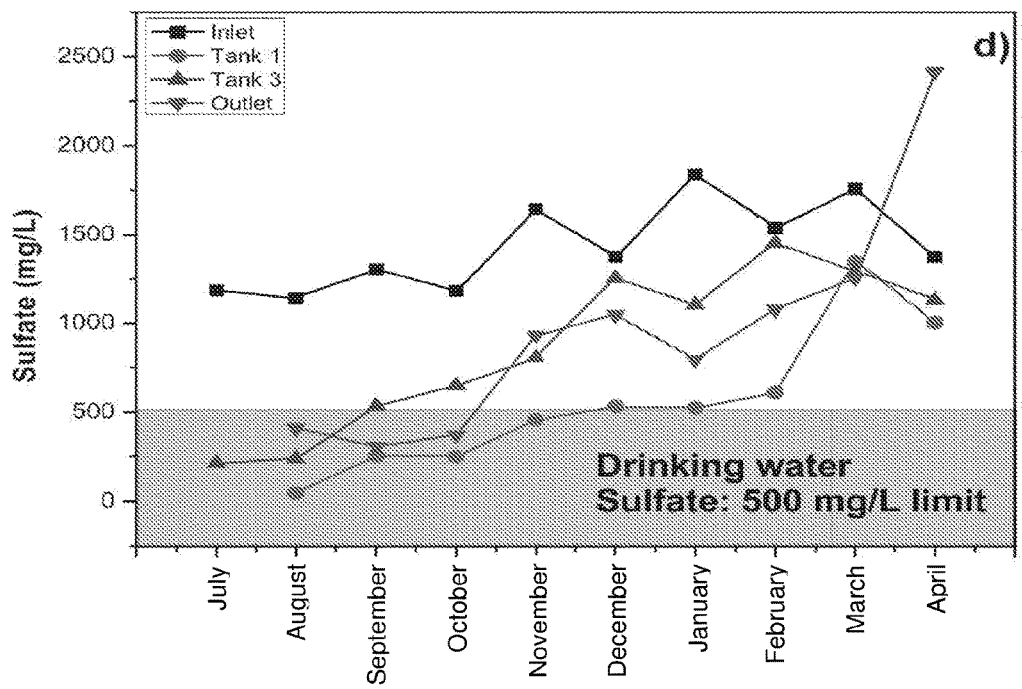
FIG. 12d: is a graph depicting sulfate concentration over time as obtained from chemical analysis of the treated media.
Figure 12E:
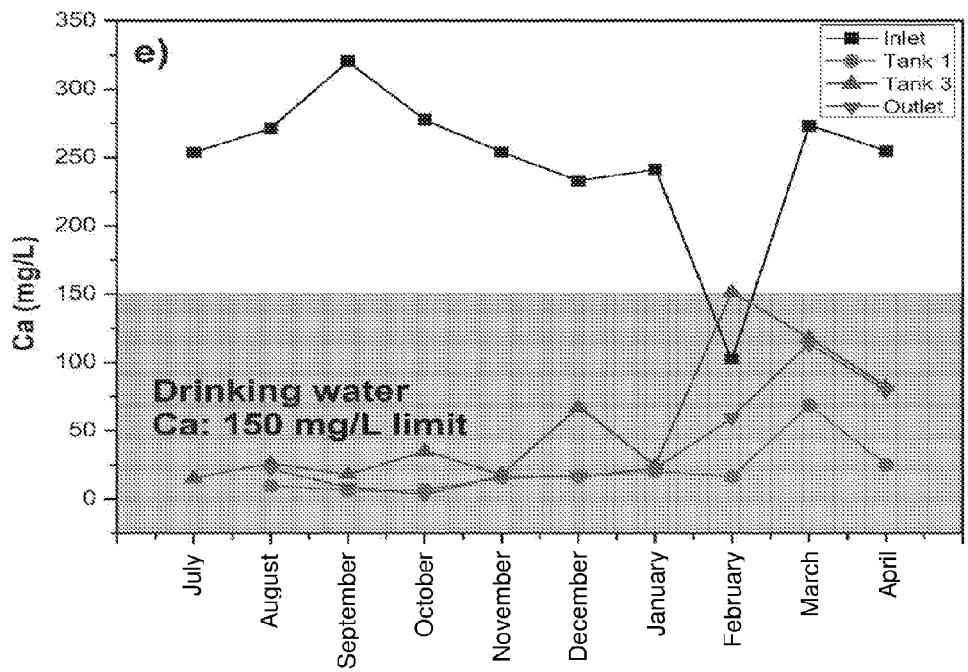
FIGS. 12e to 12h: is a graph depicting data from chemical analysis of the treated media.
Figure 12F:
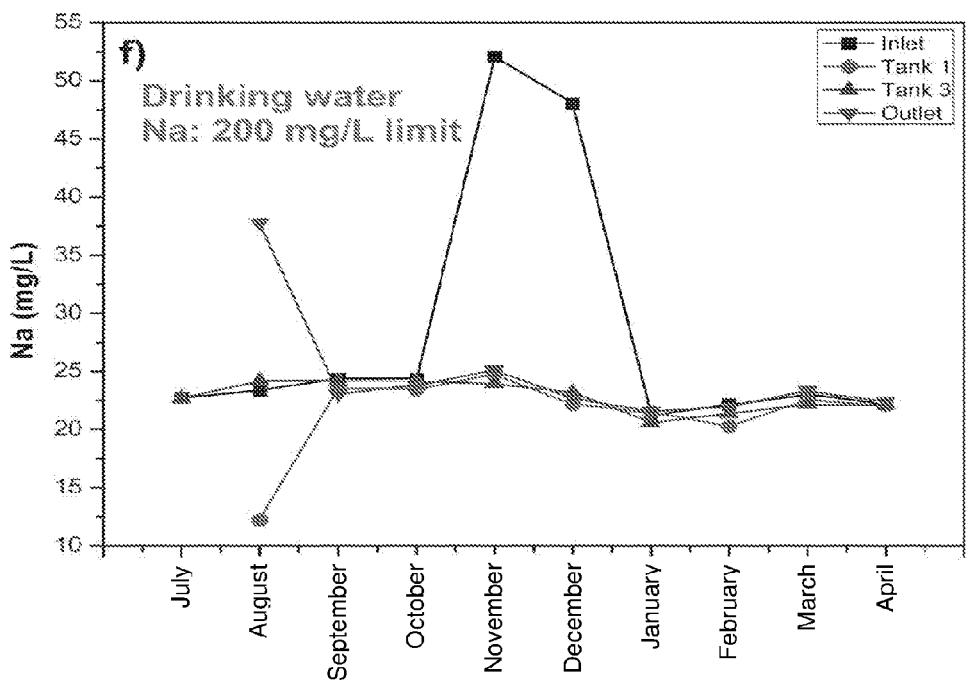
Figure 12G:
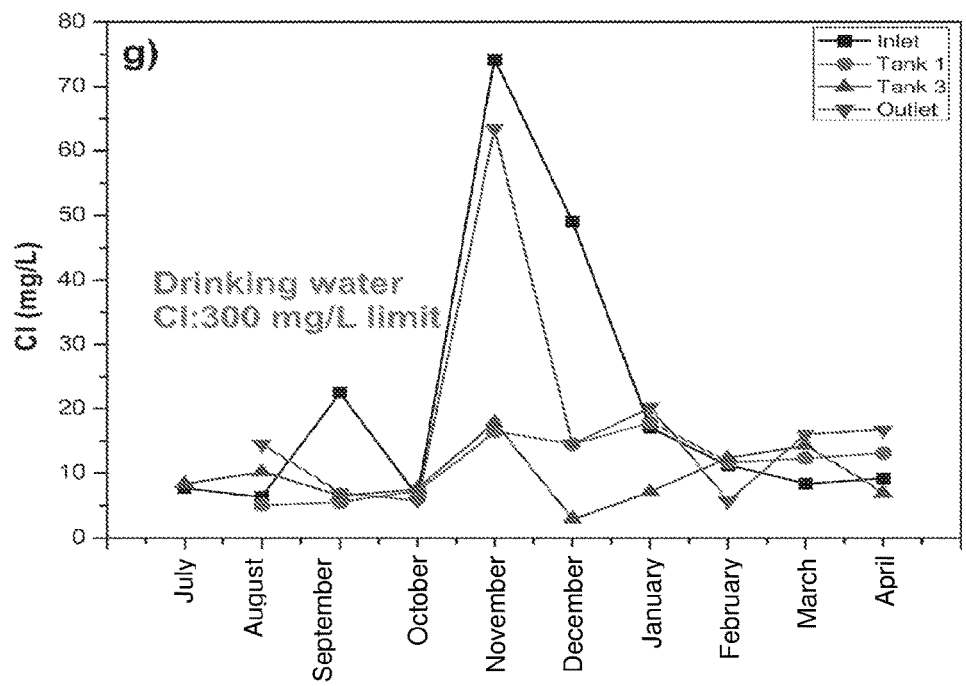
Figure 12H:
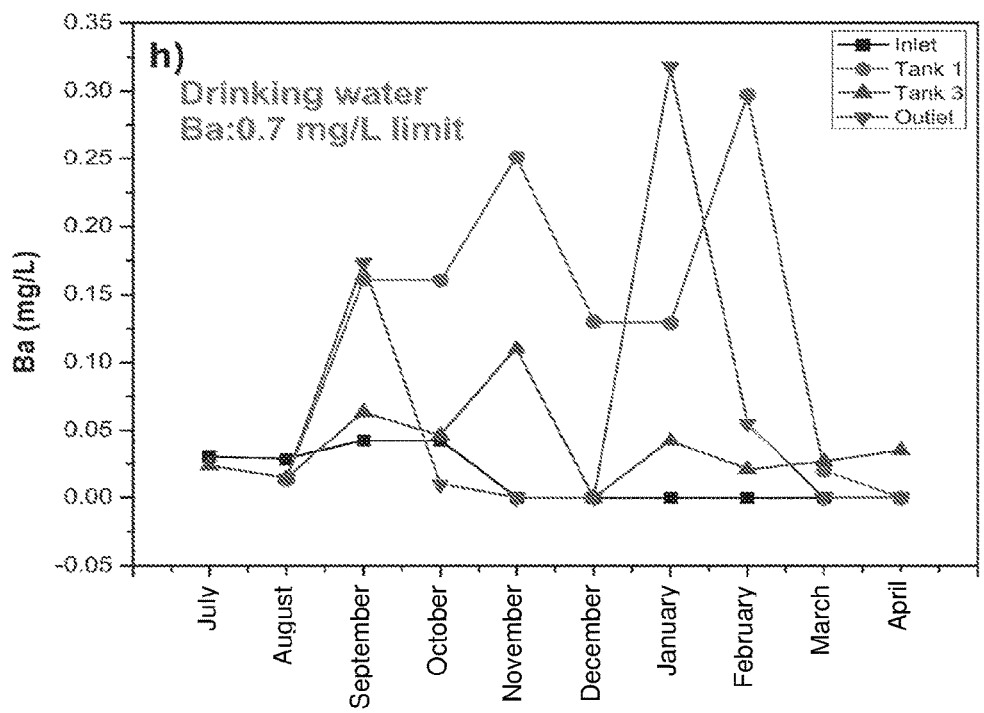

FIG. 10 shows the cascade system that the reaction occurring in the reactor consumes oxygen. Therefore, an aeration system is needed to recover the lost oxygen and to stabilize the pH. This system consists of an open channel cascade that allows the fall of water. Along this cascade, bubbles are formed allowing environmental media contaminated with a source of MD to interact with oxygen and $CO_2$ to acidify the environmental media contaminated with a source of MD and stabilize its pH. In addition, a second site visit was used to install PLC systems to measure the pH and Conductivity of the system at various stages. FIG. 11 shows the integration of the PLC system with the whole pilot plant.

3.2 Results 2 592 000 L of alkaline coal mine drainage from the site was treated by the B-DAS (Barium carbonate-dispersed alkaline substrate) system in pilot scale. Bioreactors with a resident time of 24 h were working from July (tank 3) and August (tank 1, 2 and 4) until April. Four tanks were installed at the mine facility for the treatment of MD stored in a dam. The main difference between the tanks was the proportion used in the mixture of reactive material ($BaCO_3$) and wood chips and the flow of each tank. The ratio was 1:1 for tank 3 and 1:3 for the other tanks (1, 2 and 4). Tank 1 was selected to represent tank 2 and 4 for the chemical analysis. Tank 1 had a flow rate about 1.2 L/min. While, the flow in tank 2, 3 and 4 was increased up to 2.5 L/min after 3 months, to promote the fast saturation of the system. The system ran properly during the 7 months of testing. The system seemed to be saturated by March as the system was losing reactivity at that stage.

The main aim of the aforementioned system was achieved; being the removal of high cations and anions concentration, as well as the Hardness, Salinity ($Na^+$, $Cl^-$, $SO_4^{-2}$ and $Ca^{2+}$) and TDS from the environmental media contaminated with a source of mine drainage (MD). The chemical processes involved in the anions ($SO_4^{-2}$) and cations ($Mn^{2+}$, $Fe^{2+}$, $Al^{3+}$, $Zn^{2+}$, $Ca^{2+}$, $Mg^{2+}$ and $Na^+$) removal are described in the equations 15 to 21.

According to the water analysis, the B-DAS system has demonstrated the capacity to remove between 76% (tank 1) and 53% (tank 3) of sulfates (during the first 7 months) through the precipitation of barite ($BaSO_4$). In tank 1, the sulfate values (341.51 mg/L on average) were always inside the limits of SANS drinking water standard for class 1. While in tank 3 and cascade the values were over the limits of SANS drinking water standard for class 1, when the flow was increased. It is noteworthy that the values in the cascade were increased due to improper functioning of tank 3 and the rapid saturation of tanks 2, 3 and 4. To prevent it, the flow of tanks that were refilled was not increased.

The removal of Ca was among 95 and 88% for tanks 1 and 3, respectively; in the cascade was about 91%. Also, high percentages of removal for CI and Na can be seen. In tank 1 and 3, the CI and Na % removal was about 59 and 26%, respectively. While, in the cascade the removal decreased to 23 and 16%, respectively.

The metals contained in this drainage were completely removed. The Ba values (0.1 mg/L) did not exceed the limits of SANS drinking water standard for class 1 (0.7 mg/L). The Mg concentration was slightly removed in tank 1, but not removal was observed in the tank 3 or cascade.

However, the mineralogy characterization by SEM-EDS showed the presence of crystalline neoformed phase minerals of Mg. As well as, probably, crystalline neoformed phase minerals of calcite and aragonite ($CaCO_3$) and Na/CI complex.

The EC and TDS decreased 52%. Specifically, the TDS was removed due to the precipitation of $SO_4^{2-}$ as barite ($BaSO_4$) and cations such as Ca, Na and CI, mainly. The precipitation of these neoformed mineral and metallic phases allowed also the decrease of EC and TDS.

According to the thermodynamic modelling; after 6 months, the tank should be saturated and has low reactivity. The results from the chemical data demonstrates that the treated drainage is supersaturated with respect to barite ($BaSO_4$; IS~3.49), Calcite ($CaCO_3$; IS~1.25), dolomite ($CaMg(CO_3)_2$; IS~2.50), $Fe(OH)_3(a)$ (IS~1.75), Hausmannite ($Mn_3O_4$: IS~15.34), Pyrolusite ($MnO_2$; IS~9.85). According to the thermodynamic model when the water comes into contact with a solid material (e.g. some mineral or rock) and exceed equilibrium with that material these minerals phases are generated, which would be the most thermodynamically stable phase in our system.

Tank 1 was the most effective. The improvement of the water characteristics reached values within the limits of SANS drinking water standard for class 1, except for Mg (FIGS. 30 and 31). These results demonstrate that a semi-passive treatment based on $BaCO_3$ (BDAS) could be a viable solution in comparison with other systems whose costs are excessive especially for the treatment of closed mines. After 10 months the reactive material was removed from the tank and properly stored. Then, 2 reactive tanks were filled with new alkaline material following the methodology carried out in the phase 2.

3.3 Sampling and Analysis of Reactive Material

Figure 13:
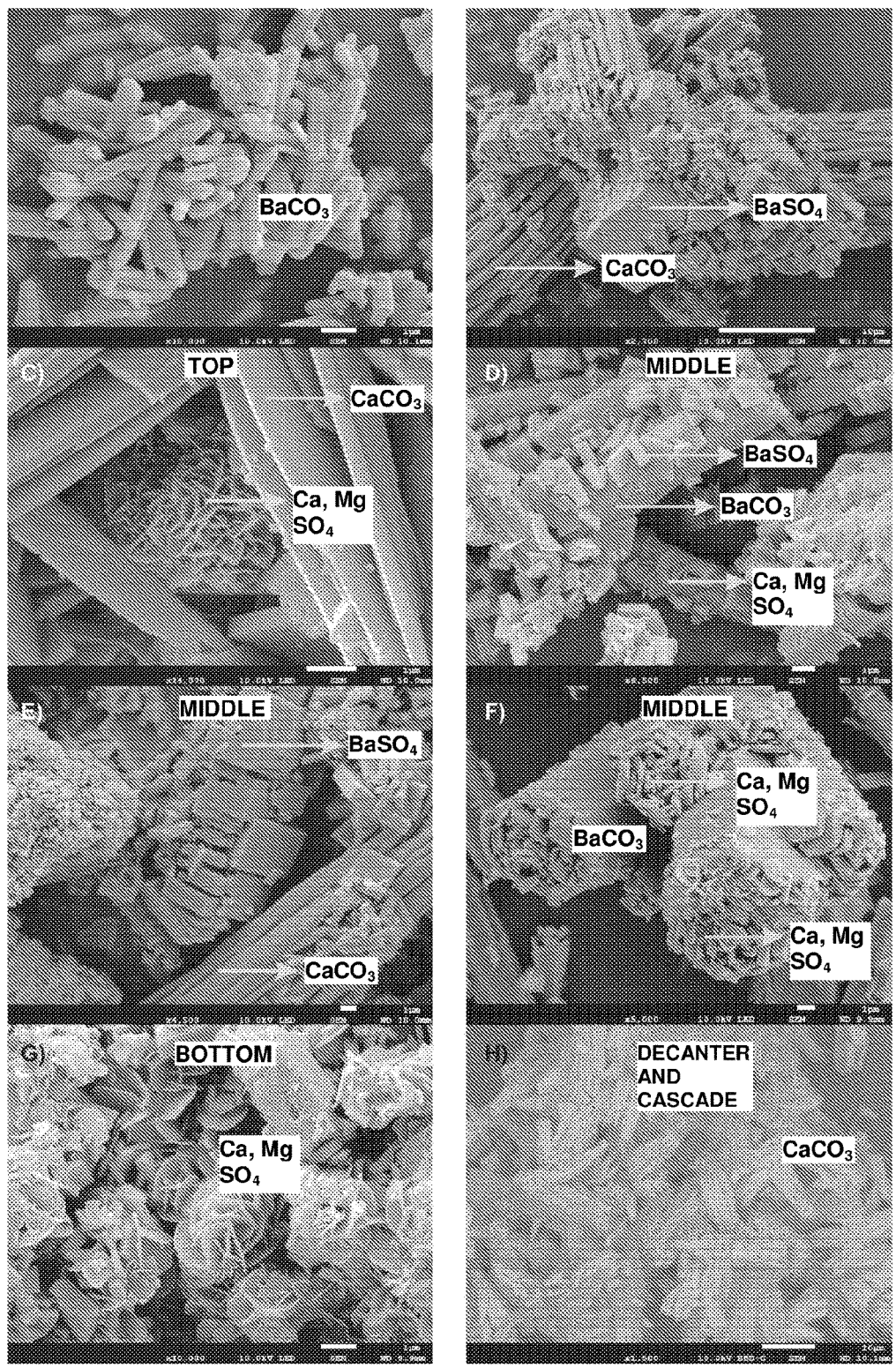
FIG. 13: SEM-EDS images of reactive materials (whiterite)
Figure 14A:
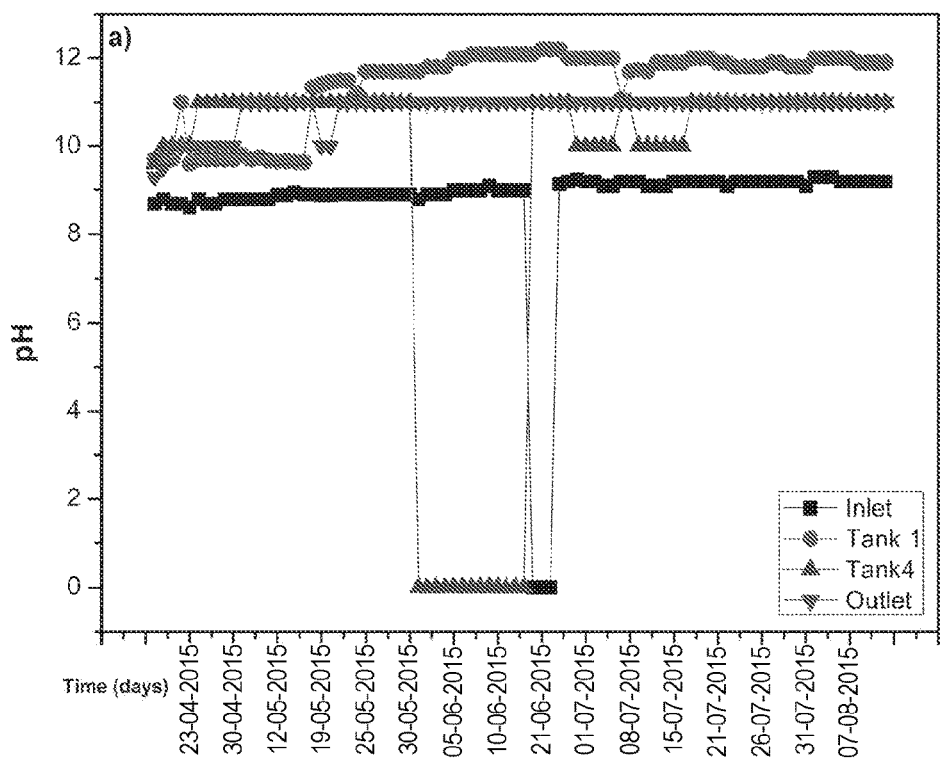
FIGS. 14a and 14b: is a graph depicting data obtained from the PLC of tanks 1, 4 and outlet, after replacement of reactive material chemical analysis of the treated media.
Figure 14B:
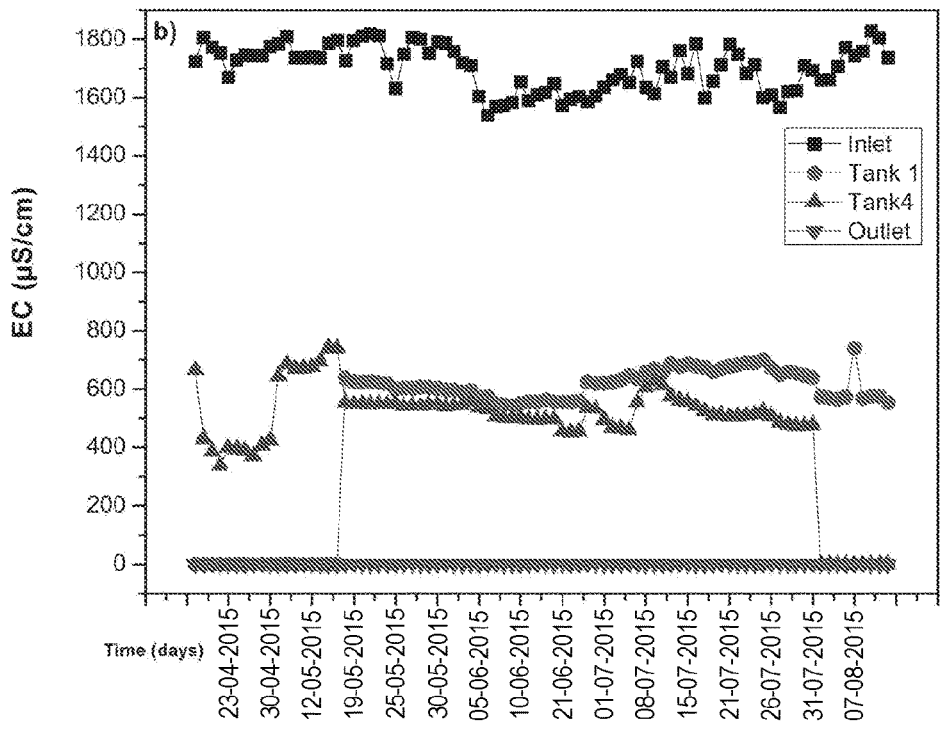
Figure 15A:
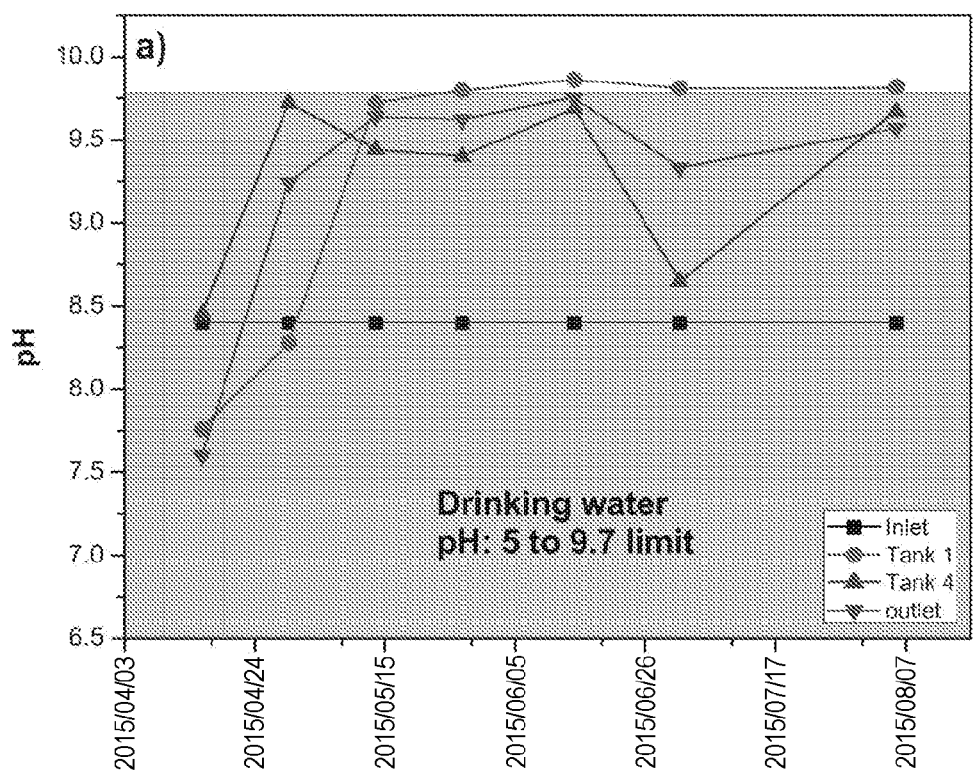
FIGS. 15a to 15e: is a graph depicting data as obtained from chemical analysis of tanks 1, 4 and outlet after replacement of reactive material.
Figure 15B:
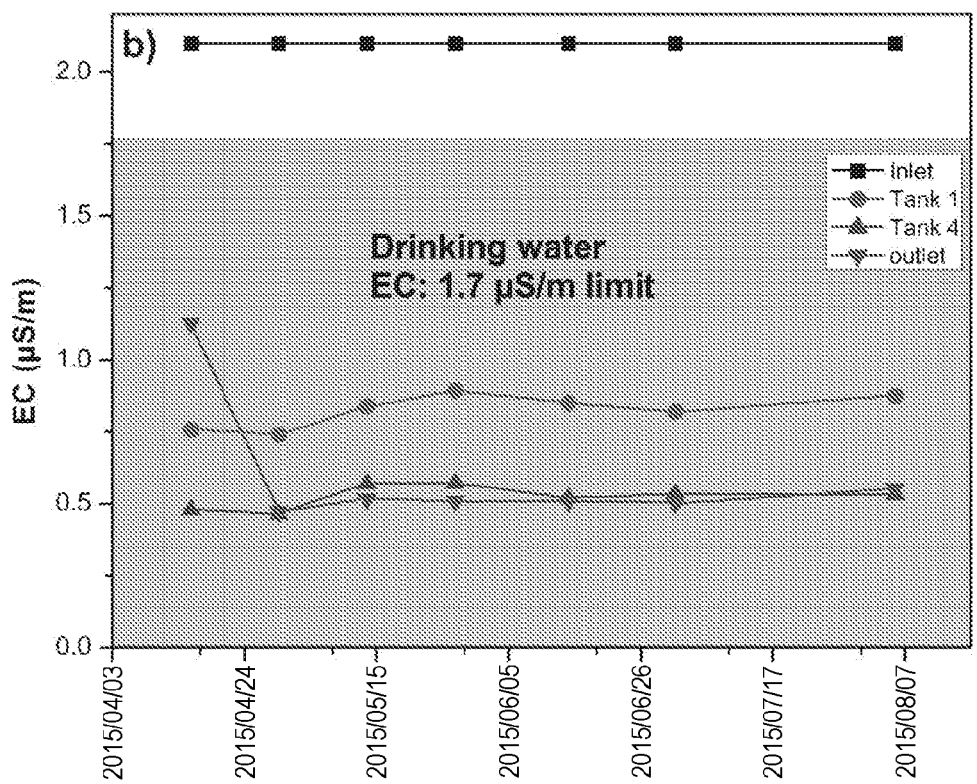
Figure 15C:
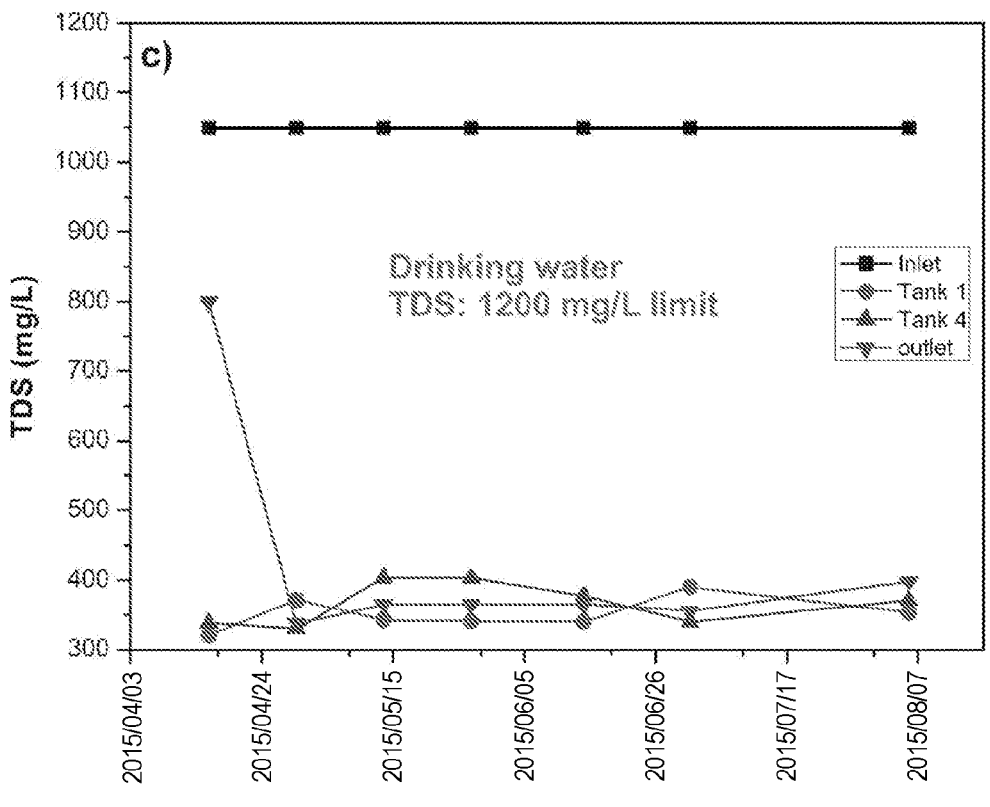
Figure 15D:
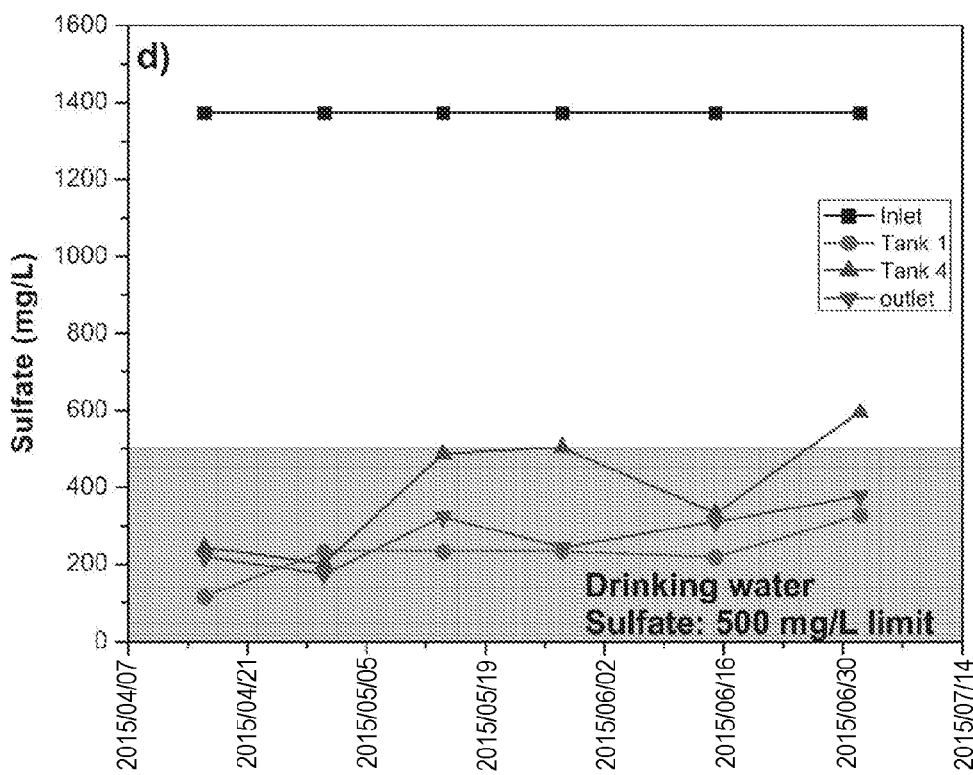
Figure 15E:
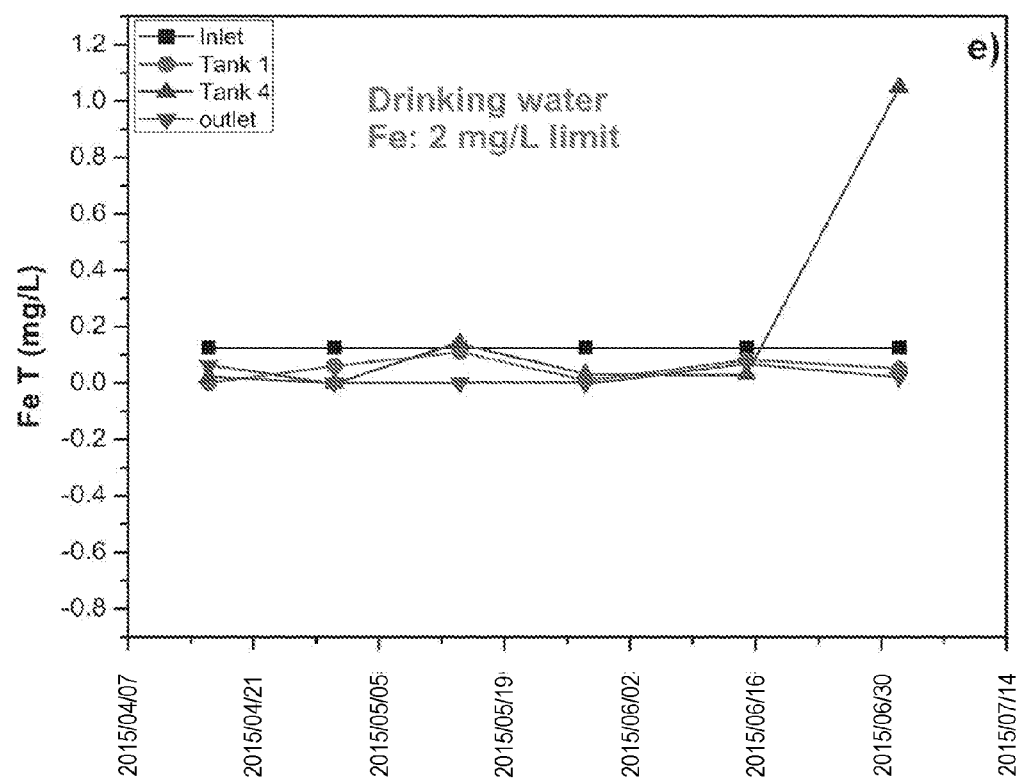
Figure 16A:
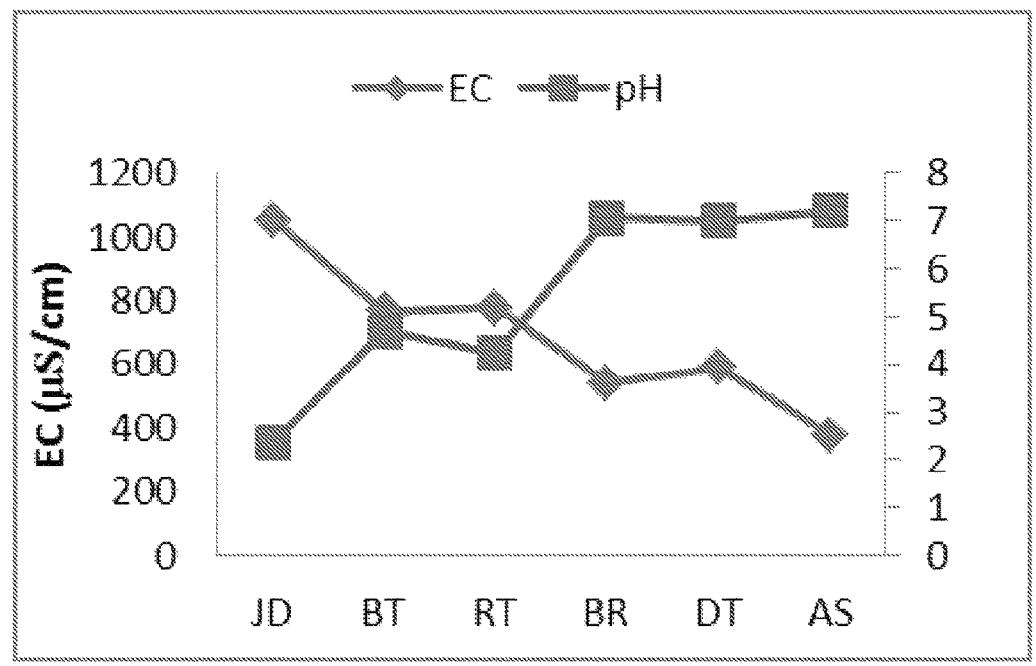
FIGS. 16a to 16f: is a graph depicting the evolution of the physicochemical parameters (on average) of the contaminated media throughout the pilot plant, from inlet (JD) to outlet (AS).
Figure 16B:
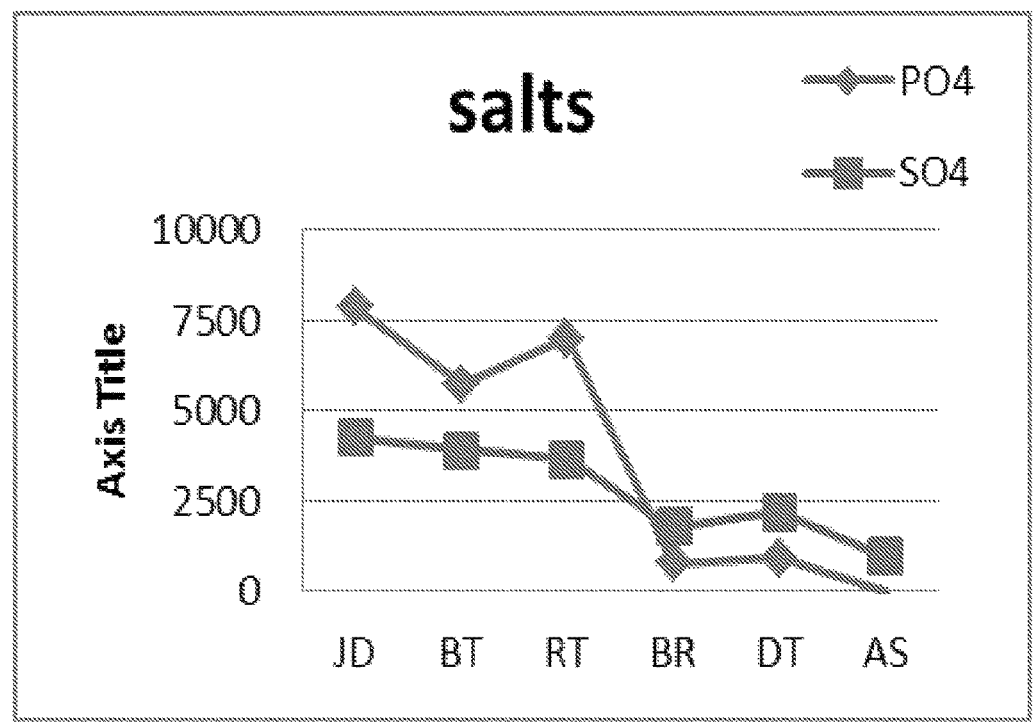
Figure 16C:
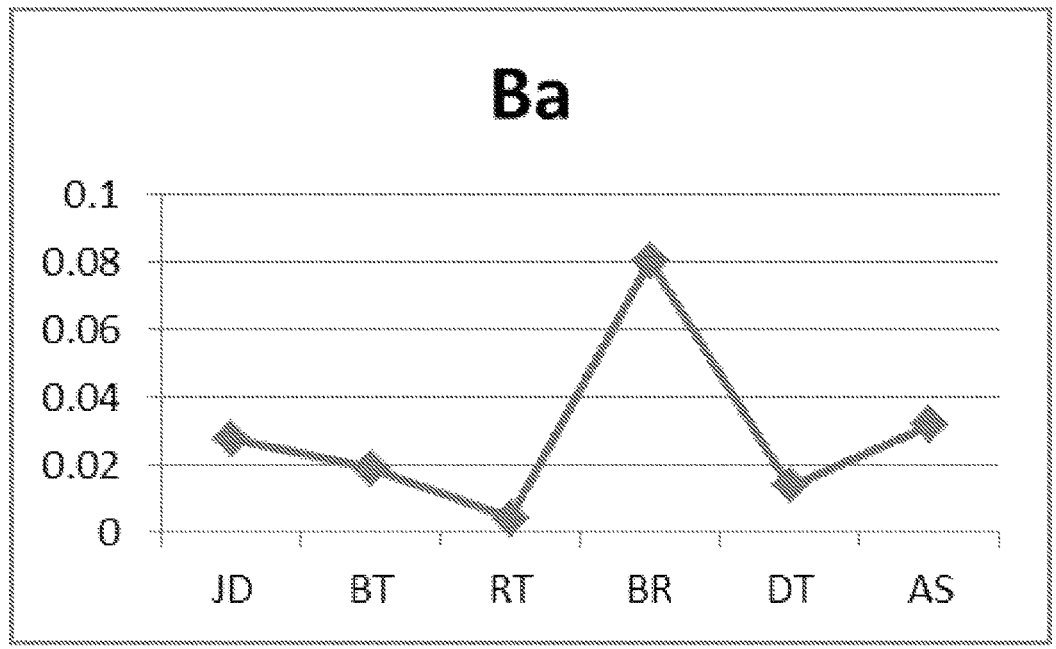
Figure 16D:
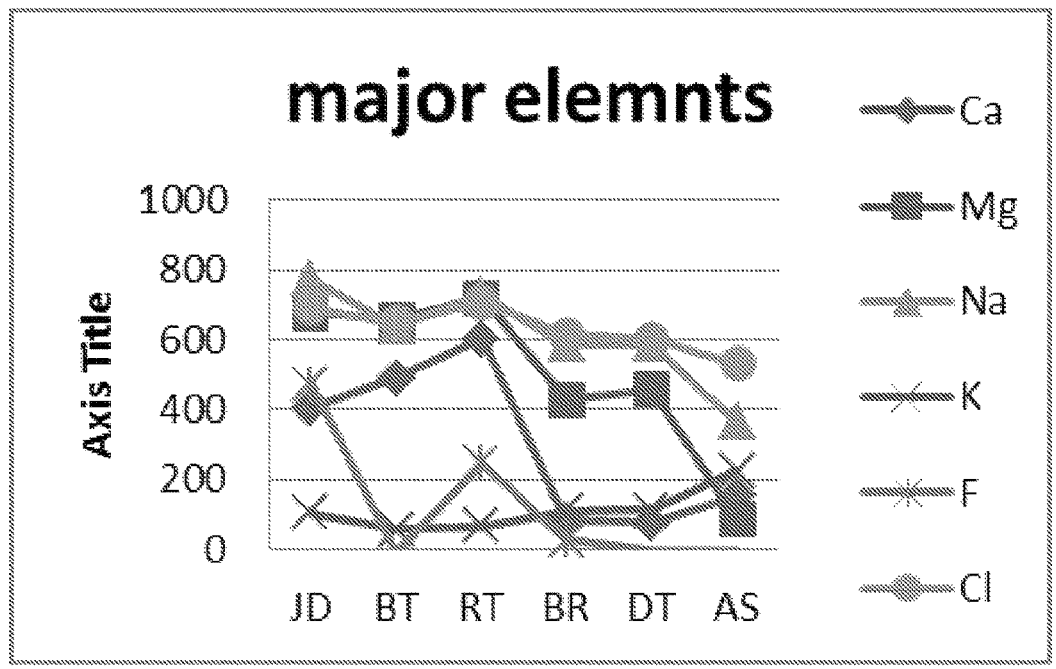
Figure 16E:
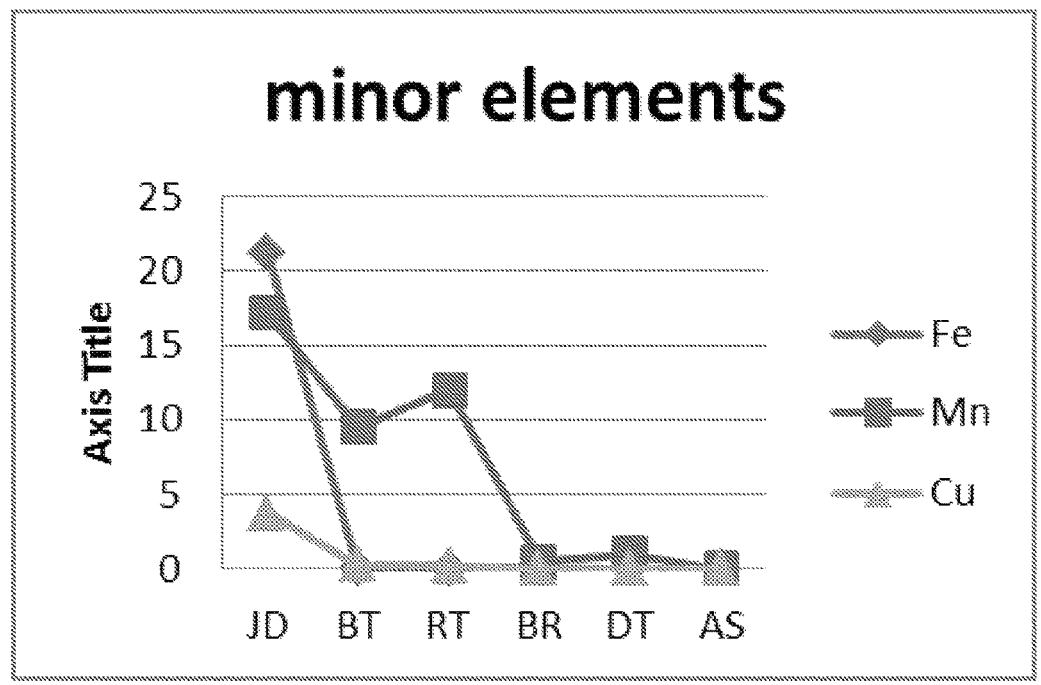
Figure 16F:
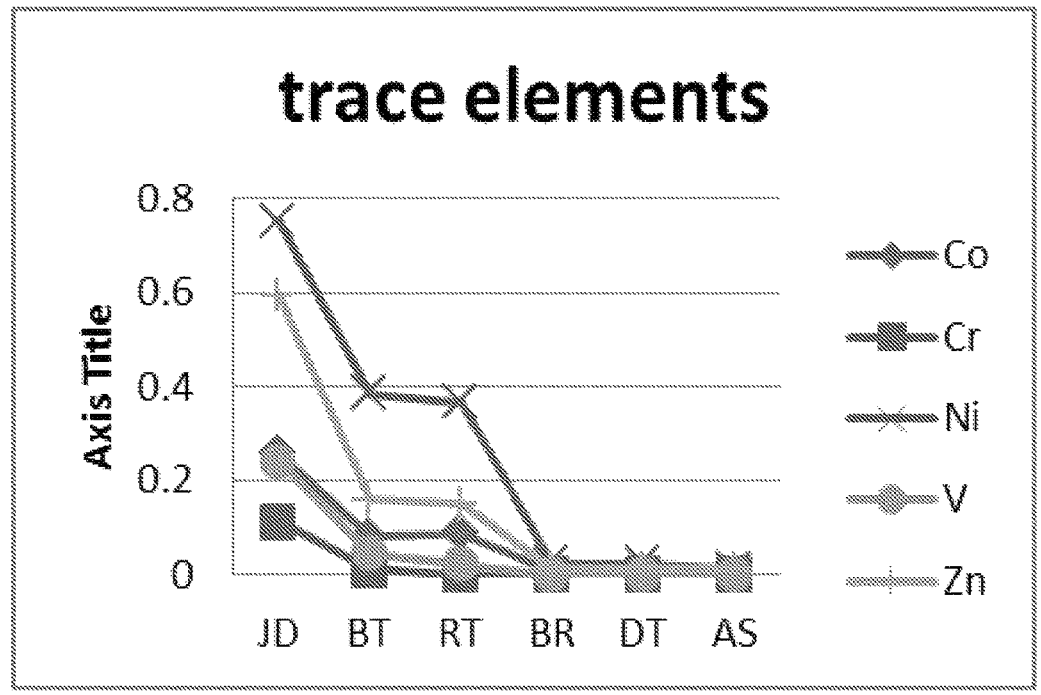

After 10 months running, the reactive tanks were stopped and drained. Then, the reactive material was excavated and samples were extracted at different depths. The samples were collected in plastic bags and labelled properly. Finally, the samples were stored and transported to the lab where they were dried and analysed by SEM-EDS (FIG. 13) (XRD in progress). The analysis by SEM-EDS showed the presence of crystalline neoformed phase minerals that contains mainly Ca, Ba, $SO_4^{2-}$ and Mg. As well as Na/CI complex poorly crystallized and distributed over the calcite or aragonite. The main crystalline neoformed phase minerals obtained were barium sulfate (barite) and calcium carbonate (aragonite and calcite).

3.4 Toxicity Analysis

TABLE 8

Test results and risk classification of B-DAS system;

| | | Results | | |
|---|---|---|---|---|
| | | Wastes Leachate | Exxaro inlet | Exxaro outlet |
| pH | | 7.3 | 6.7 | 8.2 |
| EC(Electrical conductivity) (mS/m) | | 9.1 | 204.9 | 115.9 |
| Disolved oxygen (mg/l) | | 9.3 | 9.1 | 5.1 |
| V. fischeri (bacteria) | Test started on yy/mm/dd | 15-07-13 | 15-07-13 | 15-07-13 |
| | %30 min inhibition (−)/stimulation (+) (%) | 7 | 15 | −39 |
| | EC/LC20(30 mins) | n.r. | n.r. | 41 |
| | EC/LC50(30 mins) | n.r. | n.r. | n.r. |
| | Toxicity unit (TU)/ Description | <1 | <1 | <1 |
| P. reticulata (guppy) | Test started on yy/mm/dd | 15-07-16 | 15-07-16 | 15-07-16 |
| | %96 hour mortality rate (−%) | 0 | 0 | 0 |
| | EC/LC10(96 hours) | n.r. | n.r. | n.r. |
| | EC/LC50(96 hours) | n.r. | n.r. | n.r. |
| | Toxicity unit (TU)/ Description | <1 | <1 | <1 |
| Estimated safe dilution factor (%) [for definitive testing only] | | 100 | 100 | 41 |

| Overall classification - Hazard class*** Weight (%) | | |
|---|---|---|
| Class I - No acute/chronic hazard | Class I - No acute/chronic hazard | Class II - Slight acute/chronic hazard |
| 0 | 0 | 50 |

From Table 8 it is clear that samples EWL, EXI showed "no acute/chronic toxicity hazard" (Class I). However, samples EXO showed "slight acute/chronic toxicity hazard" with safe dilution factors calculated of 41 (41 parts source water with 59 part unpolluted water). Therefore the leachates that could be produced during collection and storage of the waste produced by the water treatment are no toxic and no special storage would be required. The drainage collected from the dam was no toxic for the bacteria nor for the fishes. After the treatment, the drainage showed no toxicity for the fishes, but slight toxicity for the bacteria (probably due to the sensibility of these specific bacteria to the wood resins).

3.4 Emptied and Filled

The starting materials were placed next the system to facilities its handling during the filling of the tanks. Due to lack of TLB or crane, none of the containers were replaced and only 2 tanks were manually refilled (tank 1 and 4).

In tank 1; the old material was removed and replaced with the new mixture. While in tank 4 only part of the old material was removed and the new mixture was placed on top. The proportion used in this mix was 150 kg of $BaCO_3$ and 120 kg of wet wood chips. The mixing was made manually. The tanks were emptied and filled manually, as well.

Finally, it was made maintenance of the cascade, change taps and the flow rate was regulated to 1.5 L/min for each tank. The sampling was carried out on next day.

After 5 months of replacement, the results are encouraging both in the tanks as in the cascade, with sulfate removal rate 78% (from 1373 to 296 mg/L) on average and about 64% removal of TDS (from 1050 to 380.9 mg/L) and thus, removal of hardness from waters. Also, levels of pH values about 9.13 on average and conductivity values averaged 0.65 µS/m. All of them within the limits for drinking water (FIG. 14a, 14b and FIGS. 15a to 15e). There were no significant differences between the tank totally refilled and the tank where $BaCO_3$ was stacked. However, it is recommended to empty and refill the tanks to prevent an increase of anaerobic zone. After 15 months in total, we can say that this is the right system for the treatment of water with high concentration of sulfates, TDS and EC, so far. Also, no system has come so far, generating a by-product that can be recycled as $BaSO_4$ and $CaCO_3$ (no toxic by-product) and fully decontaminated water.

3.5 Lab and Pilot Scale of BDAS System for Treatment of Extremely Acidic Drainage The drainage treated in this case is leaching from phosphogypsum stacks. Phosphogypsum refers to the gypsum formed as a waste/byproduct of processing phosphate rock into fertilizer through a wet chemical process (equation 33).

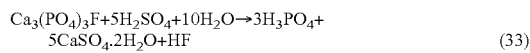

$$Ca_3(PO_4)_3F + 5H_2SO_4 + 10H_2O \rightarrow 3H_3PO_4 + 5CaSO_4 \cdot 2H_2O + HF \quad (33)$$

The action of sulphuric acid ($H_2SO_4$) on phosphate rock, mainly fluorapatite ($Ca_5(PO_4)_3F$), yields phosphoric acid ($H_3PO_4$), hydrogen fluoride (HF) and gypsum ($CaSO_4 \cdot 2H_2O$). The wet method generates about 5 ton of waste, commonly named phosphogypsum, per ton of phosphoric acid manufactured. These wastes are highly enriched in metal impurities, radionuclides from U-decay series and rare earth (5% de lanthanides in the case under study). Phosphogypsum wastes are often disposed in large stockpiles exposed to weathering processes, where they may cause serious environmental damage.

The stack under study contains about 38 MTones of phosphogypsum, its mineralogical composition is: brushite (>50%), gypsum (20-10%), apatite (<2%) and clay (<2%); chemically, it is worth noting the following trace elements (sort from largest to smallest): Sr, Th, Ba, Mn, Y, As, Cu, Sc, Se, U, Ag, Mo, Zr, Cd, Cr, Pb, Tl, V, Ni, Zn, Sb, Co and Br. Most of these metals are toxic or radioactive and they are leachates to the environment.

The infiltration of the leachates from the gypsum stacks during the last 50 years has been accumulated in the shallow weathered zone aquifer, creating a contamination plume around the gypsum stack and the impoundment dams. The groundwater has been impacted by acid containing materials manifest as a low pH and high Total Dissolved Solids (TDS). Often the TDS is predominantly associated with sulfate salts. There are also some instances where the metal concentrations in the groundwater (aluminium, iron, manganese, arsenic and copper) are out of compliance against the SANS 241:2006 Drinking water standard. Presumably, below the gypsum dams the SO4 concentration in the aquifer is above 5000 mg/l. The gypsum leachates are partially collected in impoundment dams and pumped back to the top of the stacks. The natural and forced evaporation processes that take place in the dams over the past 50 years have contributed to increase the concentration of pollutant over time.

For the remediation of the drainage, water samples from John's Dam (JD) was collected and treated with BDAS system at lab scale bioreactor. Thereafter, a bioreactor at pilot scale was designed and installed on site to treat the drainages collected at JD. In this particular case, the drainage was treated with a combination of $CaCO_3$-DAS and B-DAS, with the aim of increasing the pH and therefore decreasing the consumption of the $BaCO_3$.

3.6 Column Experiment

Two down-flow columns connected were constructed from PVC pipes (10 cm inner diameter, height 50 cm) and equipped with four additional lateral sampling ports.

Each column contained a layer of quartz gravel (particle size about 5-8 mm) at the bottom (2.5 cm). This layer was covered with a 40 cm reactive material layer, which consisted of $CaCO_3$ and wood shaving mixture in the first column (column A) and $BaCO_3$ and wood shaving in the second column (column B). The ratio wood:reactive material was 1:3 (w:w) in both columns 600 g of reactive material and 200 g of wood shaving.

The contaminated water is pumped to column A, thereafter it flows gravitationally through the column and it is pumped to the top of column B. The outflow from column B was collected in a container that also functioned as an aeration and settling tank. The flow rate was 1 mL/min with a residence time of 24 hours for each B-DAS columns. The porosity of the systems was 70% (volumetrically calculated).

Water analyses performed as described previously in phase 1 and 2.

3.7 Results

The physicochemical parameters measured show a clear improvement in the characteristics of the drainage treated (it is worth to noting that the concentration of pollutants of this particular drainage is extremely high); the acidity is neutralized (pH increased from about 3 to about 7), conductivity, salinity and total dissolved solids decreased 39.1, 39.9 and 36%, respectively; The concentration of sulfate decreased 85.8%.

TABLE 9

Physics-Chemicals parameters Inlet and outlet;

| parameter | Units | start 18 Feb blank | CaCO3 column 24-Feb | Output CaCO3 + BaCO3 24-Feb |
|---|---|---|---|---|
| Temperature | ° C. | 23.7 | 23.1 | 22.7 |
| Atmosf. Pres | mm Hg | 645.1 | 643.2 | 643.7 |
| DO | % | 42.6 | 35.3 | 5.5 |
| DO | mg/L | 2.93 | 2.45 | 2.91 |
| SPC | µS/cm | 13792 | 13161 | 10058 |
| Conductivity | µS/cm | 13439 | 12679 | 8410 |
| Resistivity | Ω cm | 74.41 | 78.87 | 103.64 |
| TDS | mg/L | 8963.5 | 8554 | 5740 |
| Salinity | g/L | 7.97 | 7.58 | 4.87 |
| pH | | 3.03 | 5.12 | 7.06 |
| ORP | mV | 342 | 259.7 | 127 |
| SO4 | mg/L | 7750 | | 1100 |

3.8 Bioreactor at Pilot Scale

Due the poor quality of limestone ($CaCO_3$) and its heterogeneous grain size, the amount of water that could be treated by the big limestone tank (BT) is less than the original design; therefore another reservoir tank (RT) was necessary to ensure the continuous flow to four barium reactors (BR) and the capacity of BT was not enough to sustain more than 4 BRs.

The water is pumped from JD to BT, which has 30 m3 of volume with 15% of porosity, therefore it has about 5000 L of capacity plus 2000 L of supernatant. The water is recirculating into BT until pH-meter get a value of 4.0. Then, the electronic valve releases the water to reservoir tank. Before that BT is completely empty, the pump installed in JD start to pump again into BT.

There are two reservoir tank (RT) of 5000 L onto of the 3 m stand, they have three objectives:

To let the system run without any extra energy, the water flows by gravity from RT into barium carbonate reactors (BR);

It also keeps the parameters stabilized, so we can control the quality of the water that is going into BRs; and Finally it ensures continuous flow into BR, therefore we avoid water stagnation and we can control the residence time into each BR.

There are 4 down flow bioreactors, 5000 L per tank, called BR1, BR2, BR3 and BR4. Each reactor have a manifold at the bottom to avoid preference flow within the tank. The bottom of each tank is filled with gravel up to 10 cm over the manifold. The gravel is used as a filter and also contributes to avoid preferential flow.

The rest of the tank is filled with a mixture of barium carbonate ($BaCO_3$) and wet wood chips. We have been bench marking in lab scale, several ratios of Barium: wood chips and with these results we concluded that a 2:1 ratio was the best option. Therefore each tank is filled with about 625 Kg of BaCO3 and 312 Kg of wood chips. The wood chips are inert material used as a matrix to support the BaCO3 powder that is adhered to the wood chips and it also gives the adequate porosity to each reactor (about 50%). Each tank has a capacity of 2.5 $m^3$, in order to get a residence time about 12 hours the flow rate was 180 L/h per tank.

The decanter was an 8 $m^3$ square tank with a stilling wall disposed perpendicular to the flow direction, therefore there are two sections; the turbulence flow section where the inlet is creating turbulence and the laminar flow section where the characteristics of the wall avoid any turbulence and allow the water flow to be slowed down and have laminar flow.

The objective of this tank is decreases the total suspended solids (TSS), in addition to keep the parameters stabilized and to avoid that any barium carbonate could be released.

The reactions that are taking place in BRs are oxygen consuming; therefore an aeration system (AS) was needed to recover the lost oxygen.

3.9 Sampling

Samples were collected periodically from JD, BT, RT, BRs, DT and AS (outlets of the pilot plant) with the aim of follow the evolution of the drainage through the pilot plant. Physicochemical parameters were measured on site, as describe before, and cations and anions concentration were analyzed by ICP.

3.10 Results pH was increased from 2.3 up to 4 in BT and then the water is stored in RT to ensure continuous flow at BR, where pH increases up to 7. The pH keep stabilized from there to the outlet (through DT and AS). EC decrease 64.15%. Ca is increasing at BT because of the release of Ca from the lime ($CaCO_3$), but in BR decreases 90%. Mg decrease about from 700 mg/L to 420 mg/L (40%) at BR and up to 85 mg/L (88%) at As. Na decreases 25% at BR, the main reduction is due to the aeration at AS (46%). F was removed 100%. CI was removed 23%. $PO_4^{3-}$ was completely removed (from about 8000 to 0 mg/L). $SO_4^{2-}$ was removed 77.5%, (from an average of 4237.5 to 995 mg/L). Al was removed 99.99%. Fe was removed 99.93%. Mn was removed 99.89%. BT was a reused tank that was contaminated with son compounds, that is the reason for the arsenic to appear at the analyses done in BT and followings but it was 100% removed at the outlet. Ba at inlet was 0.027 mg/L, but it was increased at the barium carbonate reactor (BR) due the release of Ba. Therefore the concentration of Ba have been increased 11.5%, but it is still under the allowable limit for any use of water (drinking water (0.7 mg/L), irrigation livestock, etc) 0.032 mg/L. Co and Cr were 100% removed. Cu was 99.7% removed. Ni was removed 98.4%. V was removed 99.6%. Zn was remove 98.1%. NO3, No2, Br and Pb were under detection limit since the inlet (JD) throughout the whole system.

3.11 Conclusion

The main removal of most of the compounds took place into the BR. Some compounds are increased at BT and/or DT. Both tanks were reused, therefore and even after the cleaning labor, some contaminants may remain in the tanks and may be released during the experiment. BT removed most of the Cu, Co, Cr, Zn, V and F, while BRs removed most of the SO4, PO4, Ca, Mn, Ni and 40% of Mg. DT is settling the Ba by decreasing its concentration from 0.08 to 0.01 mg/L. AS helped to remove Mg and Na (50% and 38%, respectively, of the total removed throughout the system), as well as Mn, Cl, SO4, PO4 and EC.

TABLE 10

Example of the parameters analyzed during a routine sampling performed in April 2014;

|  | JD | | BT | | | BR1 |
|---|---|---|---|---|---|---|
|  | BV.JD.090414 | BV.JD.240414 | BV BT 100414Right | BV BT 240414 Pump | RT BV RT 100414 | BV BR1 Top 110414 |
| pH | 2.31 | 2.41 | 5.34 | 4.08 | 4.25 | 7.33 |
| EC | 967 | 1142 | 712 | 826 | 779 | 525 |
| Ca | 389 | 417 | 460 | 520 | 601 | 63 |
| Mg | 634 | 715 | 601 | 710 | 719 | 441 |
| Na | 737 | 802 | 536 | 742 | 724 | 582 |
| K | 103 | 104 | 40 | 69 | 65 | 92 |
| F | 528.2 | 411.7 | −10.0 | −10.0 | 246.4 | −1.0 |
| Cl | 682.6 | 697.2 | 599.1 | 696.5 | 706.5 | 645.8 |
| NO2(N) | 0.0 | 0.0 | 0.0 | 0.0 | 0.0 | 0.0 |
| Br | 0.0 | 0.0 | 0.0 | 0.0 | 0.0 | 0.0 |
| NO3(N) | 0.0 | 0.0 | 0.0 | 0.0 | 0.0 | 0.0 |
| PO4 | 8351.1 | 7383.7 | 4931.7 | 6553.3 | 7004.5 | 669.8 |
| SO4 | 4029.7 | 4445.4 | 3395.4 | 4397.4 | 3639.0 | 1370.9 |
| Al | 109.171 | 117.416 | 0.400 | 23.269 | 8.734 | −0.001 |
| Fe | 24.651 | 17.668 | 0.022 | 0.079 | 0.067 | 0.165 |
| Mn | 16.282 | 18.079 | 6.436 | 12.634 | 12.008 | 1.218 |
| As | <0.006 | <0.006 | 0.101 | 0.063 | 0.100 | <0.006 |
| Ba | 0.018 | 0.038 | <0.001 | 0.019 | 0.004 | 0.044 |
| Co | 0.243 | 0.273 | 0.052 | 0.108 | 0.087 | <0.002 |
| Cr | 0.129 | 0.099 | <0.006 | 0.011 | <0.006 | <0.006 |
| Cu | 3.823 | 3.731 | 0.118 | 0.492 | 0.232 | 0.006 |
| Ni | 0.851 | 0.654 | 0.325 | 0.446 | 0.369 | 0.010 |
| Pb | 0.000 | 0.000 | 0.000 | 0.000 | 0.000 | 0.000 |
| V | 0.239 | 0.246 | 0.061 | 0.033 | 0.024 | 0.000 |
| Zn | 0.549 | 0.640 | 0.089 | 0.230 | 0.149 | 0.012 |

|  | BR1 | | | DT | | | AS |
|---|---|---|---|---|---|---|---|
|  | BV BR1 110414 | BV BR1 240414 | BV BR1 240414 | BV DT 120414 | BV DT 240414 TF | BV DT 240414 | BV AS 240414 |
| pH | 6.49 | 7.24 | 7.2 | 7.08 | 6.64 | 7.26 | 7.22 |
| EC | 605 | 512 | 523 | 583 | 590 | 593 | 378 |
| Ca | 139 | 55 | 62 | 74 | 93 | 60 | 152 |
| Mg | 428 | 407 | 429 | 519 | 426 | 454 | 85 |
| Na | 561 | 588 | 607 | 604 | 513 | 638 | 363 |
| K | 123 | 110 | 115 | 78 | 136 | 121 | 223 |
| F | 72.0 | 14.6 | 11.6 | −1.0 | −1.0 | −1.0 | −1.0 |
| Cl | 588.9 | 605.5 | 613.7 | 620.1 | 570.0 | 610.8 | 530.6 |
| NO2(N) | 0.0 | 0.0 | 0.0 | 0.0 | 0.0 | 0.0 | 0.0 |
| Br | 0.0 | 0.0 | 0.0 | 0.0 | 0.0 | 0.0 | 0.0 |
| NO3(N) | 0.0 | 0.0 | 0.0 | 0.0 | 0.0 | 0.0 | 0.0 |
| PO4 | 1092.3 | 642.6 | 725.8 | 1142.5 | 978.1 | 648.8 | −10.0 |
| SO4 | 2230.6 | 1765.4 | 1789.7 | 2592.8 | 2054.1 | 1888.7 | 955 |
| Al | 0.013 | 0.005 | 0.001 | 0.008 | 0.039 | 0.004 | 0.008 |
| Fe | 0.015 | 0.057 | 0.015 | 0.015 | 0.027 | 0.012 | 0.014 |
| Mn | 0.618 | 0.115 | 0.072 | 1.440 | 1.490 | 0.095 | 0.019 |
| As | 0.029 | <0.006 | <0.006 | <0.006 | 0.019 | <0.006 | <0.006 |
| Ba | 0.116 | <0.001 | <0.001 | 0.005 | 0.022 | <0.001 | 0.032 |
| Co | 0.010 | 0.004 | <0.002 | 0.010 | 0.004 | 0.003 | <0.002 |
| Cr | <0.006 | <0.006 | <0.006 | <0.006 | <0.006 | <0.006 | <0.006 |
| Cu | 0.007 | 0.007 | 0.006 | 0.007 | 0.007 | 0.006 | 0.012 |
| Ni | 0.036 | 0.024 | 0.024 | 0.015 | 0.019 | 0.035 | 0.012 |
| Pb | 0.000 | 0.000 | 0.000 | 0.000 | 0.000 | 0.000 | 0.000 |
| V | 0.001 | 0.000 | 0.001 | 0.001 | 0.001 | 0.001 | 0.001 |
|  | 0.014 | 0.011 | 0.011 | 0.013 | 0.011 | 0.011 | 0.011 |

What we claim:

1. A fixed-film bioreactor for bio-remediation, or at least partial bio-remediation, of environmental media contaminated with a source of mine drainage (MD), and wherein the bioreactor is a down-flow reactor with a supernatant open to the atmosphere in order to maximize iron oxidation and to minimize iron (II) mobility in the bioreactor, said fixed-film bioreactor including:

(i) a support matrix;
(ii) a barium carbonate $BaCO_3$ alkaline substrate for removing sulphate, cation, electrical conductivity (EC) and total dissolved solids (TDS) by precipitation; and
(iii) a microbial consortium for removing nitrates and cyanide.

2. The fixed-film bioreactor of claim 1, wherein the fixed-film bioreactor is in the form of a fixed-film biocell.

3. The fixed-film bioreactor of claim 1, wherein the support matrix serves as an inert physical support mechanism for a microbial community.

4. The fixed-film bioreactor of claim 1, wherein the support matrix serves as surface media for the dispersal of the $BaCO_3$ alkaline substrate thereby allowing the formation of a dispersed alkaline substrate (DAS).

5. The fixed-film bioreactor of claim 4, wherein the dispersed alkaline substrate (DAS) is in the form of a $BACO_3$ dispersed alkaline substrate (BDAS).

6. The fixed-film bioreactor of claim 1, wherein the support matrix material comprises a material selected from the group consisting of an inert organic medium, wood chips and gravel.

7. The fixed-film bioreactor of claim 6, wherein the support matrix material comprises wood chips.

8. The fixed-film bioreactor of claim 6, wherein the support matrix material consists of a combination of wood chips and quartz gravel.

9. The fixed-film bioreactor of claim 7, wherein the ratio of wood chips to $BACO_3$ is 4:1 (v/v).

10. The fixed-film bioreactor of claim 6, wherein the support matrix provides an electron donor for the microbial consortium.

11. The fixed-film bioreactor of claim 6, wherein the inert organic material is manure.

12. The fixed-film bioreactor of claim 11, wherein the manure is horse manure.

13. The fixed-film bioreactor of claim 1, wherein the microbial consortium comprises sulfate reducing microorganisms.

14. The fixed-film bioreactor of claim 1, wherein the dissolution of barium carbonate $BACO_3$ has a pH of about pH 3 to about pH 8.5.

15. The fixed-film bioreactor of claim 1, wherein a zero valent iron (ZVI) is included.

16. The fixed-film bioreactor of claim 1, wherein the fixed-film bioreactor operates under aerobic conditions.

17. The fixed-film bioreactor of claim 1, wherein the fixed-film bioreactor operates under anaerobic conditions.

18. The fixed-film bioreactor of claim 1, wherein the bioreactor can operate at either continuous or pulsed flow.

19. The fixed-film bioreactor of claim 1, wherein the precipitation is in the form of any one or more of barium sulfate ($BaSO_4$), carbonates (($Me^{2+}$)$CO_3$) and oxy-hydroxides ($Me^{2+/3+}O(OH)$).

20. A process for the bioremediation, or at least partial bioremediation, of environmental media contaminated with MD, wherein the process includes the step of removing environmental media from a mine drainage contaminated site and exposing the environmental media to a mixture including an indigenous microbial consortium of microorganisms from MD, wood chips as a minimal source of electron donor, and a dispersed alkaline substrate including dispersed barium carbonate $BaCO_3$, allowing for the chemically and biologically mediated precipitation of sulfate, nitrate, phosphate and metals.

21. A process for the bioremediation, or at least partial bioremediation, of environmental media contaminated with MD, wherein the process includes the step of removing environmental media from a mine drainage contaminated site and exposing the environmental media to a mixture including an indigenous microbial consortium of microorganisms from MD, wood chips as a minimal source of electron donor, and a dispersed alkaline substrate including dispersed barium carbonate $BaCO_3$, allowing for the chemically and biologically mediated precipitation of sulfate, nitrate, phosphate and metals, and wherein said process includes the following stages:
    a first stage including the steps of:
        (i) providing a bioreactor as claimed in claim 1, wherein the bioreactor includes a support matrix which has been wetted and pre-treated with $BaCO_3$ to form a $BaCO_3$ dispersed alkaline substrate;
        (ii) introducing the MD contaminated media into the bioreactor and subsequently introducing the indigenous microbial consortium of microorganisms; and
        (iii) controlling the hydraulic retention time of the bioreactor such that the hydraulic retention time is between about 9 hours and about 24 hours; and
    a second stage including the steps of:
        (iv) allowing for the precipitation of the sulfate present in the source of the MD contaminated environmental media as barium sulfate ($BaSO_4$);
        (v) allowing for the precipitation of Ca, Mg, Na and trace metals present in the source of the MD contaminated environmental media as calcite and aragonite ($CaCO_3$);
        (vi) allowing for the precipitation of heavy metals present in the source of the MD contaminated environmental media as oxy-hydroxides ($Me^{2+/3+}O(OH)$); and
        (vii) removing cyanide and nitrates.

* * * * *